US012634039B2

(12) United States Patent
Sridharan et al.

(10) Patent No.: US 12,634,039 B2
(45) Date of Patent: May 19, 2026

(54) DETERMINATION AND COUNTING OF UPLINK REPETITIONS

(71) Applicant: QUALCOMM Incorporated, San Diego, CA (US)

(72) Inventors: Gokul Sridharan, Sunnyvale, CA (US); Hung Dinh Ly, San Diego, CA (US); Seyedkianoush Hosseini, San Diego, CA (US); Wanshi Chen, San Diego, CA (US); Mahmoud Taherzadeh Boroujeni, San Diego, CA (US); Tao Luo, San Diego, CA (US); Krishna Kiran Mukkavilli, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 17/451,556

(22) Filed: Oct. 20, 2021

(65) Prior Publication Data

US 2022/0123865 A1     Apr. 21, 2022

Related U.S. Application Data

(60) Provisional application No. 63/141,854, filed on Jan. 26, 2021, provisional application No. 63/199,807, (Continued)

(51) Int. Cl.
*H04L 1/08* (2006.01)
*H04L 1/1607* (2023.01)
*H04L 27/26* (2006.01)

(52) U.S. Cl.
CPC .............. *H04L 1/08* (2013.01); *H04L 1/1642* (2013.01); *H04L 27/26025* (2021.01); *H04L 27/2605* (2013.01)

(58) Field of Classification Search
None
See application file for complete search history.

(56) References Cited

U.S. PATENT DOCUMENTS

2020/0313793 A1     10/2020   Jung et al.

FOREIGN PATENT DOCUMENTS

CN          111316731 A       6/2020
WO          2019168050 A1     9/2019
(Continued)

OTHER PUBLICATIONS

International Search Report and Written Opinion—PCT/US2021/071959—ISA/EPO—Feb. 2, 2022.
(Continued)

*Primary Examiner* — Peter Chen
(74) *Attorney, Agent, or Firm* — Harrity & Harrity, LLP

(57) ABSTRACT

Various aspects of the present disclosure generally relate to wireless communication. In some aspects, a mobile station may receive a configuration that indicates a number of nominal repetitions associated with an uplink repetition type that does not permit uplink transmission occasions to cross a slot boundary and that permits only one uplink transmission occasion per slot. The mobile station may transmit an actual repetition of the uplink repetition type in a transmission occasion based at least in part on a determination that the transmission occasion has resources available for the actual repetition, wherein the transmission occasion is a slot. The mobile station may terminate transmission of actual repetitions of the uplink repetition type when a number of actual repetitions equals the number of nominal repetitions. Numerous other aspects are provided.

31 Claims, 26 Drawing Sheets

500 ⟶

700 ⟶

Related U.S. Application Data filed on Jan. 26, 2021, provisional application No. 63/094,563, filed on Oct. 21, 2020.

(56) References Cited

FOREIGN PATENT DOCUMENTS

| WO | 2020066022 | A1 | 4/2020 | | |
| WO | WO-2020067967 | A1 | * | 4/2020 | ........... H04L 5/0012 |
| WO | WO-2020167650 | A1 | * | 8/2020 | ........... H04B 7/2656 |
| WO | 2020203427 | A1 | 10/2020 | | |
| WO | 2020222299 | A1 | 11/2020 | | |
| WO | 2020230840 | A1 | 11/2020 | | |

OTHER PUBLICATIONS

Nokia., et al., "Summary of Email Discussion [100e-NR-L1enh_URLLC- PUSCH_Enh-01] (AI 7.2.5.3)", 3GPP TSG-RAN WG1 Meeting #100-e, 3GPP Draft, R1-2001401, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Mar. 6, 2020 (Mar. 6, 2020), pp. 1-41, XP051860447, Retrieved from the Internet: URL: https://www.3gpp.org/ftp/tsg_ran/WG1_RL1/TSGR1_100_e/Docs/R1-2001401.zip, R1-2001401_Summary [100e-NR-L1enh_URLLC-PUSCH_Enh-01].docx [retrieved on Mar. 6, 2020] p. 28 p. 31-p. 33.

Samsung: "PUSCH Coverage Enhancement", 3GPP TSG RAN WG1 #103-e, 3GPP Draft, R1-2008181, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 16, 2020 (Oct. 16, 2020), pp. 1-8, XP051939507, Retrieved from the Internet: URL: https://www.3gpp.org/ftp/tsg_ran/WG1_RL1/TSGR1_103-e/Docs/R1-2008181.zip, R1-2008181.docx [retrieved on Oct. 16, 2020] p. 3-p. 4.

VIVO: "Discussion on Solutions for PUSCH Coverage Enhancement", 3GPP TSG RAN WG1 #103-e, 3GPP Draft, R1-2007680, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 17, 2020 (Oct. 17, 2020), pp. 1-9, XP051939837, Retrieved from the Internet: URL: https://www.3gpp.org/ftp/tsg_ran/WG1_RL1/TSGR1_103-e/Docs/R1-2007680.zip, R1-2007680 Discussion on Solutions for PUSCH coverage enhancement.docx [retrieved on Oct. 17, 2020] p. 1-p. 2.

3GPP TS 38.214: "3rd Generation Partnership Project; Technical Specification Group Radio Access Network; NR; Physical layer procedures for data(Release 16)", V16.3.0, Sep. 2020, 11 Pages.

China Telecom: "Discussion on PUSCH coverage enhancements", 3GPP TSG RAN WG1 #103-e, R1-2007994, e-Meeting, Oct. 26-Nov. 13, 2020, 14 Pages.

Moderator (China Telecom): "[102-e-NR-CovEnh-03] Email discussion/approval on PUSCH Coverage Enhancement", 3GPP TSG RAN WG1 Meeting #102-e, R1-2007404, E-meeting, Aug. 17, 2020-Aug. 28, 2020, 94 Pages, Chapter 10.

Nokia, et al., "Summary of Email Discussion [100e-NR-L1enh_URLLC-PUSCH_Enh-01] (AI 7.2.5.3)", 3GPP TSG-RAN WG1 Meeting #100-e, R1-2001401, e-Meeting, Feb. 24, 2020-Mar. 6, 2020, pp. 1-41, Chapters 2.1, 2.3, 3, 3.1, 3.2, 3.3, 5.2 and Appendix A.

Samsung: "PUSCH Coverage Enhancement", 3GPP TSG RAN WG1 #103-e, R1- 2008181, e-Meeting, Oct. 26-Nov. 13, 2020, Oct. 16, 2020, pp. 1-8.

Samsung: "Review Issue List for ASN.1 Freeze", 3GPP TSG-RAN2 Meeting#81, Tdoc R2-130220, St. Julian's, Malta, Jan. 28-Feb. 1, 2013, Jan. 19, 2013, pp. 1-46.

Taiwan Search Report—TW110139042—TIPO—Jun. 6, 2025.

Wei-Nan W., et al., "Dynamic Retransmission Algorithm in Low-Power Wireless Sensor Networks", Computer Science, vol. 45, No. 6, Jun. 15, 2018, 5 Pages.

* cited by examiner

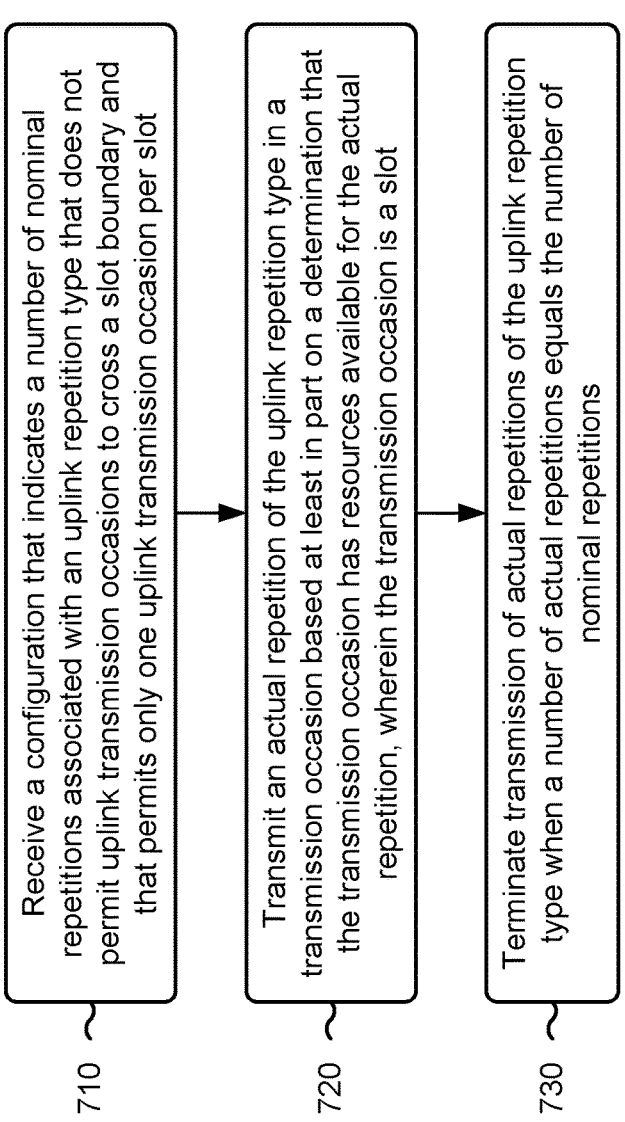

710 Receive a configuration that indicates a number of nominal repetitions associated with an uplink repetition type that does not permit uplink transmission occasions to cross a slot boundary and that permits only one uplink transmission occasion per slot 720 Transmit an actual repetition of the uplink repetition type in a transmission occasion based at least in part on a determination that the transmission occasion has resources available for the actual repetition, wherein the transmission occasion is a slot 730 Terminate transmission of actual repetitions of the uplink repetition type when a number of actual repetitions equals the number of nominal repetitions

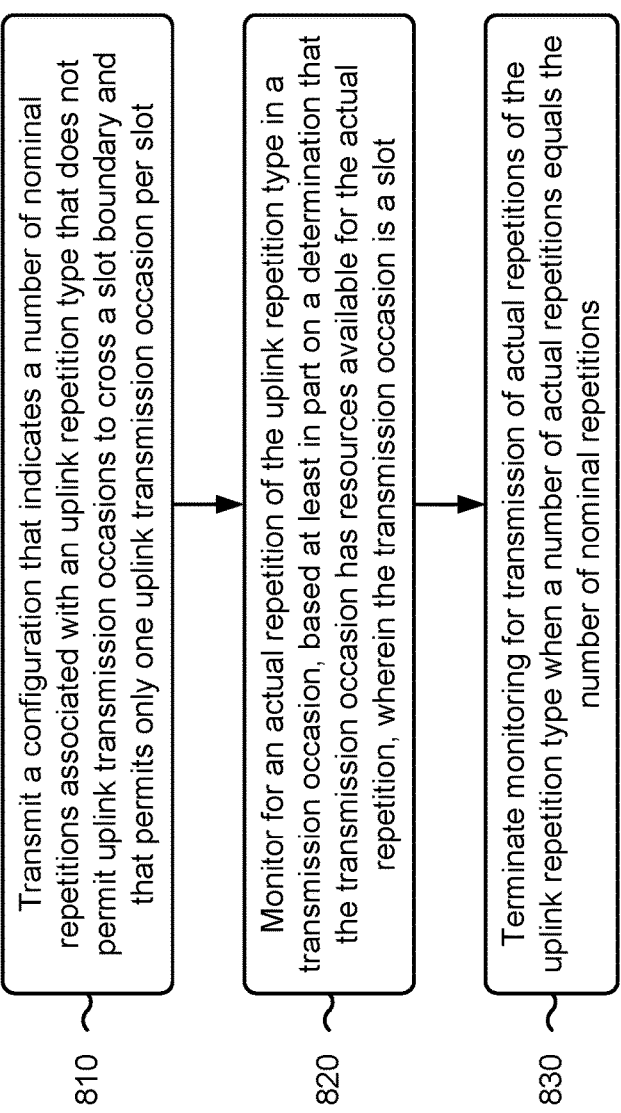

810 — Transmit a configuration that indicates a number of nominal repetitions associated with an uplink repetition type that does not permit uplink transmission occasions to cross a slot boundary and that permits only one uplink transmission occasion per slot 820 — Monitor for an actual repetition of the uplink repetition type in a transmission occasion, based at least in part on a determination that the transmission occasion has resources available for the actual repetition, wherein the transmission occasion is a slot 830 — Terminate monitoring for transmission of actual repetitions of the uplink repetition type when a number of actual repetitions equals the number of nominal repetitions

1305
Indication of SCS and/or slot pattern

1310
Determine time window for PUSCH repetitions based on SCS and/or slot pattern 1315
Indication of time window 1320
PUSCH transmissions in time window

UE 120

Base Station 110

1300

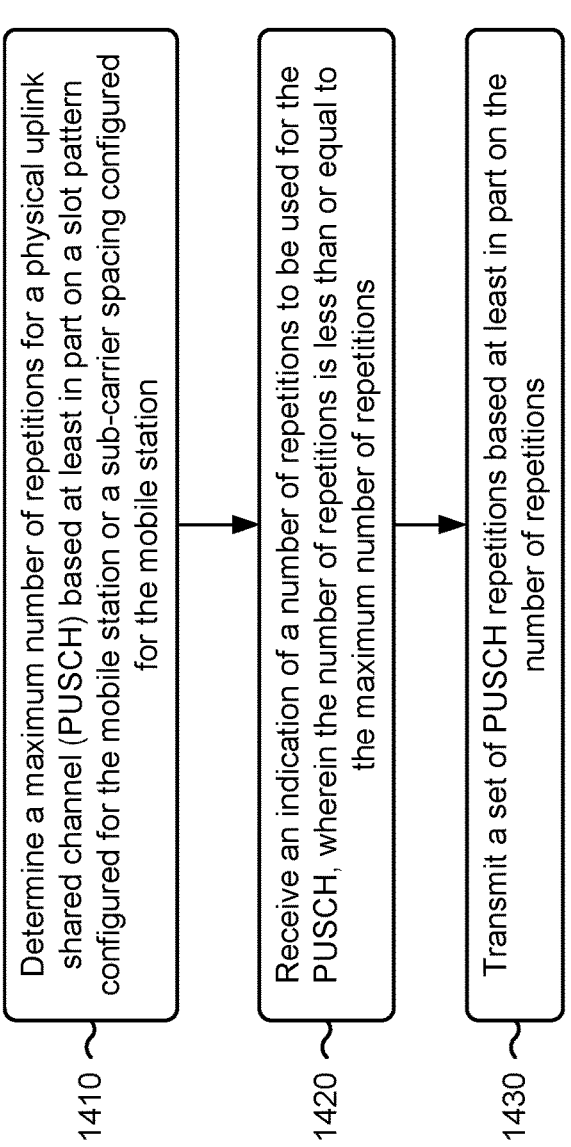

1410 Determine a maximum number of repetitions for a physical uplink shared channel (PUSCH) based at least in part on a slot pattern configured for the mobile station or a sub-carrier spacing configured for the mobile station 1420 Receive an indication of a number of repetitions to be used for the PUSCH, wherein the number of repetitions is less than or equal to the maximum number of repetitions 1430 Transmit a set of PUSCH repetitions based at least in part on the number of repetitions

1510 Receive an indication of a time window over which the mobile station is to transmit repetitions of physical uplink shared channel (PUSCH) communications 1520 Transmit a set of PUSCH repetitions in the time window

1500

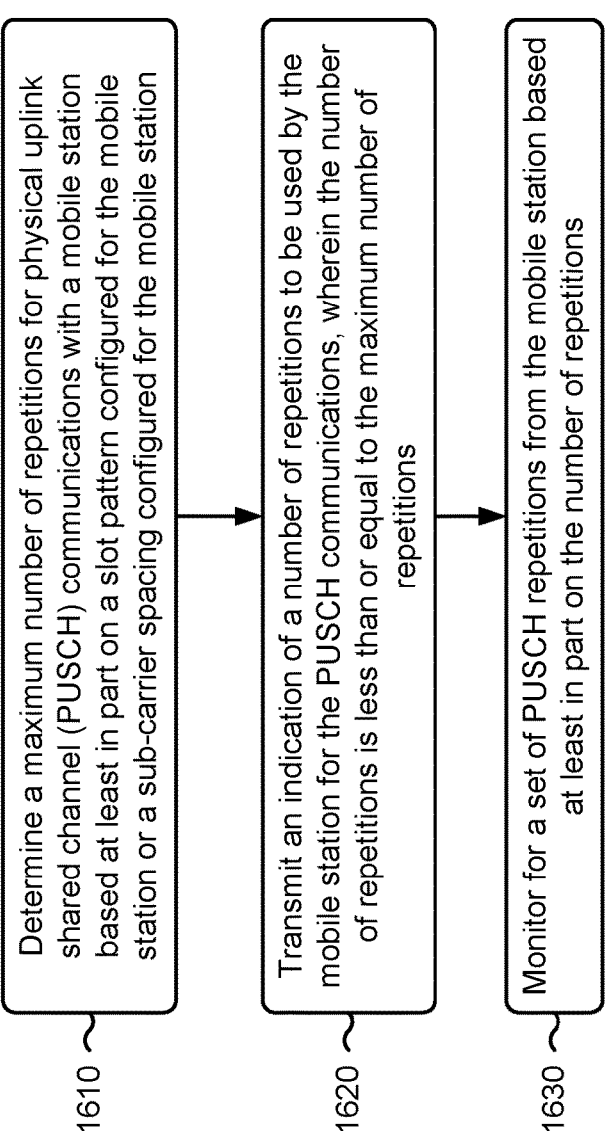

Determine a maximum number of repetitions for physical uplink shared channel (PUSCH) communications with a mobile station based at least in part on a slot pattern configured for the mobile station or a sub-carrier spacing configured for the mobile station

1610

Transmit an indication of a number of repetitions to be used by the mobile station for the PUSCH communications, wherein the number of repetitions is less than or equal to the maximum number of repetitions

1620

Monitor for a set of PUSCH repetitions from the mobile station based at least in part on the number of repetitions

1710 Transmit an indication of a time window over which a mobile station is to transmit repetitions of physical uplink shared channel (PUSCH) communications 1720 Monitor for a set of PUSCH repetitions in the time window

1700

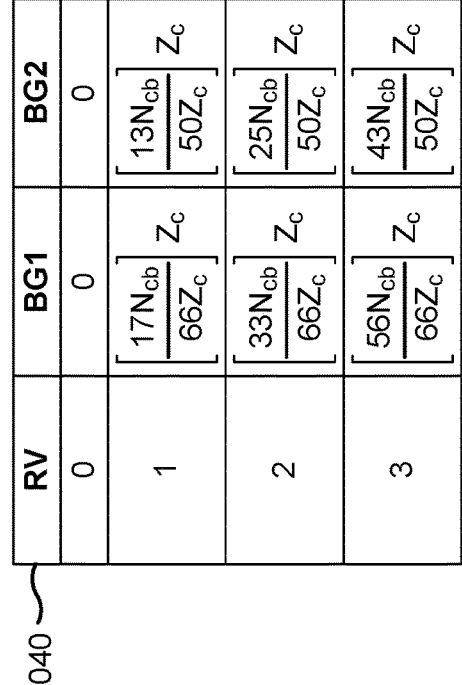

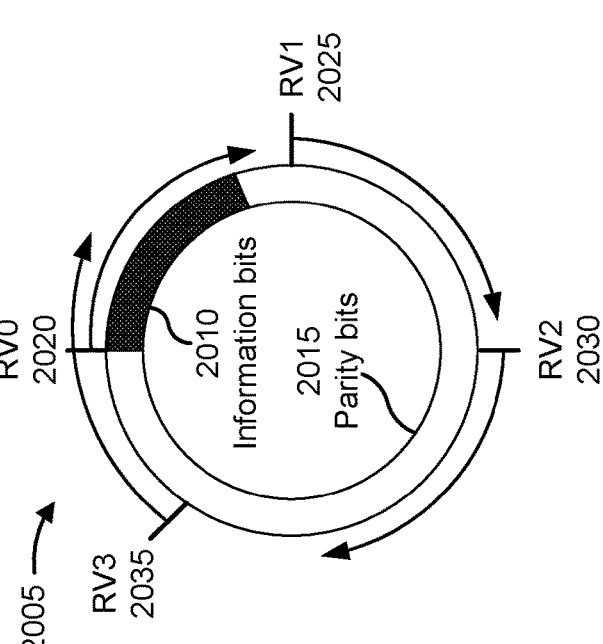

| RV | BG1 | BG2 |
|---|---|---|
| 0 | 0 | 0 |
| 1 | $\left\lceil \dfrac{17 N_{cb}}{66 Z_c} \right\rceil Z_c$ | $\left\lceil \dfrac{13 N_{cb}}{50 Z_c} \right\rceil Z_c$ |
| 2 | $\left\lceil \dfrac{33 N_{cb}}{66 Z_c} \right\rceil Z_c$ | $\left\lceil \dfrac{25 N_{cb}}{50 Z_c} \right\rceil Z_c$ |
| 3 | $\left\lceil \dfrac{56 N_{cb}}{66 Z_c} \right\rceil Z_c$ | $\left\lceil \dfrac{43 N_{cb}}{50 Z_c} \right\rceil Z_c$ |

2040

Redundancy version for PUSCH transmission

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
|---|---|---|---|---|
| | $n \bmod 4 = 0$ | $n \bmod 4 = 1$ | $n \bmod 4 = 2$ | $n \bmod 4 = 3$ |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

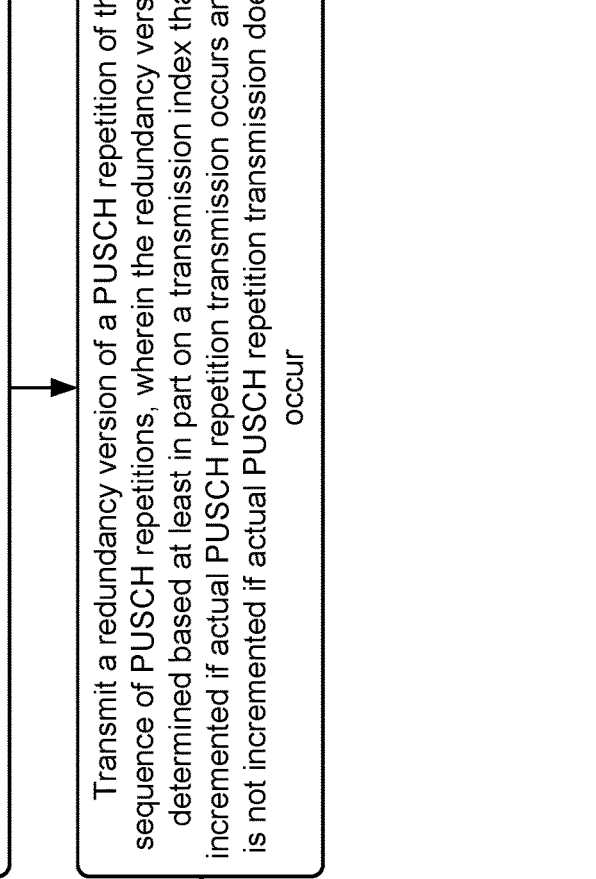

2310 — Receive a redundancy version index that indicates a sequence of redundancy versions to be applied to a corresponding sequence of physical uplink shared channel (PUSCH) repetitions 2320 — Transmit a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur

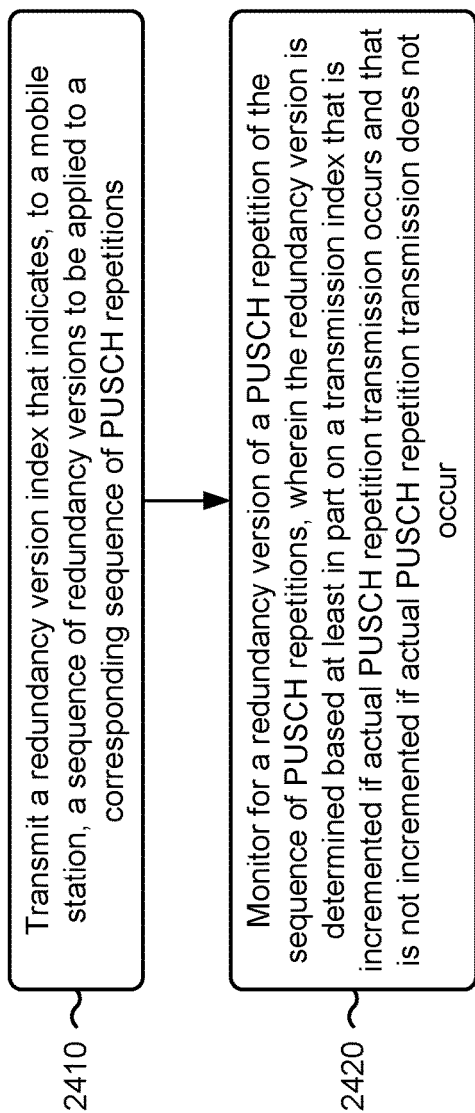

Transmit a redundancy version index that indicates, to a mobile station, a sequence of redundancy versions to be applied to a corresponding sequence of PUSCH repetitions

2410

Monitor for a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur

DETERMINATION AND COUNTING OF UPLINK REPETITIONS

CROSS-REFERENCE TO RELATED APPLICATIONS

This patent application claims priority to U.S. Provisional Patent Application No. 63/094,563, filed on Oct. 21, 2020, entitled "DETERMINATION AND COUNTING OF UPLINK REPETITIONS," and assigned to the assignee hereof. This patent application also claims priority to U.S. Provisional Patent Application No. 63/141,854, filed on Jan. 26, 2021, entitled "SIGNALING OF A MAXIMUM NUMBER OF TRANSMISSION REPETITIONS DEPENDING ON A SLOT PATTERN OR A SUB-CARRIER SPACING," and assigned to the assignee hereof. This patent application also claims priority to U.S. Provisional Patent Application No. 63/199,807, filed on Jan. 26, 2021, entitled "REDUNDANCY VERSION CYCLING BASED ON ACTUAL PHYSICAL UPLINK SHARED CHANNEL REPETITION TRANSMISSIONS," and assigned to the assignee hereof. The disclosures of the prior applications are considered part of and are incorporated by reference into this patent application.

FIELD OF THE DISCLOSURE

Aspects of the present disclosure generally relate to wireless communication and to techniques and apparatuses for determination and counting of uplink repetitions.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a mobile station includes receiving, by the mobile station, a configuration that indicates a number of nominal repetitions associated with an uplink repetition type that does not permit uplink transmission occasions to cross a slot boundary and that permits only one uplink transmission occasion per slot; transmitting, by the mobile station, an actual repetition of the uplink repetition type in a transmission occasion based at least in part on a determination that the transmission occasion has resources available for the actual repetition, wherein the transmission occasion is a slot; and terminating, by the mobile station, transmission of actual repetitions of the uplink repetition type when a number of actual repetitions equals the number of nominal repetitions.

In some aspects, a method of wireless communication performed by a base station includes transmitting, by the base station and to a mobile station, a configuration that indicates a number of nominal repetitions associated with an uplink repetition type that does not permit uplink transmission occasions to cross a slot boundary and that permits only one uplink transmission occasion per slot; monitoring, by the base station, for an actual repetition of the uplink repetition type in a transmission occasion, based at least in part on a determination that the transmission occasion has resources available for the actual repetition, wherein the transmission occasion is a slot; and terminating, by the base station, monitoring for transmission of actual repetitions of the uplink repetition type when a number of actual repetitions equals the number of nominal repetitions.

In some aspects, a mobile station for wireless communication includes a memory and one or more processors coupled to the memory and configured to, based in part on information stored in the memory: receive a configuration that indicates a number of nominal repetitions associated with an uplink repetition type that does not permit uplink transmission occasions to cross a slot boundary and that permits only one uplink transmission occasion per slot; transmit an actual repetition of the uplink repetition type in a transmission occasion based at least in part on a determination that the transmission occasion has resources available for the actual repetition, wherein the transmission occasion is a slot; and terminate transmission of actual repetitions of the uplink repetition type when a number of actual repetitions equals the number of nominal repetitions.

In some aspects, a base station for wireless communication includes a memory and one or more processors coupled to the memory and configured to, based in part on information stored in the memory: transmit, to a mobile station, a configuration that indicates a number of nominal repetitions associated with an uplink repetition type that does not permit uplink transmission occasions to cross a slot boundary and that permits only one uplink transmission occasion per slot; monitor for an actual repetition of the uplink repetition type in a transmission occasion, based at least in part on a determination that the transmission occasion has resources available for the actual repetition, wherein the transmission occasion is a slot; and terminate monitoring for transmission of actual repetitions of the uplink repetition type when a number of actual repetitions equals the number of nominal repetitions.

In some aspects, a non-transitory computer-readable medium storing a set of instructions for wireless communication includes one or more instructions that, when executed by one or more processors of a mobile station, cause the mobile station to: receive a configuration that indicates a number of nominal repetitions associated with an uplink repetition type that does not permit uplink transmission occasions to cross a slot boundary and that permits only one uplink transmission occasion per slot; transmit an actual repetition of the uplink repetition type in a transmission occasion based at least in part on a determination that the transmission occasion has resources available for the actual repetition, wherein the transmission occasion is a slot; and terminate transmission of actual repetitions of the uplink repetition type when a number of actual repetitions equals the number of nominal repetitions.

In some aspects, a non-transitory computer-readable medium storing a set of instructions for wireless communication includes one or more instructions that, when executed by one or more processors of a base station, cause the base station to: transmit, to a mobile station, a configuration that indicates a number of nominal repetitions associated with an uplink repetition type that does not permit uplink transmission occasions to cross a slot boundary and that permits only one uplink transmission occasion per slot; monitor for an actual repetition of the uplink repetition type in a transmission occasion, based at least in part on a determination that the transmission occasion has resources available for the actual repetition, wherein the transmission occasion is a slot; and terminate monitoring for transmission of actual repetitions of the uplink repetition type when a number of actual repetitions equals the number of nominal repetitions.

In some aspects, an apparatus for wireless communication includes means for receiving a configuration that indicates a number of nominal repetitions associated with an uplink repetition type that does not permit uplink transmission occasions to cross a slot boundary and that permits only one uplink transmission occasion per slot; means for transmitting an actual repetition of the uplink repetition type in a transmission occasion based at least in part on a determination that the transmission occasion has resources available for the actual repetition, wherein the transmission occasion is a slot; and means for terminating transmission of actual repetitions of the uplink repetition type when a number of actual repetitions equals the number of nominal repetitions.

In some aspects, an apparatus for wireless communication includes means for transmitting, to a mobile station, a configuration that indicates a number of nominal repetitions associated with an uplink repetition type that does not permit uplink transmission occasions to cross a slot boundary and that permits only one uplink transmission occasion per slot; means for monitoring for an actual repetition of the uplink repetition type in a transmission occasion, based at least in part on a determination that the transmission occasion has resources available for the actual repetition, wherein the transmission occasion is a slot; and means for terminating monitoring for transmission of actual repetitions of the uplink repetition type when a number of actual repetitions equals the number of nominal repetitions.

In some aspects, a method of wireless communication performed by a mobile station includes determining, by the mobile station, a maximum number of repetitions for a physical uplink shared channel (PUSCH) based at least in part on a slot pattern configured for the mobile station or a sub-carrier spacing configured for the mobile station; receiving, by the mobile station, an indication of a number of repetitions to be used for the PUSCH, wherein the number of repetitions is less than or equal to the maximum number of repetitions; and transmitting, by the mobile station, a set of PUSCH repetitions based at least in part on the number of repetitions.

In some aspects, a method of wireless communication performed by a mobile station includes receiving, by the mobile station, an indication of a time window over which the mobile station is to transmit repetitions of PUSCH communications; and transmitting, by the mobile station, a set of PUSCH repetitions in the time window.

In some aspects, a method of wireless communication performed by a base station includes determining, by the base station, a maximum number of repetitions for PUSCH communications with a mobile station based at least in part on a slot pattern configured for the mobile station or a sub-carrier spacing configured for the mobile station; transmitting, by the base station, an indication of a number of repetitions to be used by the mobile station for the PUSCH communications, wherein the number of repetitions is less than or equal to the maximum number of repetitions; and monitoring, by the base station, for a set of PUSCH repetitions from the mobile station based at least in part on the number of repetitions.

In some aspects, a method of wireless communication performed by a base station includes transmitting, by the base station, an indication of a time window over which a mobile station is to transmit repetitions of PUSCH communications; and monitoring, by the base station, for a set of PUSCH repetitions in the time window.

In some aspects, a mobile station for wireless communication includes a memory; and one or more processors coupled to the memory and configured to, based in part on information stored in the memory: determine a maximum number of repetitions for a PUSCH based at least in part on a slot pattern configured for the mobile station or a sub-carrier spacing configured for the mobile station; receive an indication of a number of repetitions to be used for the PUSCH, wherein the number of repetitions is less than or equal to the maximum number of repetitions; and transmit a set of PUSCH repetitions based at least in part on the number of repetitions.

In some aspects, a mobile station for wireless communication includes a memory; and one or more processors coupled to the memory and configured to, based in part on information stored in the memory: receive an indication of a time window over which the mobile station is to transmit repetitions of PUSCH communications; and transmit a set of PUSCH repetitions in the time window.

In some aspects, a base station for wireless communication includes a memory; and one or more processors coupled to the memory and configured to, based in part on information stored in the memory: determine a maximum number of repetitions for PUSCH communications with a mobile station based at least in part on a slot pattern configured for the mobile station or a sub-carrier spacing configured for the mobile station; transmit an indication of a number of repetitions to be used by the mobile station for the PUSCH communications, wherein the number of repetitions is less than or equal to the maximum number of repetitions; and monitor for a set of PUSCH repetitions from the mobile station based at least in part on the number of repetitions.

In some aspects, a base station for wireless communication includes a memory; and one or more processors coupled to the memory and configured to, based in part on information stored in the memory: transmit an indication of a time window over which a mobile station is to transmit repetitions of PUSCH communications; and monitor for a set of PUSCH repetitions in the time window.

In some aspects, a non-transitory computer-readable medium storing a set of instructions for wireless communication includes one or more instructions that, when executed by one or more processors of a mobile station, cause the mobile station to: determine a maximum number of repetitions for a PUSCH based at least in part on a slot pattern configured for the mobile station or a sub-carrier spacing configured for the mobile station; receive an indication of a number of repetitions to be used for the PUSCH, wherein the number of repetitions is less than or equal to the maximum number of repetitions; and transmit a set of PUSCH repetitions based at least in part on the number of repetitions.

In some aspects, a non-transitory computer-readable medium storing a set of instructions for wireless communication includes one or more instructions that, when executed by one or more processors of a mobile station, cause the mobile station to: receive an indication of a time window over which the mobile station is to transmit repetitions of PUSCH communications; and transmit a set of PUSCH repetitions in the time window.

In some aspects, a non-transitory computer-readable medium storing a set of instructions for wireless communication includes one or more instructions that, when executed by one or more processors of a base station, cause the base station to: determine a maximum number of repetitions for PUSCH communications with a mobile station based at least in part on a slot pattern configured for the mobile station or a sub-carrier spacing configured for the mobile station; transmit an indication of a number of repetitions to be used by the mobile station for the PUSCH communications, wherein the number of repetitions is less than or equal to the maximum number of repetitions; and monitor for a set of PUSCH repetitions from the mobile station based at least in part on the number of repetitions.

In some aspects, a non-transitory computer-readable medium storing a set of instructions for wireless communication includes one or more instructions that, when executed by one or more processors of a base station, cause the base station to: transmit an indication of a time window over which a mobile station is to transmit repetitions of PUSCH communications; and monitor for a set of PUSCH repetitions in the time window.

In some aspects, an apparatus for wireless communication includes means for determining a maximum number of repetitions for a PUSCH based at least in part on a slot pattern configured for the apparatus or a sub-carrier spacing configured for the apparatus; means for receiving an indication of a number of repetitions to be used for the PUSCH, wherein the number of repetitions is less than or equal to the maximum number of repetitions; and means for transmitting a set of PUSCH repetitions based at least in part on the number of repetitions.

In some aspects, an apparatus for wireless communication includes means for receiving an indication of a time window over which the apparatus is to transmit repetitions of PUSCH communications; and means for transmitting a set of PUSCH repetitions in the time window.

In some aspects, an apparatus for wireless communication includes means for determining a maximum number of repetitions for PUSCH communications with a mobile station based at least in part on a slot pattern configured for the mobile station or a sub-carrier spacing configured for the mobile station; means for transmitting an indication of a number of repetitions to be used by the mobile station for the PUSCH communications, wherein the number of repetitions is less than or equal to the maximum number of repetitions; and means for monitoring for a set of PUSCH repetitions from the mobile station based at least in part on the number of repetitions.

In some aspects, an apparatus for wireless communication includes means for transmitting an indication of a time window over which a mobile station is to transmit repetitions of PUSCH communications; and means for monitoring for a set of PUSCH repetitions in the time window.

In some aspects, a method of wireless communication performed by a mobile station includes receiving, by the mobile station, a redundancy version index that indicates a sequence of redundancy versions to be applied to a corresponding sequence of PUSCH repetitions; and transmitting, by the mobile station, a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur.

In some aspects, a method of wireless communication performed by a base station includes transmitting, by the base station, a redundancy version index that indicates, to a mobile station, a sequence of redundancy versions to be applied to a corresponding sequence of PUSCH repetitions; and monitoring, by the base station, for a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur.

In some aspects, a mobile station for wireless communication includes a memory and one or more processors coupled to the memory and configured to, based in part on information stored in the memory: receive a redundancy version index that indicates a sequence of redundancy versions to be applied to a corresponding sequence of PUSCH repetitions; and transmit a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur.

In some aspects, a base station for wireless communication includes a memory and one or more processors coupled to the memory and configured to, based in part on information stored in the memory: transmit a redundancy version index that indicates, to a mobile station, a sequence of redundancy versions to be applied to a corresponding sequence of PUSCH repetitions; and monitor for a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur.

In some aspects, a non-transitory computer-readable medium storing a set of instructions for wireless communication includes one or more instructions that, when executed by one or more processors of a mobile station, cause the mobile station to: receive a redundancy version index that indicates a sequence of redundancy versions to be applied to a corresponding sequence of PUSCH repetitions; and transmit a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur.

In some aspects, a non-transitory computer-readable medium storing a set of instructions for wireless communication includes one or more instructions that, when executed by one or more processors of a base station, cause the base station to: transmit a redundancy version index that indicates, to a mobile station, a sequence of redundancy versions to be applied to a corresponding sequence of PUSCH repetitions; and monitor for a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur.

In some aspects, an apparatus for wireless communication includes means for receiving a redundancy version index that indicates a sequence of redundancy versions to be applied to a corresponding sequence of PUSCH repetitions; and means for transmitting a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur.

In some aspects, an apparatus for wireless communication includes means for transmitting a redundancy version index that indicates, to a mobile station, a sequence of redundancy versions to be applied to a corresponding sequence of PUSCH repetitions; and means for monitoring for a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7 and 8 are diagrams illustrating example processes associated with determination and counting of uplink repetitions, in accordance with the present disclosure.

FIGS. 14-17 are diagrams illustrating example processes described herein, in accordance with the present disclosure.

FIGS. 20 and 21 are diagrams illustrating examples of redundancy version cycling based on uplink transmission occasions, in accordance with the present disclosure.

FIGS. 23 and 24 are diagrams illustrating example processes associated with redundancy version cycling based on actual PUSCH repetition transmissions, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
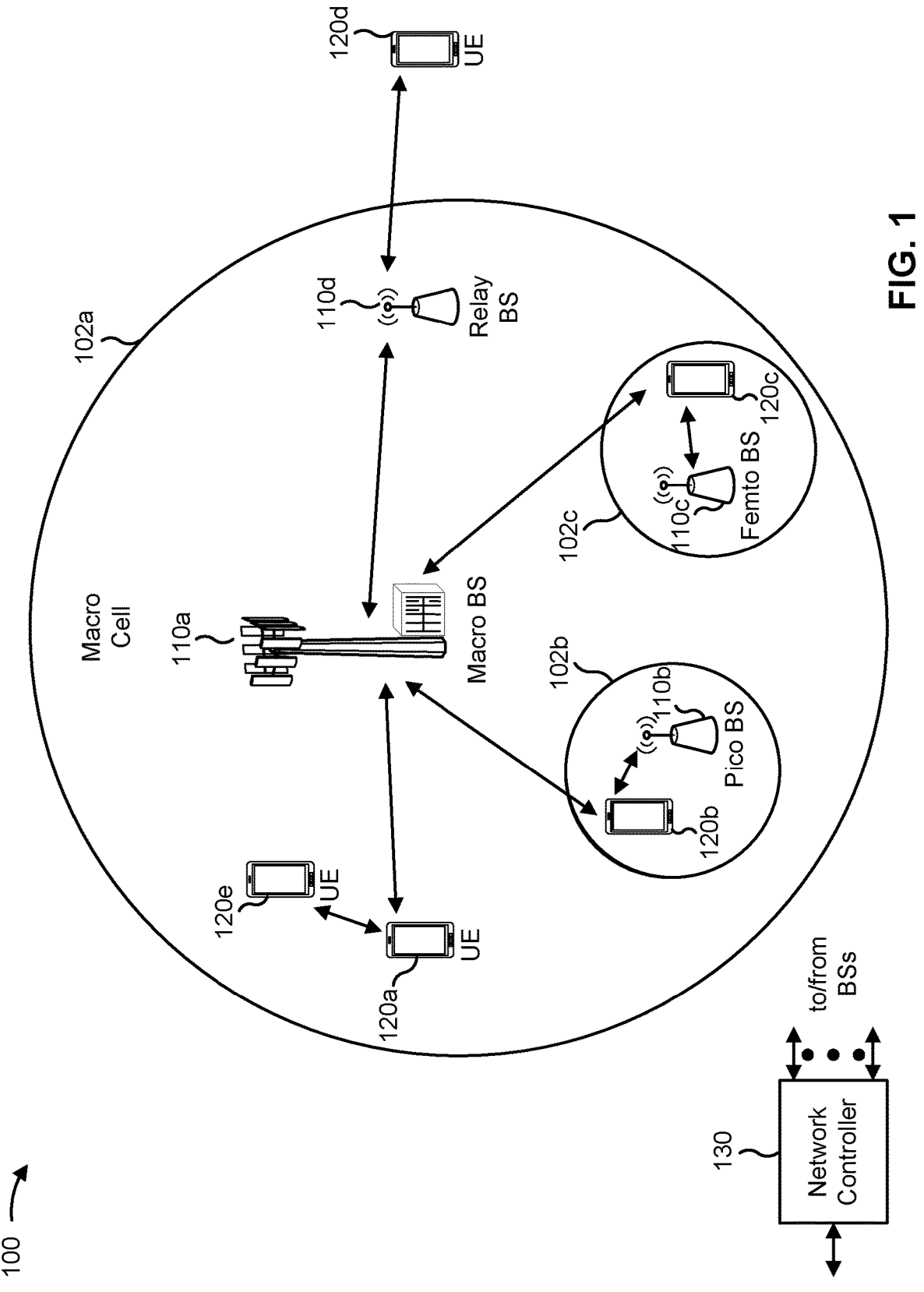
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
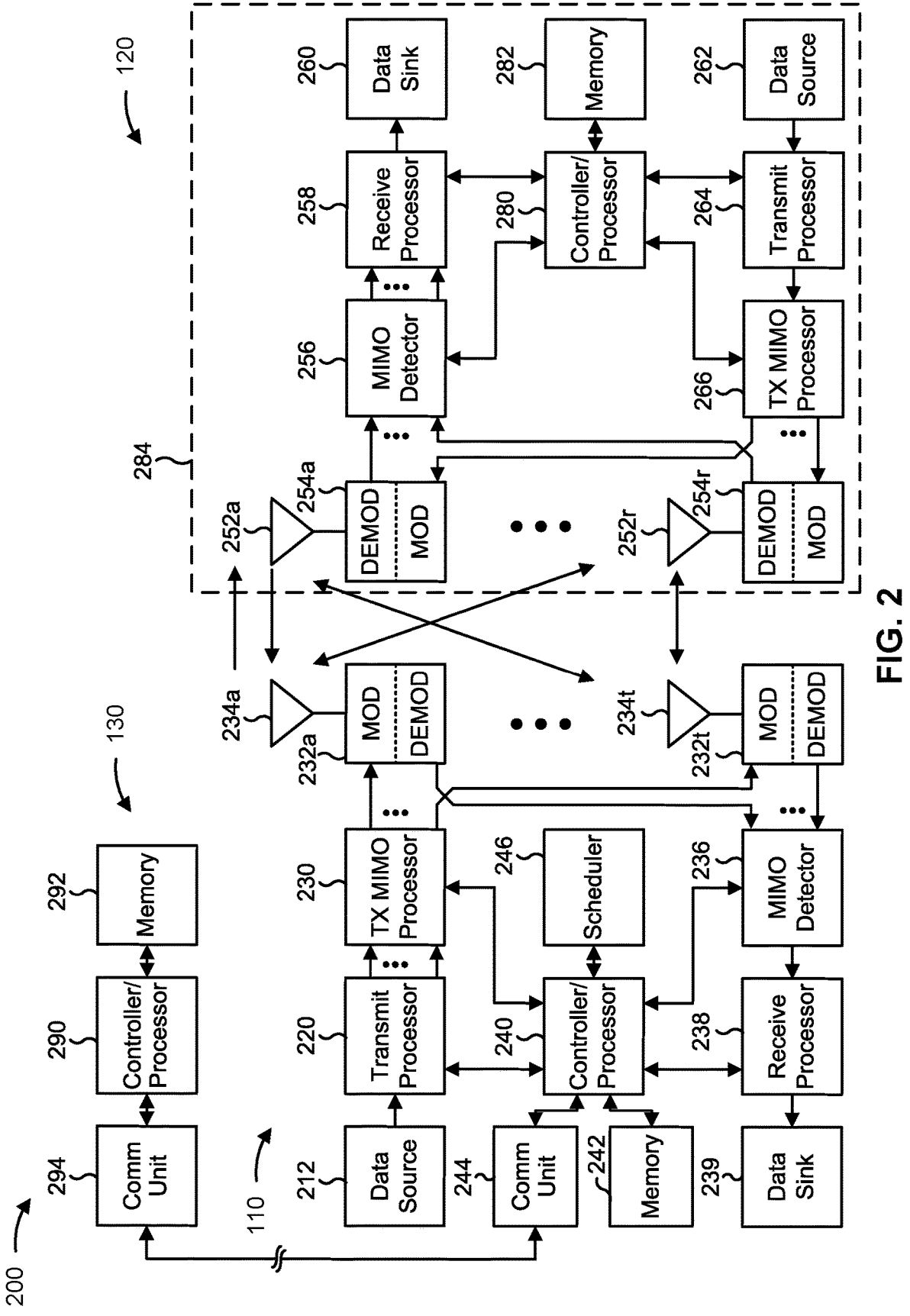
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-10, 12-19, and/or 22-26).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-10, 12-19, and/or 22-26).

Controller/processor 240 of base station 110, controller/processor 280 of UE 120, and/or any other component(s) of FIG. 2 may perform one or more techniques associated with determination and counting of uplink repetitions, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 1400 of FIG. 14, process 1500 of FIG. 15, process 1600 of FIG. 16, process 1700 of FIG. 17, process 2300 of FIG. 23, process 2400 of FIG. 24, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7, process 800 of FIG. 8, process 1400 of FIG. 14, process 1500 of FIG. 15, process 1600 of FIG. 16, process 1700 of FIG. 17, process 2300 of FIG. 23, process 2400 of FIG. 24, and/or other processes as described herein. In some aspects, executing instructions may include running the instructions, converting the instructions, compiling the instructions, interpreting the instructions, and/or the like.

In some aspects, a mobile station (e.g., the UE 120) includes means for receiving, by the mobile station, a configuration that indicates a number of nominal repetitions associated with an uplink repetition type that does not permit uplink transmission occasions to cross a slot boundary and that permits only one uplink transmission occasion per slot; means for transmitting, by the mobile station, an actual repetition of the uplink repetition type in a transmission occasion based at least in part on a determination that the transmission occasion has resources available for the actual repetition, wherein the transmission occasion is a slot; and/or means for terminating, by the mobile station, transmission of actual repetitions of the uplink repetition type when a number of actual repetitions equals the number of nominal repetitions. The means for the mobile station to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the mobile station includes means for receiving an indication of one or more conditions associated with transmitting the partial transmission; and/or means for determining that the transmission occasion has resources available for the partial transmission based at least in part on a determination that the one or more conditions are satisfied.

In some aspects, the mobile station includes means for receiving an indication of a symbol pattern associated with transmitting the partial transmission, wherein the symbol pattern indicates one or more symbols of the actual repetition that are required to be transmitted in the partial transmission; and/or means for determining that the transmission occasion has resources available for the partial transmission based at least in part on the symbol pattern.

In some aspects, the mobile station includes means for receiving an indication to cancel transmission in one or more symbols of the transmission occasion, wherein the indication is received at a time, prior to the transmission occasion, that satisfies a processing time threshold associated with the mobile station; means for determining that the transmission occasion satisfies a condition with respect to resources available for a partial transmission of the actual repetition based at least in part on one or more resources available in the transmission occasion after cancellation of transmission in the one or more symbols; and/or means for transmitting the actual repetition based at least in part on determining that the transmission occasion satisfies the condition.

In some aspects, the mobile station includes means for receiving an indication to cancel transmission in one or more symbols of the transmission occasion, wherein the indication is received at a time, prior to the transmission occasion, that does not satisfy a processing time threshold associated with the mobile station; means for determining, after transmitting the actual repetition, that the transmission occasion satisfies a condition with respect to resources available for a partial transmission of the actual repetition, based at least in part on one or more resources available in the transmission occasion after cancellation of transmission in the one or more symbols; and/or means for incrementing a repetition counter that counts toward the number of actual repetitions based at least in part on determining that the transmission occasion satisfies the condition.

In some aspects, the mobile station includes means for receiving an indication to cancel transmission in one or more symbols of the transmission occasion, wherein the indication is received at a time, prior to the transmission occasion, that does not satisfy a processing time threshold associated with the mobile station; means for determining, after transmitting the actual repetition, that the transmission occasion does not satisfy a condition with respect to resources available for a partial transmission of the actual repetition, based at least in part on one or more resources available in the transmission occasion after cancellation of transmission in the one or more symbols; and/or means for refraining from counting the actual repetition toward the number of actual repetitions based at least in part on determining that the transmission occasion does not satisfy the condition.

In some aspects, the mobile station includes means for receiving an indication to cancel transmission in one or more symbols of the transmission occasion, wherein the indication is received at a time, prior to the transmission occasion, that does not satisfy a processing time threshold associated with the mobile station; means for determining, after transmitting the actual repetition, that the transmission occasion does not satisfy a condition with respect to resources available for a partial transmission of the actual repetition, based at least in part on one or more resources available in the transmission occasion after cancellation of transmission in the one or more symbols; and/or means for incrementing a repetition counter that counts toward the number of actual repetitions despite determining that the transmission occasion does not satisfy the condition.

In some aspects, the base station includes means for transmitting, by the base station and to a mobile station, a configuration that indicates a number of nominal repetitions associated with an uplink repetition type that does not permit uplink transmission occasions to cross a slot boundary and that permits only one uplink transmission occasion per slot; means for monitoring, by the base station, for an actual repetition of the uplink repetition type in a transmission occasion, based at least in part on a determination that the transmission occasion has resources available for the actual repetition, wherein the transmission occasion is a slot; and/or means for terminating, by the base station, monitoring for transmission of actual repetitions of the uplink repetition type when a number of actual repetitions equals the number of nominal repetitions. The means for the base station to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the base station includes means for transmitting an indication of one or more conditions associated with transmitting the partial transmission; and/or means for determining that the transmission occasion has resources available for the partial transmission based at least in part on a determination that the one or more conditions are satisfied.

In some aspects, the base station includes means for transmitting an indication of a symbol pattern associated with transmitting the partial transmission, wherein the symbol pattern indicates one or more symbols of the actual repetition that are required to be transmitted in the partial transmission; and/or means for determining that the transmission occasion has resources available for the partial transmission based at least in part on the symbol pattern.

In some aspects, the base station includes means for transmitting an indication to cancel transmission in one or more symbols of the transmission occasion, wherein the indication is transmitted at a time, prior to the transmission occasion, that satisfies a processing time threshold associated with the mobile station; means for determining that the transmission occasion satisfies a condition with respect to resources available for a partial transmission of the actual repetition based at least in part on one or more resources available in the transmission occasion after cancellation of transmission in the one or more symbols; and/or means for monitoring for the actual repetition based at least in part on determining that the transmission occasion satisfies the condition.

In some aspects, the base station includes means for transmitting an indication to cancel transmission in one or more symbols of the transmission occasion, wherein the indication is transmitted at a time, prior to the transmission occasion, that does not satisfy a processing time threshold associated with the mobile station; means for determining that the transmission occasion satisfies a condition with respect to resources available for a partial transmission of the actual repetition, based at least in part on one or more resources available in the transmission occasion after cancellation of transmission in the one or more symbols; and/or means for incrementing a repetition counter that counts toward the number of actual repetitions based at least in part on determining that the transmission occasion satisfies the condition.

In some aspects, the base station includes means for transmitting an indication to cancel transmission in one or more symbols of the transmission occasion, wherein the indication is transmitted at a time, prior to the transmission occasion, that does not satisfy a processing time threshold associated with the mobile station; means for determining that the transmission occasion does not satisfy a condition with respect to resources available for a partial transmission of the actual repetition, based at least in part on one or more resources available in the transmission occasion after cancellation of transmission in the one or more symbols; and/or means for refraining from counting the actual repetition toward the number of actual repetitions based at least in part on determining that the transmission occasion does not satisfy the condition.

In some aspects, the base station includes means for transmitting an indication to cancel transmission in one or more symbols of the transmission occasion, wherein the indication is transmitted at a time, prior to the transmission occasion, that does not satisfy a processing time threshold associated with the mobile station; means for determining that the transmission occasion does not satisfy a condition with respect to resources available for a partial transmission of the actual repetition, based at least in part on one or more resources available in the transmission occasion after cancellation of transmission in the one or more symbols; and/or means for incrementing a repetition counter that counts toward the number of actual repetitions despite determining that the transmission occasion does not satisfy the condition.

In some aspects, the mobile station includes means for determining, by the mobile station, a maximum number of repetitions for a physical uplink shared channel (PUSCH) based at least in part on a slot pattern configured for the mobile station or a sub-carrier spacing configured for the mobile station; means for receiving, by the mobile station, an indication of a number of repetitions to be used for the PUSCH, wherein the number of repetitions is less than or equal to the maximum number of repetitions; or means for transmitting, by the mobile station, a set of PUSCH repetitions based at least in part on the number of repetitions. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the mobile station includes means for receiving, by the mobile station, an indication of a time window over which the mobile station is to transmit repetitions of PUSCH communications; or means for transmitting, by the mobile station, a set of PUSCH repetitions in the time window. In some aspects, the means for the mobile station to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for determining, by the base station, a maximum number of repetitions for PUSCH communications with a mobile station based at least in part on a slot pattern configured for the mobile station or a sub-carrier spacing configured for the mobile station; means for transmitting, by the base station, an indication of a number of repetitions to be used by the mobile station for the PUSCH communications, wherein the number of repetitions is less than or equal to the maximum number of repetitions; or means for monitoring, by the base station, for a set of PUSCH repetitions from the mobile station based at least in part on the number of repetitions. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for transmitting, by the base station, an indication of a time window over which a mobile station is to transmit repetitions of PUSCH communications; or means for monitoring, by the base station, for a set of PUSCH repetitions in the time window. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the base station includes means for determining the time window based at least in part on a slot pattern configured for the mobile station or a sub-carrier spacing configured for the mobile station.

In some aspects, the mobile station includes means for incrementing the transmission index based at least in part on determining that actual PUSCH repetition transmission occurs for a prior PUSCH repetition, of the sequence of PUSCH repetitions, that precedes the PUSCH repetition; and/or means for determining the redundancy version of the PUSCH repetition based at least in part on the incremented transmission index. In some aspects, the mobile station includes means for refraining from incrementing the transmission index based at least in part on determining that actual PUSCH repetition transmission does not occur for a prior PUSCH repetition, of the sequence of PUSCH repetitions, that precedes the PUSCH repetition; and/or means for determining the redundancy version of the PUSCH repetition based at least in part on the transmission index.

In some aspects, the base station includes means for transmitting, by the base station, a redundancy version index that indicates, to a mobile station, a sequence of redundancy versions to be applied to a corresponding sequence of PUSCH repetitions; and/or means for monitoring, by the base station, for a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the base station includes means for incrementing the transmission index based at least in part on determining that actual PUSCH repetition transmission occurs for a prior PUSCH repetition, of the sequence of PUSCH repetitions, that precedes the PUSCH repetition; and/or means for determining the redundancy version of the PUSCH repetition based at least in part on the incremented transmission index. In some aspects, the base station includes means for refraining from incrementing the transmission index based at least in part on determining that actual PUSCH repetition transmission does not occur for a prior PUSCH repetition, of the sequence of PUSCH repetitions, that precedes the PUSCH repetition; and/or means for determining the redundancy version of the PUSCH repetition based at least in part on the transmission index.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
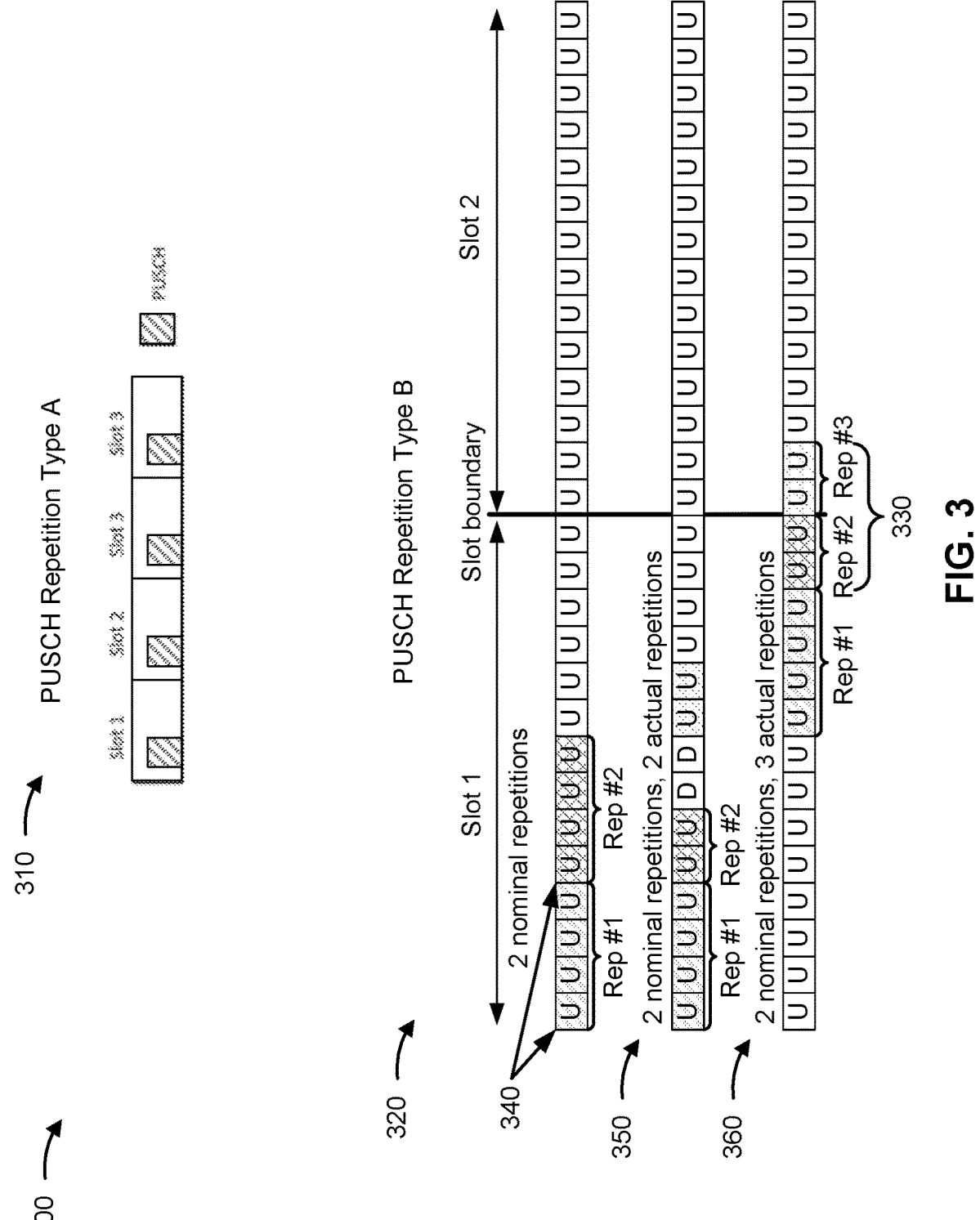
FIG. 3 is a diagram illustrating an example of physical uplink shared channel (PUSCH) Repetition Type A and PUSCH Repetition Type B, in accordance with the present disclosure.

FIG. 3 is a diagram illustrating an example 300 of physical uplink shared channel (PUSCH) Repetition Type A and PUSCH Repetition Type B, in accordance with the present disclosure. Although techniques are described herein in connection with PUSCH repetitions, these techniques can be applied to various types of uplink repetitions, such as an uplink data repetition, an uplink control repetition (e.g., a physical uplink control channel (PUCCH) repetition), or the like.

A repetition, such as an uplink repetition or a downlink repetition, may be used to improve reliability, such as for ultra reliable low latency communication (URLLC) or for UEs 120 located in a geographic area with poor channel conditions (e.g., a cell edge). When repetitions are used, a transmitter repeats transmission of a communication multiple times. For example, a UE 120 may transmit an initial uplink communication and may repeat transmission of (e.g., may retransmit) that uplink communication one or more times. When a UE 120 is configured with repetitions, the UE 120 may retransmit an initial transmission without first receiving feedback (e.g., an acknowledgement (ACK) or negative acknowledgement (NACK)) indicating whether the initial transmission was successfully received. In some aspects, ACK or NACK feedback may be disabled for repetitions, thereby reducing signaling overhead that would otherwise be used for ACK or NACK feedback.

In some aspects, a repeated transmission (sometimes referred to as a retransmission) may include the exact same encoded bits (e.g., information bits and parity bits) as the initial transmission and/or as another repeated transmission (e.g., where a same redundancy version is used across repetitions). Alternatively, a repeated transmission may include different encoded bits (e.g., a different combination of information bits and/or parity bits) than the initial transmission and/or another repeated transmission (e.g., where different redundancy versions are used across repetitions).

As used herein, the term "repetition" is used to refer to the initial communication, and is also used to refer to a repeated transmission of the initial communication. For example, if the UE 120 is configured to transmit 4 repetitions, then the UE 120 may transmit an initial transmission and may transmit 3 repeated transmissions of that initial transmission. Thus, each transmission (regardless of whether the transmission is an initial transmission or a retransmission) is counted as a repetition. A repetition may be transmitted in a transmission occasion, which is sometimes referred to as a transmission instance.

As shown by reference number 310, for a first uplink repetition type referred to as PUSCH Repetition Type A, uplink transmission occasions are not permitted to cross a slot boundary, and only one uplink transmission occasion is permitted per slot. Thus, if a UE 120 is configured with PUSCH Repetition Type A, then the UE 120 cannot transmit a repetition in a set of symbols that occurs in more than one slot, and can only transmit the repetition if all symbols of the repetition occur in the same slot. Furthermore, if a UE 120 is configured with PUSCH Repetition Type A, then the UE 120 cannot transmit more than one repetition per slot. Thus, for PUSCH Repetition Type A, a transmission occasion corresponds to a slot. Furthermore, for PUSCH Repetition Type A, the time domain allocation for a repetition within a slot may be the same across all slots for which repetitions are scheduled. In other words, each repetition, associated with the same initial transmission, may start in the same starting symbol (e.g., having the same starting symbol index) in each slot in which a repetition is scheduled, and may occupy the same number of symbols.

As shown by reference number 320, for a second uplink repetition type referred to as PUSCH Repetition Type B, uplink transmission occasions are permitted to cross a slot boundary (as shown by reference number 330, where a single nominal repetition crosses a slot boundary and is divided into two actual repetitions), and more than one uplink transmission occasion is permitted per slot (as shown by reference number 340). Thus, if a UE 120 is configured with PUSCH Repetition Type B, then the UE 120 can transmit a repetition (e.g., a nominal repetition) in a set of symbols that occurs in more than one slot, and the UE 120 can transmit the repetition even if all symbols of the repetition do not occur in the same slot. Furthermore, if a UE 120 is configured with PUSCH Repetition Type B, then the UE 120 can transmit more than one repetition per slot. Thus, for PUSCH Repetition Type B, a transmission occasion corresponds to a portion of a slot, such as a mini-slot. Furthermore, for PUSCH Repetition Type B, the time domain allocation for a repetition within a slot may be different for different repetitions. In other words, different repetitions, associated with the same initial transmission, may start in different starting symbols (e.g., having different starting symbol indexes).

In PUSCH Repetition Type B, the term "nominal repetition" refers to a potential PUSCH repetition as indicated by the base station 110. A nominal repetition signaled or scheduled by the base station 110 may be truncated or divided into one or two "actual repetitions." A nominal repetition consists of a set of consecutive symbols over which the UE 120 is expected to transmit a PUSCH repetition. However, when this set of consecutive symbols crosses a slot boundary, contains semi-static downlink symbols, or encounters (e.g., is scheduled to occur within) an invalid symbol pattern, among other examples, then the UE 120 is required to split the nominal repetition into one or two parts. Each of these parts is then referred to as an "actual repetition."

For example, as shown by reference number 350, a PUSCH transmission may include four symbols, and a base station 110 may configure a UE 120 (e.g., in a radio resource control (RRC) message) to transmit two nominal repetitions of the PUSCH transmission. The two nominal repetitions may span a total of eight symbols and may each include four symbols. The two nominal repetitions are scheduled in the first eight symbols of a slot (shown as Slot 1). For example, the first nominal repetition may be scheduled in the first four symbols of a slot (the first, second, third, and fourth symbols), and the second nominal repetition may be scheduled in the next four symbols of the slot (the fifth, sixth, seventh, and eighth symbols). The first nominal repetition is actually transmitted in the first four symbols and is thus treated as a single actual repetition (shown as "Rep #1"). For the second nominal repetition, the UE 120 actually transmits the first two symbols but cannot transmit the last two symbols because the last two symbols are downlink symbols. Thus, the UE 120 drops the last two symbols, and the resulting actual repetition (shown as "Rep #2") includes only the first two symbols.

As another example, as shown by reference number 360, a PUSCH transmission may include four symbols, and a base station 110 may configure a UE 120 to transmit two nominal repetitions of the PUSCH transmission. The two nominal repetitions may each include four symbols, shown as the ninth, tenth, eleventh, and twelfth symbols of a first slot (Slot 1) for a first nominal repetition, and shown as the thirteenth and fourteenth symbols of the first slot plus the first and second symbols of a second slot (Slot 2) for a second nominal repetition. The first nominal repetition is transmitted in four consecutive symbols and is thus treated as a single actual repetition (shown as "Rep #1"). The second nominal repetition is transmitted in consecutive symbols that cross a slot boundary (e.g., that occur in more than one slot), and is thus divided into two actual repetitions, with a first actual repetition (shown as "Rep #2") being transmitted in a first set of consecutive symbols in the first slot (the thirteenth and fourteenth symbols of Slot 1) and a second actual repetition (shown as "Rep #3") being transmitted in a second set of consecutive symbols in the second slot (the first and second symbols of Slot 2).

As indicated above, FIG. 3 is provided as an example. Other examples may differ from what is described with respect to FIG. 3.

Figure 4:
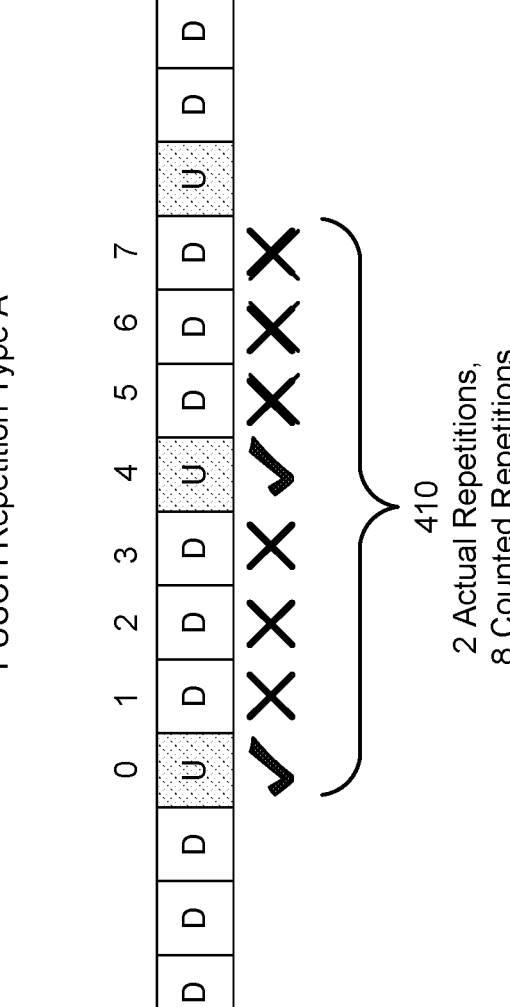
FIG. 4 is a diagram illustrating an example of PUSCH Repetition Type A, in accordance with the present disclosure.

FIG. 4 is a diagram illustrating an example 400 of PUSCH Repetition Type A, in accordance with the present disclosure. FIG. 4 shows an example of counting repetitions for PUSCH Repetition Type A.

In example 400, a time-division duplexing (TDD) slot pattern for communication between a UE 120 and a base station 110 is shown as 3 downlink (D) slots, followed by 1 uplink (U) slot, followed by 3 downlink slots, followed by 1 uplink slot, followed by 3 downlink slots, followed by 1 uplink slot, followed by 2 downlink slots. An uplink slot may be used for uplink communication (and not for downlink communication), and a downlink slot may be used for downlink communication (and not for uplink communication). This is an example TDD slot pattern, and other examples may differ from this TDD slot pattern.

In example 400, a UE 120 is configured with 8 repetitions for PUSCH Repetition Type A. For example, a base station 110 may transmit, to the UE 120, a configuration message (e.g., an RRC message) and/or downlink control information (DCI) (e.g., an uplink grant) that instructs the UE 120 to transmit 8 repetitions (e.g., for PUSCH Repetition Type A, which may also be configured for the UE 120). The configuration message and/or the DCI may include a repetition parameter (e.g., RepK) that indicates the number of repetitions. The configuration message (e.g., for configured grant communications) and/or the DCI (e.g., for dynamic grant communications) may schedule an initial uplink transmission in a slot shown as slot 0, which is an uplink slot.

For PUSCH Repetition Type A, when counting a number of repetitions, the UE 120 and the base station 110 may count consecutive slots, starting with the slot scheduled with the initial uplink transmission, regardless of whether the UE 120 is capable of actually transmitting a repetition in each of those slots. For example, as shown by reference number 410, the UE 120 may transmit a first repetition (e.g., an initial uplink communication) in slot 0 (an uplink slot), may be unable to transmit repetitions in slots 1, 2, and 3 (downlink slots), may transmit a second repetition (e.g., a retransmission or repeated transmission) in slot 4 (an uplink slot), and may be unable to transmit repetitions in slots 5, 6, and 7 (downlink slots). However, the UE 120 and the base station 110 may count the downlink slots 1, 2, 3, 5, 6, and 7 toward the number of repetitions (e.g., the 8 indicated repetitions) despite the UE 120 not being able to transmit in these slots. As a result, the UE 120 terminates repetitions after slot 7 despite having only transmitted 2 repetitions, and not the indicated 8 repetitions.

Because the UE 120 transmits fewer repetitions than an indicated number of repetitions, the UE 120 is unable to achieve an intended level of reliability indicated by the base station 110. For example, the base station 110 may configure or schedule a number of repetitions based on channel conditions between the UE 120 and the base station 110 (e.g., fewer repetitions for better channel conditions and more repetitions for poorer channel conditions) to achieve a desired level of reliability. If the UE 120 does not actually transmit that number of repetitions, then the desired level of reliability may not be satisfied.

To address this issue, the base station 110 might configure or schedule a greater number of repetitions (e.g., based on the TDD pattern) to account for slots in which the UE 120 is unable to transmit (e.g., downlink slots, special slots, or switching slots). However, this would require a greater number of bits to be used to signal the number of repetitions and to be used in memory of the UE 120 and the base station 110 to count the number of repetitions. For example, the base station 110 can select between 1 repetition (e.g., only an initial transmission and no retransmissions), 2 repetitions (e.g., an initial transmission and one retransmission), 4 repetitions, and 8 repetitions using 2 bits for a repetition parameter (e.g., with bit values 00, 01, 10, and 11). To signal a greater number of repetitions, 3 bits, 4 bits, or more would need to be used for the repetition parameter, especially for TDD patterns with a small ratio of uplink slots to downlink slots. This would increase signaling overhead and consume excess network resources as compared to using a smaller number of bits for the repetition parameter (e.g., 2 bits). Furthermore, the base station 110 would need to account for the TDD pattern when signaling the number of repetitions, which increases processing at the base station 110.

Some techniques and apparatuses described herein conserve signaling overhead and improve reliability for repetitions transmitted using PUSCH Repetition Type A by using a smaller number of bits for the repetition parameter (e.g., 2 bits) and enabling the UE 120 and the base station 110 to count an actual number of transmitted repetitions rather than counting consecutive slots regardless of whether a repetition is actually transmitted in each of those slots. For example, the UE 120 may be configured with a number of repetitions, and the UE 120 (and the base station 110) may only increment a counter indicative of a number of transmitted repetitions if the UE 120 actually transmits a repetition. In this example, the UE 120 (and the base station 110) may refrain from incrementing the counter when the UE 120 has an opportunity to transmit a repetition (e.g., in a PUSCH transmission occasion) but does not actually transmit a repetition in that opportunity (e.g., because a slot changes from an uplink to a downlink slot, because a transmission is cancelled or preempted, or the like).

As indicated above, FIG. 4 is provided as an example. Other examples may differ from what is described with respect to FIG. 4.

Figure 5:
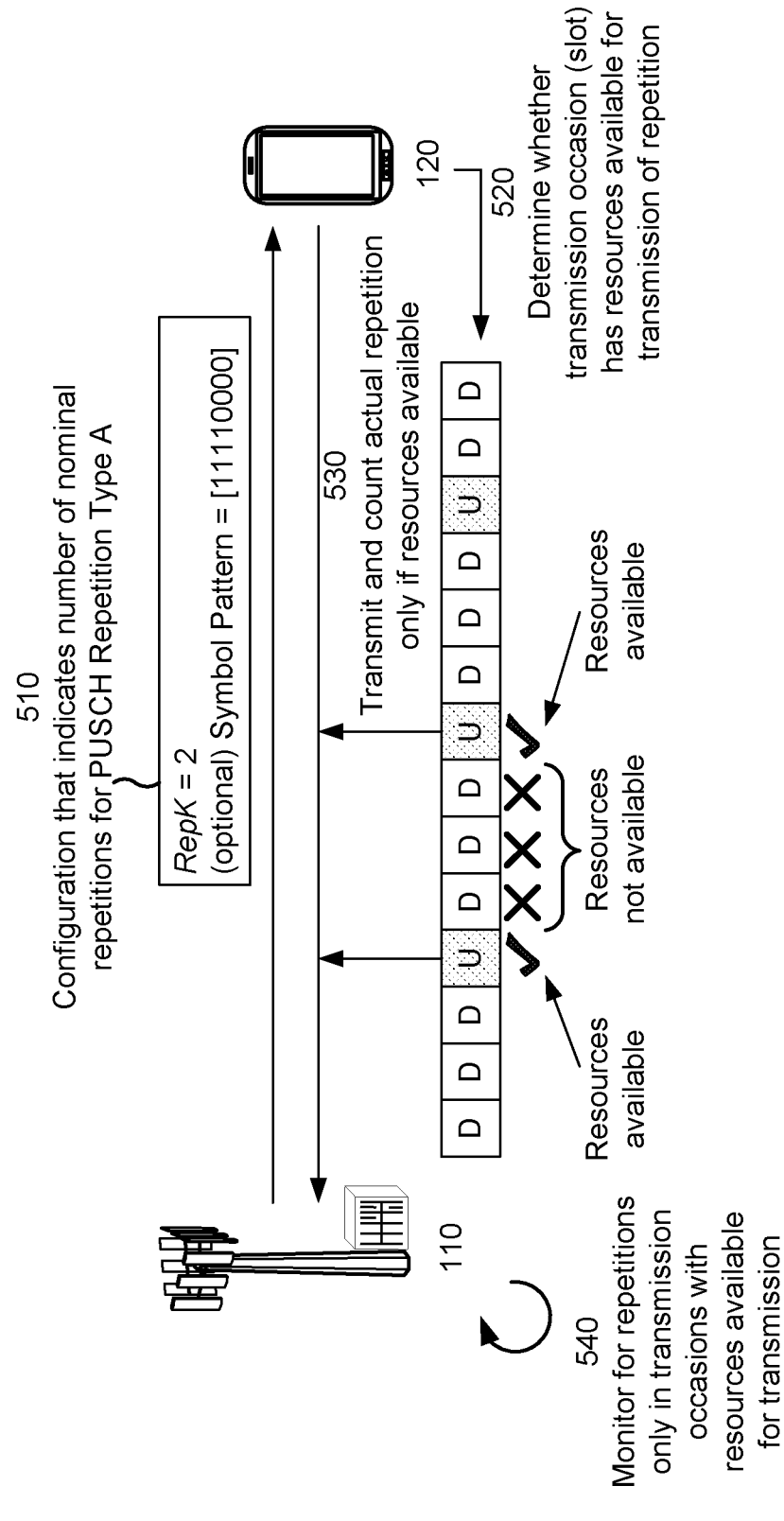
FIGS. 5 and 6 are diagrams illustrating examples associated with determination and counting of uplink repetitions, in accordance with the present disclosure.

FIG. 5 is a diagram illustrating an example 500 associated with determination and counting of uplink repetitions, in accordance with the present disclosure. As shown in FIG. 5, example 500 includes communication between a base station 110 and a UE 120. In some aspects, base station 110 and UE 120 may be included in a wireless network, such as wireless network 100. Base station 110 and UE 120 may communicate via a wireless access link, which may include an uplink and a downlink. Although some operations are described herein as being performed by a UE, these operations can also be performed by a mobile station or another type of wireless communication device.

As shown by reference number 510, the base station 110 may transmit, and the UE 120 may receive, a configuration that indicates a number of nominal repetitions associated with PUSCH Repetition Type A (e.g., an uplink repetition type that does not permit uplink transmission occasions to cross a slot boundary and that permits only one uplink transmission occasion per slot, as described above in connection with FIG. 3). In some aspects, the base station 110 transmits an indication of the number of nominal repetitions in a configuration message, such as an RRC configuration message. Additionally, or alternatively, the base station 110 may transmit an indication of the number of nominal repetitions in another type of message, such as DCI and/or a medium access control (MAC) control element (CE) (collectively, MAC-CE). The base station 110 may indicate the number of nominal repetitions using a repetition parameter, shown as RepK. In example 500, the base station 110 configures two repetitions (e.g., RepK=2).

In some aspects, each repetition, associated with the same initial transmission, may start in the same starting symbol (e.g., having the same starting symbol index) in each transmission occasion (e.g., slot) in which a repetition is scheduled. Alternatively, different repetitions, associated with the same initial transmission, may start in different starting symbols (e.g., having different starting symbol indexes) in different transmission occasions (e.g., slots).

As used herein in connection with PUSCH Repetition Type A, a "number of nominal repetitions" refers to a number of repetitions indicated by the base station 110 to the UE 120 (e.g., in an RRC message, DCI, or a MAC-CE). In some examples, the number of repetitions indicated by the base station 110 to the UE 120 may be referred to as a "number of configured repetitions," a "number of scheduled repetitions," a "number of indicated repetitions," or similar terminology.

In some aspects, the configuration may include a symbol pattern associated with transmitting a partial transmission and/or associated with determining whether to transmit and/or count a transmission in a transmission occasion. For example, the symbol pattern may indicate one or more symbols that are required to be available in a transmission occasion for the UE 120 to transmit and/or count a transmission in that transmission occasion. Additional details regarding the symbol pattern are described below.

As shown by reference number 520, the UE 120 may determine whether a transmission occasion has resources available for transmission of a repetition by the UE 120. In some aspects, a resource may be symbol. A symbol may be available for transmission by the UE 120 if, for example, the symbol is an uplink symbol (e.g., in a transmission occasion scheduled for the UE 120). A symbol may be unavailable for transmission by the UE 120 if, for example, the symbol is a downlink symbol, is a special symbol (e.g., used for switching between downlink and uplink), and/or is cancelled (e.g., by an uplink cancellation indication or another type of indication). As described elsewhere herein, for PUSCH Repetition Type A, a transmission occasion is a slot. In some aspects, the base station 110 may also determine whether a transmission occasion has resources available for transmission of a repetition by the UE 120, in the same manner or a similar manner as described herein for the UE 120. In some aspects, the configuration may indicate whether the UE 120 is to transmit only full transmissions of repetitions (and not partial repetitions) and/or whether the UE 120 is permitted to transmit partial transmissions of repetitions, as described in more detail below.

In some aspects, the UE 120 may determine whether a transmission occasion has resources (e.g., symbols) available for a full transmission of a repetition. A full transmission includes all symbols of the repetition (e.g., all information bits and all parity bits). Thus, in some aspects, the UE 120 may determine whether a transmission occasion includes a number of uplink symbols that is greater than or equal to the number of symbols required to transmit the repetition. In this example, if the transmission occasion has sufficient resources available (e.g., greater than or equal to the number of required resources for full transmission), then the UE 120 may transmit the repetition in the transmission occasion, as shown by reference number 530, and/or may count the transmitted repetition as an actual repetition, such as by incrementing a repetition counter that counts the number of actual repetitions transmitted by the UE 120. Also in this example, if the transmission occasion does not have sufficient resources available (e.g., has less than the number of required resources for full transmission), then the UE 120 may refrain from transmitting the repetition in the transmission occasion and/or may refrain from incrementing the repetition counter.

Alternatively, the UE 120 may determine whether a transmission occasion has resources (e.g., symbols) available for a partial transmission of a repetition. A partial transmission consists of fewer than all symbols of the repetition. In some aspects, the UE 120 may transmit a partial repetition in a transmission occasion only if one or more conditions associated with partial repetition in the transmission occasion are satisfied. The UE 120 may store, in memory, information that identifies the one or more conditions and/or may receive an indication of the one or more conditions from the base station 110 (e.g., in a configuration message).

A condition associated with partial transmission of a repetition in a transmission occasion may include, for example, a requirement that the transmission occasion includes a threshold number of symbols, a threshold number of demodulation reference signal (DMRS) symbols, a threshold number of data symbols (e.g., PUSCH symbols), a threshold number of consecutive symbols (e.g., consecutive uplink symbols) available for the partial transmission, and/or a threshold number of consecutive symbols that include an initial symbol of the repetition (e.g., a threshold number of consecutive symbols at the beginning of the repetition, where the repetition starts at a fixed or static symbol index). In some aspects, a condition may include that the transmission occasion has the starting symbol, associated with the repetition, available for transmission of the repetition (e.g., when repetitions are required to start in the same starting symbol per slot). Alternatively, the UE 120 may be configured to permit transmission of repetitions (e.g., partial repetitions) in different starting symbols (e.g., having different starting symbol indexes) in different slots.

In some aspects, the base station 110 may indicate one or more conditions using a symbol pattern. The symbol pattern may indicate one or more symbols of a repetition that are required to be transmitted (e.g., in order for the transmission occasion to satisfy a condition). In some aspects, the symbol pattern includes a bitmap that includes multiple bits. A first value of a bit (e.g., 1) may indicate that a corresponding symbol, of the repetition, is required to be transmitted. A second value of the bit (e.g., 0) may indicate that a corresponding symbol, of the repetition, is not required to be transmitted.

For example, if the base station 110 transmits an 8-bit bitmap of [11110000], then this may indicate that the first four symbols of the repetition (corresponding to the first four bits of the bitmap, which are all ones) are required to be transmitted, and that the remaining symbols of the repetition (corresponding to the remaining bits of the bitmap, which are all zeros) are not required to be transmitted. Thus, the transmission occasion must have symbols available to transmit the first four symbols of the repetition in order for the transmission occasion to satisfy this condition.

As another example, if the base station 110 transmits an 8-bit bitmap of [01111000], then this may indicate that a minimum of four symbols of the repetition are required to be transmitted, and that any additional symbols of the repetition are not required to be transmitted. Thus, the transmission occasion must have at least four symbols available for transmission of the repetition in order for the transmission occasion to satisfy this condition.

The base station 110 may transmit the symbol pattern in a configuration message, DCI, and/or a MAC-CE, among other examples. In some aspects, if the base station 110 transmits the symbol pattern in a configuration message (e.g., an RRC message), then the symbol pattern may include a static number of bits (e.g., that does not change until a new configuration or a reconfiguration). The static number of bits may be based at least in part on, or may be equal to, the number of symbols included in a slot (e.g., 14 bits). This conserves signaling overhead as compared to transmitting the symbol pattern in DCI, but is less flexible.

In some aspects, if the base station 110 transmits the symbol pattern in DCI (e.g., an uplink grant that schedules transmission of the repetitions), then the symbol pattern may include a dynamic number of bits (e.g., that can change across different DCI messages). The dynamic number of bits included in a DCI message may be based at least in part on a number of symbols included in a repetition (e.g., a number of PUSCH symbols) scheduled by the DCI message. This is more flexible than transmitting the symbol pattern in an RRC message, but consumes more signaling overhead.

Thus, in some aspects, the UE 120 may determine whether a transmission occasion satisfies one or more conditions associated with partial transmission of a repetition in the transmission occasion. In this example, if the transmission occasion satisfies the one or more conditions (e.g., satisfies the threshold number of symbols, DMRS symbols, data symbols, consecutive symbols, and/or consecutive symbols at the beginning of the repetition), then the UE 120 may transmit the (partial) repetition in the transmission occasion, as shown by reference number 530, and/or may count the transmitted repetition as an actual repetition, such as by incrementing a repetition counter that counts the number of actual repetitions transmitted by the UE 120. Also in this example, if the transmission occasion does not satisfy the one or more conditions (e.g., does not satisfy the threshold number of symbols, DMRS symbols, data symbols, consecutive symbols, and/or consecutive symbols at the beginning of the repetition), then the UE 120 may refrain from transmitting the repetition in the transmission occasion and/or may refrain from incrementing the repetition counter.

As shown by reference number 540, the base station 110 may monitor for repetitions only in transmission occasions with resources available for transmission (e.g., full transmission or partial transmission, as described above) of a repetition by the UE 120. For example, the base station 110 may determine whether a transmission occasion has resources available for transmission of a repetition by the UE 120, in the same manner or a similar manner as described above for the UE 120. The base station 110 may monitor for a repetition in the transmission occasion and/or may count the repetition if the transmission occasion has resources available for the transmission. Conversely, the base station 110 may refrain from monitoring for a repetition in the transmission occasion and/or may refrain from counting the repetition if the transmission occasion does not have resources available for the transmission.

The UE 120 and the base station 110 may make a determination described above for each transmission occasion (e.g., in a set of consecutive transmission occasions) until the number of actual repetitions transmitted by the UE 120 is equal to the number of nominal repetitions indicated by the base station 110. When the number of actual repetitions is equal to the number of nominal repetitions (e.g., as determined by the UE 120 using a repetition counter stored in memory of the UE 120), the UE 120 may terminate transmission of repetitions. Similarly, when the number of actual repetitions is equal to the number of nominal repetitions (e.g., as determined by the base station 110 using a repetition counter stored in memory of the base station 110), the base station 110 may terminate monitoring for repetitions.

By enabling the UE 120 and the base station 110 to count an actual number of transmitted repetitions (e.g., full repetitions or partial repetitions), rather than counting consecutive slots regardless of whether a repetition is actually transmitted in each of those slots, the techniques and apparatuses described herein conserve signaling overhead (e.g., as compared to using a greater number of bits to signal a number of nominal repetitions) and improve reliability for repetitions transmitted using PUSCH Repetition Type A.

As indicated above, FIG. 5 is provided as an example. Other examples may differ from what is described with respect to FIG. 5.

Figure 6:
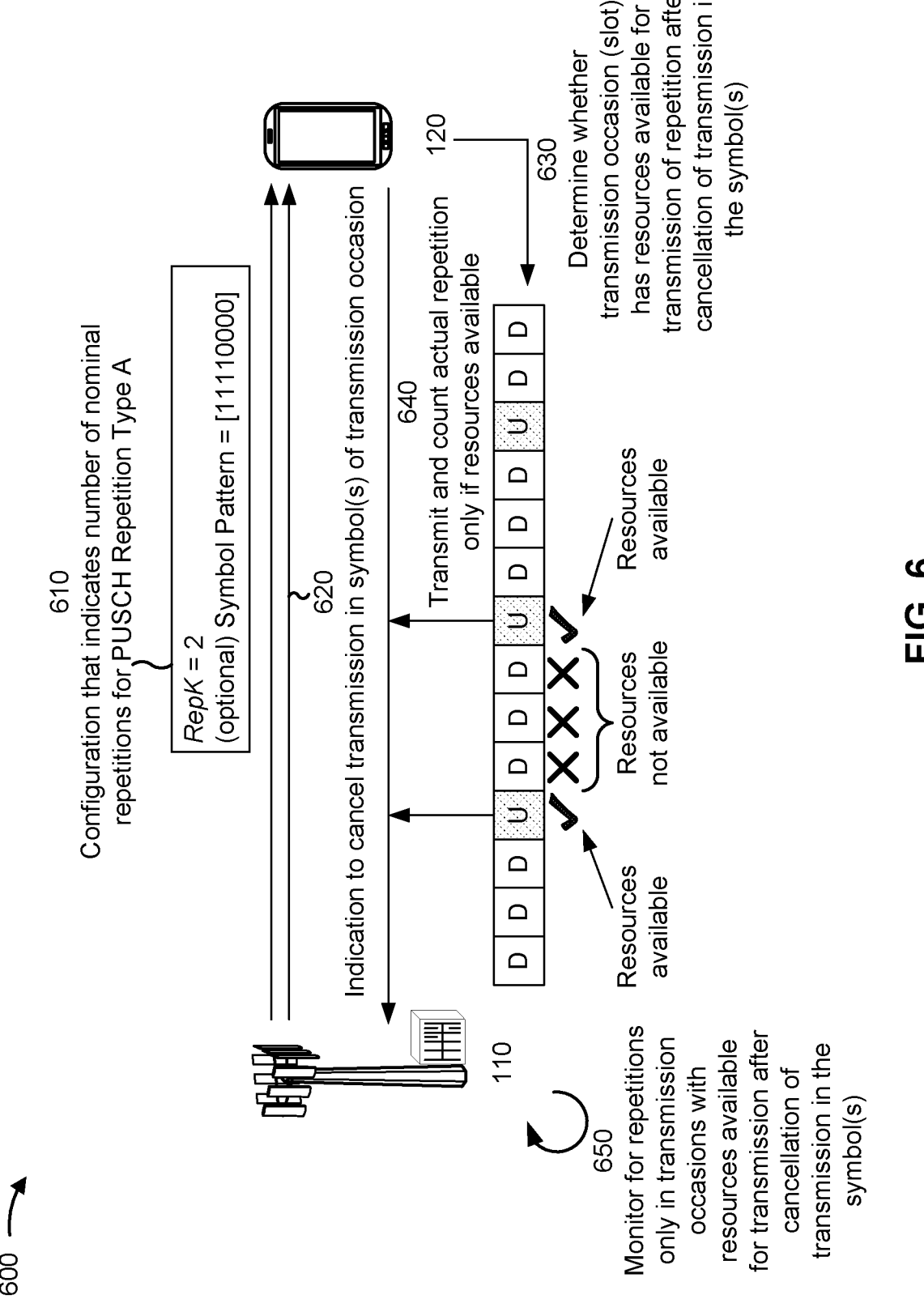

FIG. 6 is a diagram illustrating an example 600 associated with determination and counting of uplink repetitions, in accordance with the present disclosure. As shown in FIG. 6, example 600 includes communication between a base station 110 and a UE 120. In some aspects, base station 110 and UE 120 may be included in a wireless network, such as wireless network 100. Base station 110 and UE 120 may communicate via a wireless access link, which may include an uplink and a downlink.

As shown by reference number 610, the base station 110 may transmit, and the UE 120 may receive, a configuration that indicates a number of nominal repetitions associated with PUSCH Repetition Type A, as described above in connection with FIG. 5.

As shown by reference number 620, the base station 110 may transmit, and the UE 120 may receive, an indication to cancel transmission in one or more symbols of a transmission occasion. For example, the base station 110 may schedule a set of repetitions for a set of transmission occasions (e.g., using DCI for a dynamic grant uplink communication or an RRC message for a configured grant uplink communication), and may later transmit an indication to cancel transmission in one or more symbols of a transmission occasion (or multiple transmission occasions) included in the set of transmission occasions. An indication to cancel all or a portion of a previously scheduled transmission (e.g., to cancel transmission in one or more previously scheduled symbols) may be referred to as an uplink cancellation indication (ULCI). In some aspects, the base station 110 may transmit a ULCI in DCI or a MAC-CE.

As shown by reference number 630, the UE 120 may determine whether a transmission occasion has resources available for transmission of a repetition by the UE 120 after cancellation of transmission in the one or more symbols. For example, the UE 120 may perform one or more operations described above in connection with FIG. 5 to determine whether the transmission occasion has resources available for transmission of a repetition by the UE 120. In this example, the resources (e.g., the one or more symbols) that were cancelled by the ULCI are not available for transmission of a repetition by the UE 120. Thus, the UE 120 may determine whether the remaining available symbols (e.g., after accounting for the cancelled symbols) are sufficient for a full transmission or satisfy one or more conditions associated with a partial transmission, as described above in connection with FIG. 5.

In some aspects, the UE 120 may receive the ULCI at a time, prior to a transmission occasion, that satisfies a processing time threshold associated with the UE 120 (e.g., a processing time required for the UE 120 to prepare to transmit an uplink communication, such as $T_{proc,2}$). For example, the UE 120 may receive the ULCI at least a threshold number of slots prior to the transmission occasion. In this example, the UE 120 may determine whether the transmission occasion satisfies one or more conditions with respect to resources available for a partial transmission of the repetition based at least in part on one or more resources available in the transmission occasion after cancellation of transmission in the one or more symbols, as described above in connection with FIG. 5. For example, if the transmission occasion satisfies the one or more conditions (e.g., includes a threshold number of remaining symbols, remaining DMRS symbols, remaining data symbols, consecutive symbols, and/or consecutive symbols at the beginning of the repetition), then the UE 120 may transmit the (partial) repetition in the transmission occasion, as shown by reference number 640, and/or may count the transmitted repetition as an actual repetition, such as by incrementing a repetition counter that counts the number of actual repetitions transmitted by the UE 120. Also in this example, if the transmission occasion does not satisfy the one or more conditions, then the UE 120 may refrain from transmitting the repetition in the transmission occasion and/or may refrain from incrementing the repetition counter.

In some aspects, the UE 120 may receive the ULCI at a time, prior to a transmission occasion, that does not satisfy the processing time threshold associated with the UE 120. For example, the UE 120 may receive the ULCI less than a threshold number of slots prior to the transmission occasion. In this example, the UE 120 may transmit a repetition in the transmission occasion because the UE 120 does not have sufficient time to determine whether the remaining resources in the transmission occasion satisfy the one or more conditions for partial transmission. In some aspects, the UE 120 may retroactively (e.g., after the transmission occasion and/or after transmitting the repetition) determine whether the transmission occasion satisfies the condition. In some aspects, if the transmission occasion satisfies the one or more conditions with respect to remaining resources available for a partial transmission (e.g., after cancellation of transmission in the one or more symbols), then the UE 120 may count the transmitted repetition as an actual repetition, such as by incrementing a repetition counter that counts the number of actual repetitions transmitted by the UE 120. In some aspects, if the UE 120 retroactively determines that the transmission occasion does not satisfy the one or more conditions, then the UE 120 may refrain from incrementing the repetition counter despite actually transmitting the repetition (e.g., because the base station 110 will not receive the transmitted repetition). Alternatively, if the UE 120 retroactively determines that the transmission occasion does not satisfy the one or more conditions, then the UE 120 may increment the repetition counter despite the transmission occasion not satisfying the one or more conditions (e.g., because the UE 120 may not have sufficient processing time to make this determination and also transmit a subsequent repetition).

As shown by reference number 650, the base station 110 may monitor for repetitions only in transmission occasions with resources available for transmission (e.g., full transmission or partial transmission, as described above) of a repetition by the UE 120 after cancellation of transmission in the one or more symbols. For example, the base station 110 may determine whether a transmission occasion has resources available for transmission of a repetition by the UE 120 after cancellation of transmission in the one or more symbols, in the same manner or a similar manner as described above for the UE 120. The base station 110 may monitor for a repetition in the transmission occasion if the transmission occasion has resources available for the transmission after cancellation of transmission in the one or more symbols. Conversely, the base station 110 may refrain from monitoring for a repetition in the transmission occasion if the transmission occasion does not have resources available for the transmission after cancellation of transmission in the one or more symbols. The base station 110 may increment a repetition counter and/or may refrain from incrementing the repetition counter in a similar manner as described above for the UE 120.

The UE 120 and the base station 110 may make a determination described above for each transmission occasion (e.g., in a set of consecutive transmission occasions) until the number of repetitions counted by the UE 120 is equal to the number of nominal repetitions indicated by the base station 110. When the number of repetitions counted by the UE 120 is equal to the number of nominal repetitions (e.g., as determined by the UE 120 using a repetition counter stored in memory of the UE 120), the UE 120 may terminate transmission of repetitions. Similarly, when the number of repetitions counted by the base station 110 is equal to the number of nominal repetitions (e.g., as determined by the base station 110 using a repetition counter stored in memory of the base station 110), the base station 110 may terminate monitoring for repetitions.

By enabling the UE 120 and the base station 110 to count an actual number of transmitted repetitions (e.g., full repetitions or partial repetitions) that the base station 110 monitors for and/or is capable of receiving (e.g., after cancellation of transmission in one or more symbols), rather than counting consecutive slots regardless of whether a repetition is actually transmitted in each of those slots, the techniques and apparatuses described herein conserve signaling overhead (e.g., as compared to using a greater number of bits to signal a number of nominal repetitions) and improve reliability for repetitions transmitted using PUSCH Repetition Type A.

As indicated above, FIG. 6 is provided as an example. Other examples may differ from what is described with respect to FIG. 6.

FIG. 7 is a diagram illustrating an example process 700 performed, for example, by a mobile station, in accordance with the present disclosure. Example process 700 is an example where the mobile station (e.g., UE 120) performs operations associated with determination and counting of uplink repetitions.

As shown in FIG. 7, in some aspects, process 700 may include receiving a configuration that indicates a number of nominal repetitions associated with an uplink repetition type that does not permit uplink transmission occasions to cross a slot boundary and that permits only one uplink transmission occasion per slot (block 710). For example, the mobile station (e.g., using reception component 902, depicted in FIG. 9) may receive a configuration that indicates a number of nominal repetitions associated with an uplink repetition type that does not permit uplink transmission occasions to cross a slot boundary and that permits only one uplink transmission occasion per slot, as described above.

As further shown in FIG. 7, in some aspects, process 700 may include transmitting an actual repetition of the uplink repetition type in a transmission occasion based at least in part on a determination that the transmission occasion has resources available for the actual repetition, wherein the transmission occasion is a slot (block 720). For example, the mobile station (e.g., using transmission component 904, depicted in FIG. 9) may transmit an actual repetition of the uplink repetition type in a transmission occasion based at least in part on a determination that the transmission occasion has resources available for the actual repetition, as described above. In some aspects, the transmission occasion is a slot.

As further shown in FIG. 7, in some aspects, process 700 may include terminating transmission of actual repetitions of the uplink repetition type when a number of actual repetitions equals the number of nominal repetitions (block 730). For example, the mobile station (e.g., using termination component 908 and/or transmission component 904, depicted in FIG. 9) may terminate transmission of actual repetitions of the uplink repetition type when a number of actual repetitions equals the number of nominal repetitions, as described above.

Process 700 may include additional aspects, such as any single aspect or any combination of aspects described below and/or in connection with one or more other processes described elsewhere herein.

In a first aspect, the determination that the transmission occasion has resources available for the actual repetition comprises a determination that the transmission occasion has resources available for a full transmission that comprises all symbols of the actual repetition.

In a second aspect, alone or in combination with the first aspect, the determination that the transmission occasion has resources available for the actual repetition comprises a determination that the transmission occasion has resources available for a partial transmission that comprises fewer than all symbols of the actual repetition.

In a third aspect, alone or in combination with one or more of the first and second aspects, partial transmissions of actual repetitions have different starting symbol indexes in at least two different transmission occasions.

In a fourth aspect, alone or in combination with one or more of the first through third aspects, the determination that the transmission occasion has resources available for the partial transmission comprises at least one of a determination that the transmission occasion comprises a threshold number of DMRS symbols, a determination that the transmission occasion comprises a threshold number of data symbols, a determination that the transmission occasion comprises a threshold number of consecutive symbols for the partial transmission, a determination that the transmission occasion comprises a threshold number of consecutive symbols that comprise an initial symbol of the actual repetition, or a combination thereof.

In a fifth aspect, alone or in combination with one or more of the first through fourth aspects, at least one of the threshold number of DMRS symbols, the threshold number of data symbols, or the threshold number of consecutive symbols is indicated to the mobile station by a base station.

In a sixth aspect, alone or in combination with one or more of the first through fifth aspects, process 700 includes receiving (e.g., using reception component 902, depicted in FIG. 9) an indication of one or more conditions associated with transmitting the partial transmission, and determining (e.g., using determination component 910, depicted in FIG. 9) that the transmission occasion has resources available for the partial transmission based at least in part on a determination that the one or more conditions are satisfied.

In a seventh aspect, alone or in combination with one or more of the first through sixth aspects, process 700 includes receiving (e.g., using reception component 902, depicted in FIG. 9) an indication of a symbol pattern associated with transmitting the partial transmission, wherein the symbol pattern indicates one or more symbols of the actual repetition that are required to be transmitted in the partial transmission, and determining (e.g., using determination component 910, depicted in FIG. 9) that the transmission occasion has resources available for the partial transmission based at least in part on the symbol pattern.

In an eighth aspect, alone or in combination with one or more of the first through seventh aspects, the symbol pattern is indicated in the configuration and comprises a static number of bits that is based at least in part on a number of symbols included in the slot.

In a ninth aspect, alone or in combination with one or more of the first through eighth aspects, the symbol pattern is indicated in an uplink grant that schedules the actual repetition, and the symbol pattern comprises a dynamic number of bits that is based at least in part on a number of symbols included in the actual repetition.

In a tenth aspect, alone or in combination with one or more of the first through ninth aspects, process 700 includes receiving (e.g., using reception component 902, depicted in FIG. 9) an indication to cancel transmission in one or more symbols of the transmission occasion, wherein the indication is received at a time, prior to the transmission occasion, that satisfies a processing time threshold associated with the mobile station, determining (e.g., using determination component 910, depicted in FIG. 9) that the transmission occasion satisfies a condition with respect to resources available for a partial transmission of the actual repetition based at least in part on one or more resources available in the transmission occasion after cancellation of transmission in the one or more symbols, and transmitting (e.g., using transmission component 904, depicted in FIG. 9) the actual repetition based at least in part on determining that the transmission occasion satisfies the condition.

In an eleventh aspect, alone or in combination with one or more of the first through tenth aspects, process 700 includes receiving (e.g., using reception component 902, depicted in FIG. 9) an indication to cancel transmission in one or more symbols of the transmission occasion, wherein the indication is received at a time, prior to the transmission occasion, that does not satisfy a processing time threshold associated with the mobile station, determining (e.g., using determination component 910, depicted in FIG. 9), after transmitting the actual repetition, that the transmission occasion satisfies a condition with respect to resources available for a partial transmission of the actual repetition, based at least in part on one or more resources available in the transmission occasion after cancellation of transmission in the one or more symbols, and incrementing (e.g., using counting component 912, depicted in FIG. 9) a repetition counter that counts toward the number of actual repetitions based at least in part on determining that the transmission occasion satisfies the condition.

In a twelfth aspect, alone or in combination with one or more of the first through eleventh aspects, process 700 includes receiving (e.g., using reception component 902, depicted in FIG. 9) an indication to cancel transmission in one or more symbols of the transmission occasion, wherein the indication is received at a time, prior to the transmission occasion, that does not satisfy a processing time threshold associated with the mobile station, determining (e.g., using determination component 910, depicted in FIG. 9), after transmitting the actual repetition, that the transmission occasion does not satisfy a condition with respect to resources available for a partial transmission of the actual repetition, based at least in part on one or more resources available in the transmission occasion after cancellation of transmission in the one or more symbols, and refraining from counting (e.g., using counting component 912, depicted in FIG. 9) the actual repetition toward the number of actual repetitions based at least in part on determining that the transmission occasion does not satisfy the condition.

In a thirteenth aspect, alone or in combination with one or more of the first through twelfth aspects, process 700 includes receiving (e.g., using reception component 902, depicted in FIG. 9) an indication to cancel transmission in one or more symbols of the transmission occasion, wherein the indication is received at a time, prior to the transmission occasion, that does not satisfy a processing time threshold associated with the mobile station, determining (e.g., using determination component 910, depicted in FIG. 9), after transmitting the actual repetition, that the transmission occasion does not satisfy a condition with respect to resources available for a partial transmission of the actual repetition, based at least in part on one or more resources available in the transmission occasion after cancellation of transmission in the one or more symbols, and incrementing (e.g., using counting component 912, depicted in FIG. 9) a repetition counter that counts toward the number of actual repetitions despite determining that the transmission occasion does not satisfy the condition.

In a fourteenth aspect, alone or in combination with one or more of the first through thirteenth aspects, the number of nominal repetitions is less than or equal to a maximum number of repetitions that is based at least in part on a slot pattern configured for the mobile station or a sub-carrier spacing configured for the mobile station.

In a fifteenth aspect, alone or in combination with one or more of the first through fourteenth aspects, the actual repetition is transmitted using a redundancy version determined based at least in part on a transmission index that is incremented if actual repetition transmission occurs and that is not incremented if actual repetition transmission does not occur.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, by a base station, in accordance with the present disclosure. Example process 800 is an example where the base station (e.g., base station 110) performs operations associated with determination and counting of uplink repetitions.

As shown in FIG. 8, in some aspects, process 800 may include transmitting, to a mobile station, a configuration that indicates a number of nominal repetitions associated with an uplink repetition type that does not permit uplink transmission occasions to cross a slot boundary and that permits only one uplink transmission occasion per slot (block 810). For example, the base station (e.g., using transmission component 1004, depicted in FIG. 10) may transmit, to a mobile station, a configuration that indicates a number of nominal repetitions associated with an uplink repetition type that does not permit uplink transmission occasions to cross a slot boundary and that permits only one uplink transmission occasion per slot, as described above.

As further shown in FIG. 8, in some aspects, process 800 may include monitoring for an actual repetition of the uplink repetition type in a transmission occasion, based at least in part on a determination that the transmission occasion has resources available for the actual repetition, wherein the transmission occasion is a slot (block 820). For example, the base station (e.g., using reception component 1002, depicted in FIG. 10) may monitor for an actual repetition of the uplink repetition type in a transmission occasion, based at least in part on a determination that the transmission occasion has resources available for the actual repetition, as described above. In some aspects, the transmission occasion is a slot.

As further shown in FIG. 8, in some aspects, process 800 may include terminating monitoring for transmission of actual repetitions of the uplink repetition type when a number of actual repetitions equals the number of nominal repetitions (block 830). For example, the base station (e.g., using termination component 1008 and/or reception component 1002, depicted in FIG. 10) may terminate monitoring for transmission of actual repetitions of the uplink repetition type when a number of actual repetitions equals the number of nominal repetitions, as described above.

Process 800 may include additional aspects, such as any single aspect or any combination of aspects described below and/or in connection with one or more other processes described elsewhere herein.

In a first aspect, the determination that the transmission occasion has resources available for the actual repetition comprises a determination that the transmission occasion has resources available for a full transmission that comprises all symbols of the actual repetition.

In a second aspect, alone or in combination with the first aspect, the determination that the transmission occasion has resources available for the actual repetition comprises a determination that the transmission occasion has resources available for a partial transmission that comprises fewer than all symbols of the actual repetition.

In a third aspect, alone or in combination with one or more of the first and second aspects, partial transmissions of actual repetitions have different starting symbol indexes in at least two different transmission occasions.

In a fourth aspect, alone or in combination with one or more of the first through third aspects, the determination that the transmission occasion has resources available for the partial transmission comprises at least one of a determination that the transmission occasion comprises a threshold number of DMRS symbols, a determination that the transmission occasion comprises a threshold number of data symbols, a determination that the transmission occasion comprises a threshold number of consecutive symbols for the partial transmission, a determination that the transmission occasion comprises a threshold number of consecutive symbols that comprise an initial symbol of the actual repetition, or a combination thereof.

In a fifth aspect, alone or in combination with one or more of the first through fourth aspects, at least one of the threshold number of DMRS symbols, the threshold number of data symbols, or the threshold number of consecutive symbols is indicated to the mobile station by the base station.

In a sixth aspect, alone or in combination with one or more of the first through fifth aspects, process 800 includes transmitting (e.g., using transmission component 1004, depicted in FIG. 10) an indication of one or more conditions associated with transmitting the partial transmission, and determining (e.g., using determination component 1010, depicted in FIG. 10) that the transmission occasion has resources available for the partial transmission based at least in part on a determination that the one or more conditions are satisfied.

In a seventh aspect, alone or in combination with one or more of the first through sixth aspects, process 800 includes transmitting (e.g., using transmission component 1004, depicted in FIG. 10) an indication of a symbol pattern associated with transmitting the partial transmission, wherein the symbol pattern indicates one or more symbols of the actual repetition that are required to be transmitted in the partial transmission, and determining (e.g., using determination component 1010, depicted in FIG. 10) that the transmission occasion has resources available for the partial transmission based at least in part on the symbol pattern.

In an eighth aspect, alone or in combination with one or more of the first through seventh aspects, the symbol pattern is indicated in the configuration and comprises a static number of bits that is based at least in part on a number of symbols included in the slot.

In a ninth aspect, alone or in combination with one or more of the first through eighth aspects, the symbol pattern is indicated in an uplink grant that schedules the actual repetition, and the symbol pattern comprises a dynamic number of bits that is based at least in part on a number of symbols included in the actual repetition.

In a tenth aspect, alone or in combination with one or more of the first through ninth aspects, process 800 includes transmitting (e.g., using transmission component 1004, depicted in FIG. 10) an indication to cancel transmission in one or more symbols of the transmission occasion, wherein the indication is transmitted at a time, prior to the transmission occasion, that satisfies a processing time threshold associated with the mobile station, determining (e.g., using determination component 1010, depicted in FIG. 10) that the transmission occasion satisfies a condition with respect to resources available for a partial transmission of the actual repetition based at least in part on one or more resources available in the transmission occasion after cancellation of transmission in the one or more symbols, and monitoring (e.g., using reception component 1002, depicted in FIG. 10) for the actual repetition based at least in part on determining that the transmission occasion satisfies the condition.

In an eleventh aspect, alone or in combination with one or more of the first through tenth aspects, process 800 includes transmitting (e.g., using transmission component 1004, depicted in FIG. 10) an indication to cancel transmission in one or more symbols of the transmission occasion, wherein the indication is transmitted at a time, prior to the transmission occasion, that does not satisfy a processing time threshold associated with the mobile station, determining (e.g., using determination component 1010, depicted in FIG. 10) that the transmission occasion satisfies a condition with respect to resources available for a partial transmission of the actual repetition, based at least in part on one or more resources available in the transmission occasion after cancellation of transmission in the one or more symbols, and incrementing (e.g., using counting component 1012, depicted in FIG. 10) a repetition counter that counts toward the number of actual repetitions based at least in part on determining that the transmission occasion satisfies the condition.

In a twelfth aspect, alone or in combination with one or more of the first through eleventh aspects, process 800 includes transmitting (e.g., using transmission component 1004, depicted in FIG. 10) an indication to cancel transmission in one or more symbols of the transmission occasion, wherein the indication is transmitted at a time, prior to the transmission occasion, that does not satisfy a processing time threshold associated with the mobile station, determining (e.g., using determination component 1010, depicted in FIG. 10) that the transmission occasion does not satisfy a condition with respect to resources available for a partial transmission of the actual repetition, based at least in part on one or more resources available in the transmission occasion after cancellation of transmission in the one or more symbols, and refraining from counting (e.g., using counting component 1012, depicted in FIG. 10) the actual repetition toward the number of actual repetitions based at least in part on determining that the transmission occasion does not satisfy the condition.

In a thirteenth aspect, alone or in combination with one or more of the first through twelfth aspects, process 800 includes transmitting (e.g., using transmission component 1004, depicted in FIG. 10) an indication to cancel transmission in one or more symbols of the transmission occasion, wherein the indication is transmitted at a time, prior to the transmission occasion, that does not satisfy a processing time threshold associated with the mobile station, determining (e.g., using determination component 1010, depicted in FIG. 10) that the transmission occasion does not satisfy a condition with respect to resources available for a partial transmission of the actual repetition, based at least in part on one or more resources available in the transmission occasion after cancellation of transmission in the one or more symbols, and incrementing (e.g., using counting component 1012, depicted in FIG. 10) a repetition counter that counts toward the number of actual repetitions despite determining that the transmission occasion does not satisfy the condition.

In a fourteenth aspect, alone or in combination with one or more of the first through thirteenth aspects, the number of nominal repetitions is less than or equal to a maximum number of repetitions that is based at least in part on a slot pattern configured for the mobile station or a sub-carrier spacing configured for a mobile station.

In a fifteenth aspect, alone or in combination with one or more of the first through fourteenth aspects, the actual repetition is received using a redundancy version determined based at least in part on a transmission index that is incremented if actual repetition transmission occurs and that is not incremented if actual repetition transmission does not occur.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
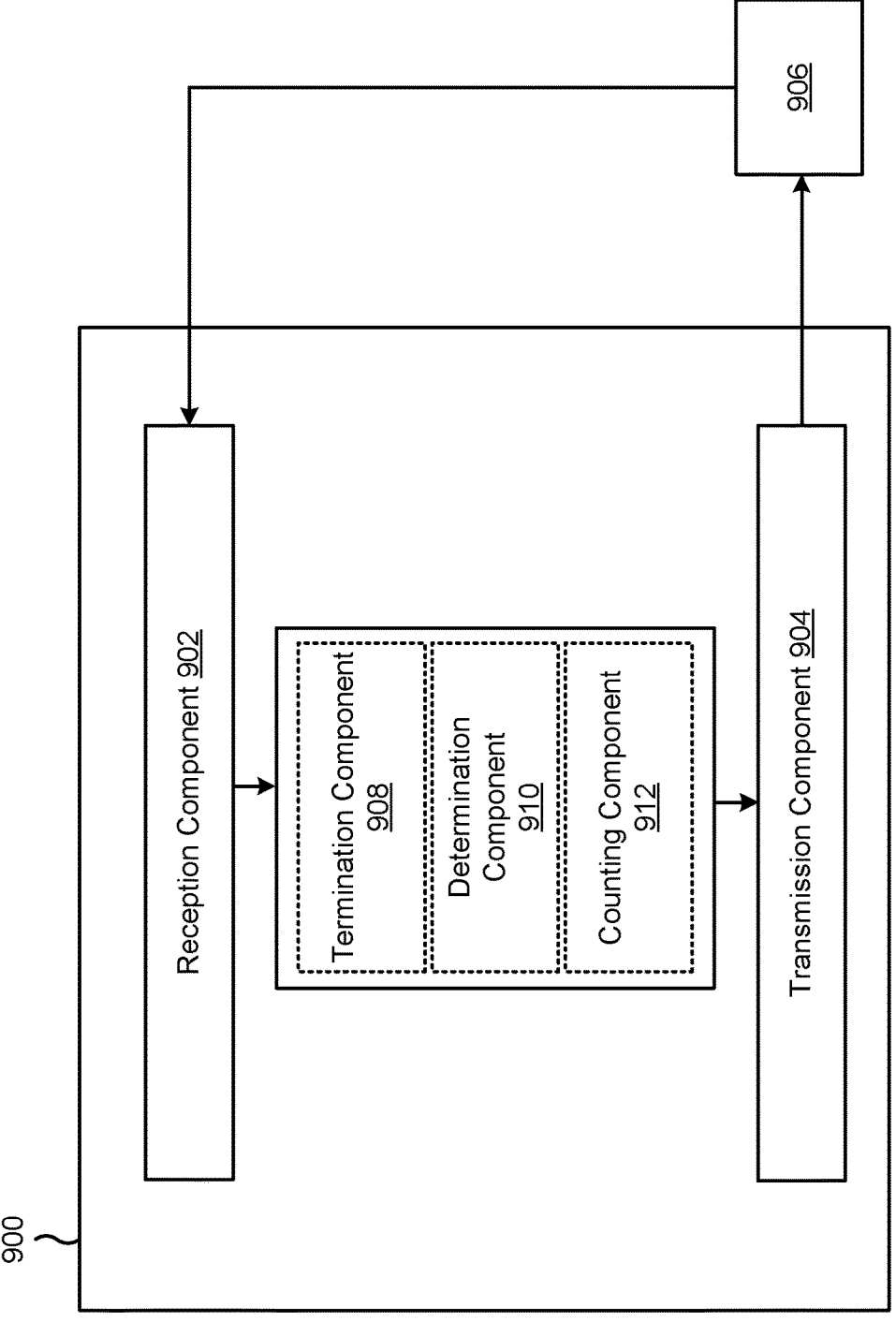
FIGS. 9 and 10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a termination component 908, a determination component 910, or a counting component 912, among other examples. In some aspects, the termination component 908, the determination component 910, and/or the counting component 912 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

In some aspects, the apparatus 900 may be configured to perform one or more operations described herein in connection with FIGS. 5-6. Additionally or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive a configuration that indicates a number of nominal repetitions associated with an uplink repetition type that does not permit uplink transmission occasions to cross a slot boundary and that permits only one uplink transmission occasion per slot. The transmission component 904 may transmit an actual repetition of the uplink repetition type in a transmission occasion based at least in part on a determination that the transmission occasion has resources available for the actual repetition, wherein the transmission occasion is a slot. The termination component 908 may terminate transmission of actual repetitions of the uplink repetition type when a number of actual repetitions equals the number of nominal repetitions.

The reception component 902 may receive an indication of one or more conditions associated with transmitting the partial transmission. The determination component 910 may determine that the transmission occasion has resources available for the partial transmission based at least in part on a determination that the one or more conditions are satisfied.

The reception component 902 may receive an indication of a symbol pattern associated with transmitting the partial transmission, wherein the symbol pattern indicates one or more symbols of the actual repetition that are required to be transmitted in the partial transmission. The determination component 910 may determine that the transmission occasion has resources available for the partial transmission based at least in part on the symbol pattern.

The reception component 902 may receive an indication to cancel transmission in one or more symbols of the transmission occasion, wherein the indication is received at a time, prior to the transmission occasion, that satisfies a processing time threshold associated with the mobile station. The determination component 910 may determine that the transmission occasion satisfies a condition with respect to resources available for a partial transmission of the actual repetition based at least in part on one or more resources available in the transmission occasion after cancellation of transmission in the one or more symbols. The transmission component 904 may transmit the actual repetition based at least in part on determining that the transmission occasion satisfies the condition.

The reception component 902 may receive an indication to cancel transmission in one or more symbols of the transmission occasion, wherein the indication is received at a time, prior to the transmission occasion, that does not satisfy a processing time threshold associated with the mobile station. The determination component 910 may determine, after transmitting the actual repetition, that the transmission occasion satisfies a condition with respect to resources available for a partial transmission of the actual repetition, based at least in part on one or more resources available in the transmission occasion after cancellation of transmission in the one or more symbols. The counting component 912 may increment a repetition counter that counts toward the number of actual repetitions based at least in part on determining that the transmission occasion satisfies the condition.

The reception component 902 may receive an indication to cancel transmission in one or more symbols of the transmission occasion, wherein the indication is received at a time, prior to the transmission occasion, that does not satisfy a processing time threshold associated with the mobile station. The determination component 910 may determine, after transmitting the actual repetition, that the transmission occasion does not satisfy a condition with respect to resources available for a partial transmission of the actual repetition, based at least in part on one or more resources available in the transmission occasion after cancellation of transmission in the one or more symbols. The counting component 912 may refrain from counting the actual repetition toward the number of actual repetitions based at least in part on determining that the transmission occasion does not satisfy the condition.

The reception component 902 may receive an indication to cancel transmission in one or more symbols of the transmission occasion, wherein the indication is received at a time, prior to the transmission occasion, that does not satisfy a processing time threshold associated with the mobile station. The determination component 910 may determine, after transmitting the actual repetition, that the transmission occasion does not satisfy a condition with respect to resources available for a partial transmission of the actual repetition, based at least in part on one or more resources available in the transmission occasion after cancellation of transmission in the one or more symbols. The counting component 912 may increment a repetition counter that counts toward the number of actual repetitions despite determining that the transmission occasion does not satisfy the condition.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
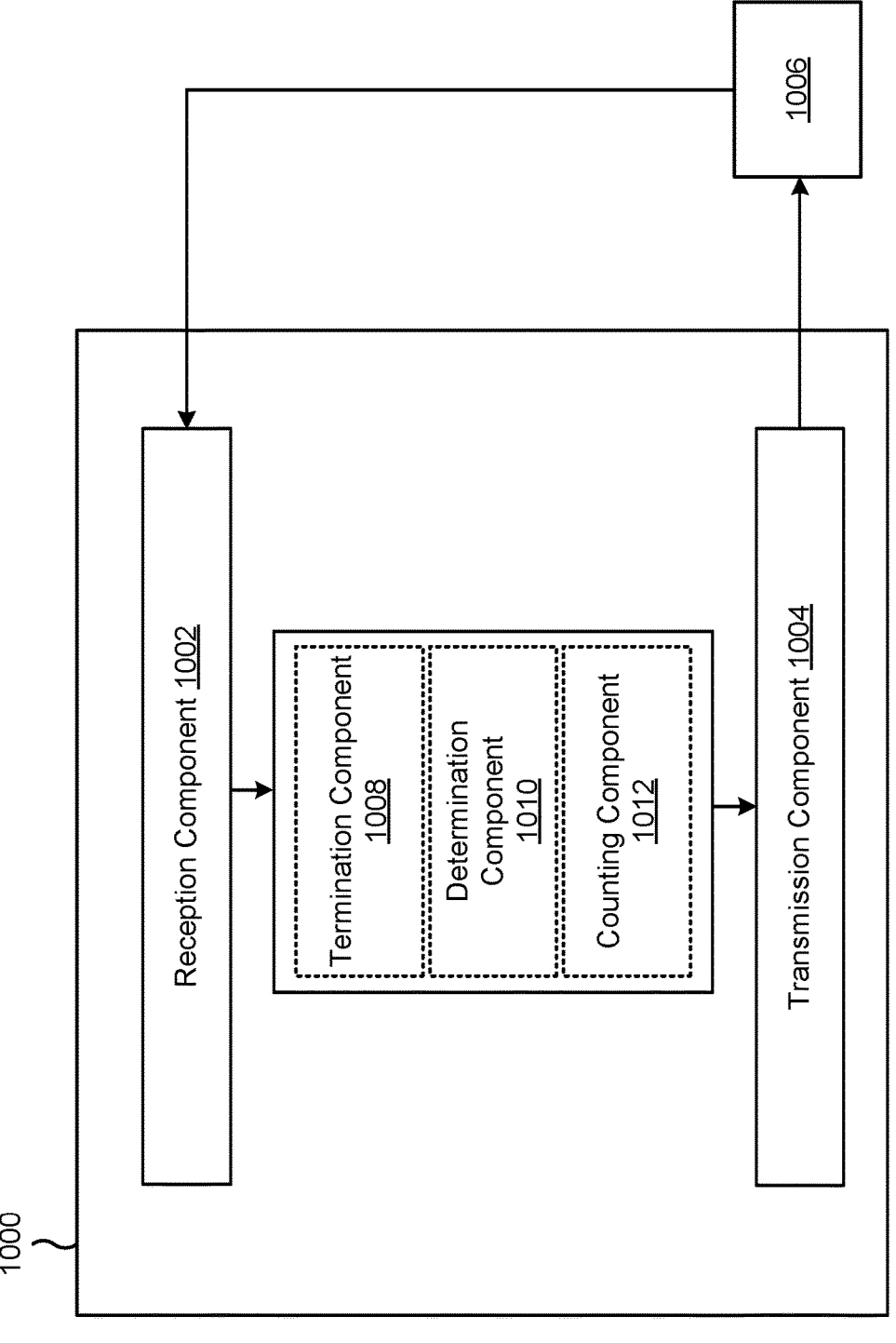

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a termination component 1008, a determination component 1010, or a counting component 1012, among other examples. In some aspects, the termination component 1008, the determination component 1010, and/or the counting component 1012 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

In some aspects, the apparatus 1000 may be configured to perform one or more operations described herein in connection with FIGS. 5-6. Additionally or alternatively, the apparatus 1000 may be configured to perform one or more processes described herein, such as process 800 of FIG. 8. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be co-located with the reception component 1002 in a transceiver.

The transmission component 1004 may transmit, to a mobile station, a configuration that indicates a number of nominal repetitions associated with an uplink repetition type that does not permit uplink transmission occasions to cross a slot boundary and that permits only one uplink transmission occasion per slot. The reception component 1002 may monitor for an actual repetition of the uplink repetition type in a transmission occasion, based at least in part on a determination that the transmission occasion has resources available for the actual repetition, wherein the transmission occasion is a slot. The termination component 1008 may terminate monitoring for transmission of actual repetitions of the uplink repetition type when a number of actual repetitions equals the number of nominal repetitions.

The transmission component 1004 may transmit an indication of one or more conditions associated with transmitting the partial transmission. The determination component 1010 may determine that the transmission occasion has resources available for the partial transmission based at least in part on a determination that the one or more conditions are satisfied.

The transmission component 1004 may transmit an indication of a symbol pattern associated with transmitting the partial transmission, wherein the symbol pattern indicates one or more symbols of the actual repetition that are required to be transmitted in the partial transmission. The determination component 1010 may determine that the transmission occasion has resources available for the partial transmission based at least in part on the symbol pattern.

The transmission component 1004 may transmit an indication to cancel transmission in one or more symbols of the transmission occasion, wherein the indication is transmitted at a time, prior to the transmission occasion, that satisfies a processing time threshold associated with the mobile station. The determination component 1010 may determine that the transmission occasion satisfies a condition with respect to resources available for a partial transmission of the actual repetition based at least in part on one or more resources available in the transmission occasion after cancellation of transmission in the one or more symbols. The reception component 1002 may monitor for the actual repetition based at least in part on determining that the transmission occasion satisfies the condition.

The transmission component 1004 may transmit an indication to cancel transmission in one or more symbols of the transmission occasion, wherein the indication is transmitted at a time, prior to the transmission occasion, that does not satisfy a processing time threshold associated with the mobile station. The determination component 1010 may determine that the transmission occasion satisfies a condition with respect to resources available for a partial transmission of the actual repetition, based at least in part on one or more resources available in the transmission occasion after cancellation of transmission in the one or more symbols. The counting component 1012 may increment a repetition counter that counts toward the number of actual repetitions based at least in part on determining that the transmission occasion satisfies the condition.

The transmission component 1004 may transmit an indication to cancel transmission in one or more symbols of the transmission occasion, wherein the indication is transmitted at a time, prior to the transmission occasion, that does not satisfy a processing time threshold associated with the mobile station. The determination component 1010 may determine that the transmission occasion does not satisfy a condition with respect to resources available for a partial transmission of the actual repetition, based at least in part on one or more resources available in the transmission occasion after cancellation of transmission in the one or more symbols. The counting component 1012 may refrain from counting the actual repetition toward the number of actual repetitions based at least in part on determining that the transmission occasion does not satisfy the condition.

The transmission component 1004 may transmit an indication to cancel transmission in one or more symbols of the transmission occasion, wherein the indication is transmitted at a time, prior to the transmission occasion, that does not satisfy a processing time threshold associated with the mobile station. The determination component 1010 may determine that the transmission occasion does not satisfy a condition with respect to resources available for a partial transmission of the actual repetition, based at least in part on one or more resources available in the transmission occasion after cancellation of transmission in the one or more symbols. The counting component 1012 may increment a repetition counter that counts toward the number of actual repetitions despite determining that the transmission occasion does not satisfy the condition.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
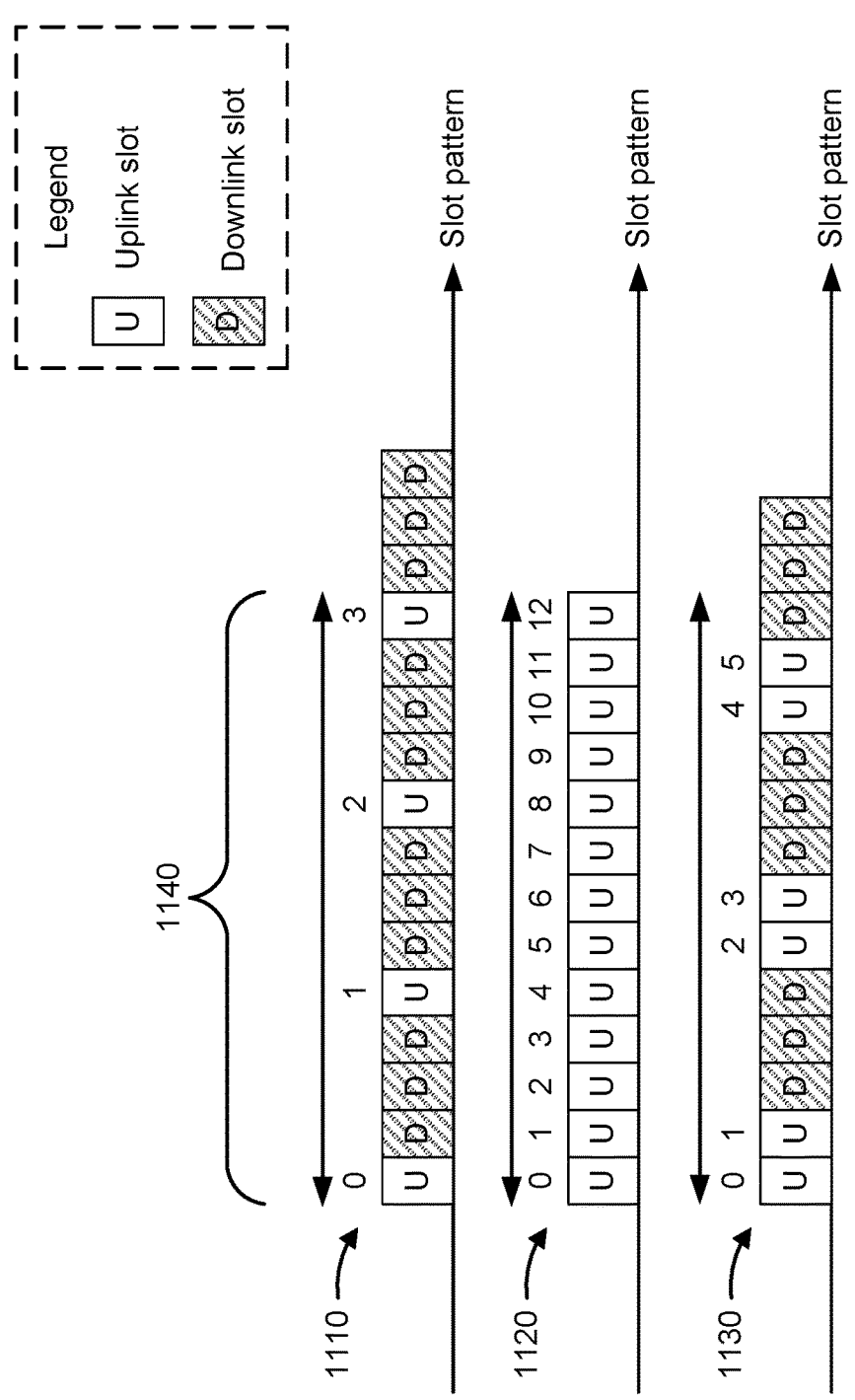
FIG. 11 is a diagram illustrating an example of different slot patterns, in accordance with the present disclosure.

FIG. 11 is a diagram illustrating an example 1100 of different slot patterns, in accordance with the present disclosure. A slot pattern may sometimes be called a TDD slot pattern, a TDD pattern, an UL/DL slot pattern, an UL/DL pattern, a TDD UL/DL slot pattern, a TDD UL/DL pattern, or the like. A slot pattern may indicate, for a sequence of slots, whether each slot in the sequence of slots is configured as an uplink slot or a downlink slot (and/or a special slot, in some examples). An uplink slot may be used for uplink communication (and not for downlink communication), and a downlink slot may be used for downlink communication (and not for uplink communication). Additionally, or alternatively, a slot pattern may indicate whether a UE is configured for TDD or frequency-division duplexing (FDD).

For example, FIG. 11 shows a first slot pattern 1110 with one uplink (U) slot, followed by three downlink (D) slots, followed by one uplink slot, followed by three downlink slots, followed by one uplink slot, followed by three downlink slots, followed by one uplink slot, followed by three downlink slots. FIG. 11 also shows a second slot pattern 1120 of thirteen consecutive uplink slots. The second slot pattern 1120 may be configured, for example, in an FDD system that uses a first frequency for uplink communications and a second (different) frequency for downlink communications. FIG. 11 also shows a third slot pattern 1130 of two uplink slots, followed by three downlink slots, followed by two uplink slots, followed by three downlink slots, followed by two uplink slots, followed by three downlink slots. These slot patterns are shown as examples, and other examples may differ from these slot patterns.

As shown, in a time span 1140, different UEs, that are configured with these different slot patterns, have a different number of opportunities to transmit PUSCH communications (e.g., a different number of transmission occasions within the same time span 1140). For example, a first UE configured with the first slot pattern 1110 has four uplink transmission occasions (labeled 0 through 3) within the time span 1140, a second UE configured with the second slot pattern 1120 has thirteen uplink transmission occasions (labeled 0 through 12) within the time span 1140, and a third UE configured with the third slot pattern 1130 has six uplink transmission occasions (labeled 0 through 5) within the time span 1140.

In some slot pattern configurations, a UE may be capable of transmitting a large number of PUSCH repetitions because of a high density of uplink slots in the slot pattern (e.g., in an FDD slot pattern, which may have all uplink slots, or in a TDD slot pattern with a high ratio of uplink slots to downlink slots). In other slot pattern configurations, a UE may be capable of transmitting a small number of PUSCH repetitions because of a low density of uplink slots in the slot pattern (e.g., in a TDD slot pattern with a low ratio of uplink slots to downlink slots). Despite different UEs configured with different slot patterns having different numbers of uplink transmission opportunities, all UEs may be limited to transmitting the same maximum number of PUSCH repetitions (e.g., according to a wireless communication standard). For example, a UE may be limited to transmitting a maximum number of 16 PUSCH repetitions regardless of a slot pattern configured for the UE. Some techniques and apparatuses described herein improve performance (e.g., by improving reliability) by enabling a UE to transmit up to a maximum number of PUSH repetitions that depend on a slot pattern configured for the UE. Furthermore, some techniques and apparatuses described herein increase scheduling flexibility by enabling a UE-specific maximum number of PUSCH repetitions.

In addition to having different possible slot patterns, different UEs may be configured with different sub-carrier spacings (SCSs). "SCS" refers to the width of subcarriers in the frequency domain. For example, a first UE may be configured to communicate using an SCS of 15 kilohertz (kHz), a second UE may be configured to communicate using an SCS of 30 kHz, a third UE may be configured to communicate using an SCS of 60 kHz, a fourth UE may be configured to communicate using an SCS of 120 kHz, and so on. An SCS is equal to the reciprocal of symbol time (also called symbol duration or symbol length). Thus, a larger SCS (e.g., 120 kHz) corresponds to a shorter symbol duration (e.g., 14 symbols occupying a slot with a slot duration of 0.125 milliseconds, for a symbol duration of about 8.93 microseconds), and a smaller SCS (e.g., 15 kHz) corresponds to a longer symbol duration (e.g., 14 symbols occupying a slot with a slot duration of 1.0 milliseconds, for a symbol duration of about 71.43 microseconds).

Repetitions can be used to increase an amount of energy used to transmit a payload (e.g., data). The amount of energy used to transmit a payload can be calculated as a product of a transmit power, used to transmit the payload, and a transmission duration for the payload (e.g., energy=transmit power×transmission duration). However, because repetitions (e.g., PUSCH Type A repetitions) are counted on a per-slot basis, the same number of repetitions transmitted using different SCSs results in a different amount of energy being used to transmit a repetition. For example, a repetition transmitted using an SCS of 15 kHz would be transmitted in a slot with a duration of 1 millisecond, while a repetition transmitted using an SCS of 30 kHz would be transmitted in a slot with a duration of 0.5 milliseconds. Thus, twice the number of repetitions would need to be transmitted using an SCS of 30 kHz to have the same transmission duration as a number of repetitions transmitted using an SCS of 15 kHz. Similarly, eight times the number of repetitions would need to be transmitted using an SCS of 120 kHz to have the same transmission duration as a number of repetitions transmitted using an SCS of 15 kHz. However, a large number of repetitions (e.g., greater than 16 repetitions) may not be possible when all UEs are limited to transmitting the same maximum number of PUSCH repetitions (e.g., according to a wireless communication standard) regardless of an SCS configured for a UE.

Some techniques and apparatuses described herein improve performance (e.g., by improving reliability) by enabling a UE to transmit up to a maximum number of PUSCH repetitions that depends on an SCS configured for the UE. Furthermore, some techniques and apparatuses described herein increase scheduling flexibility by enabling a UE-specific maximum number of PUSCH repetitions.

As indicated above, FIG. 11 is provided as an example. Other examples may differ from what is described with respect to FIG. 11.

Figure 12:
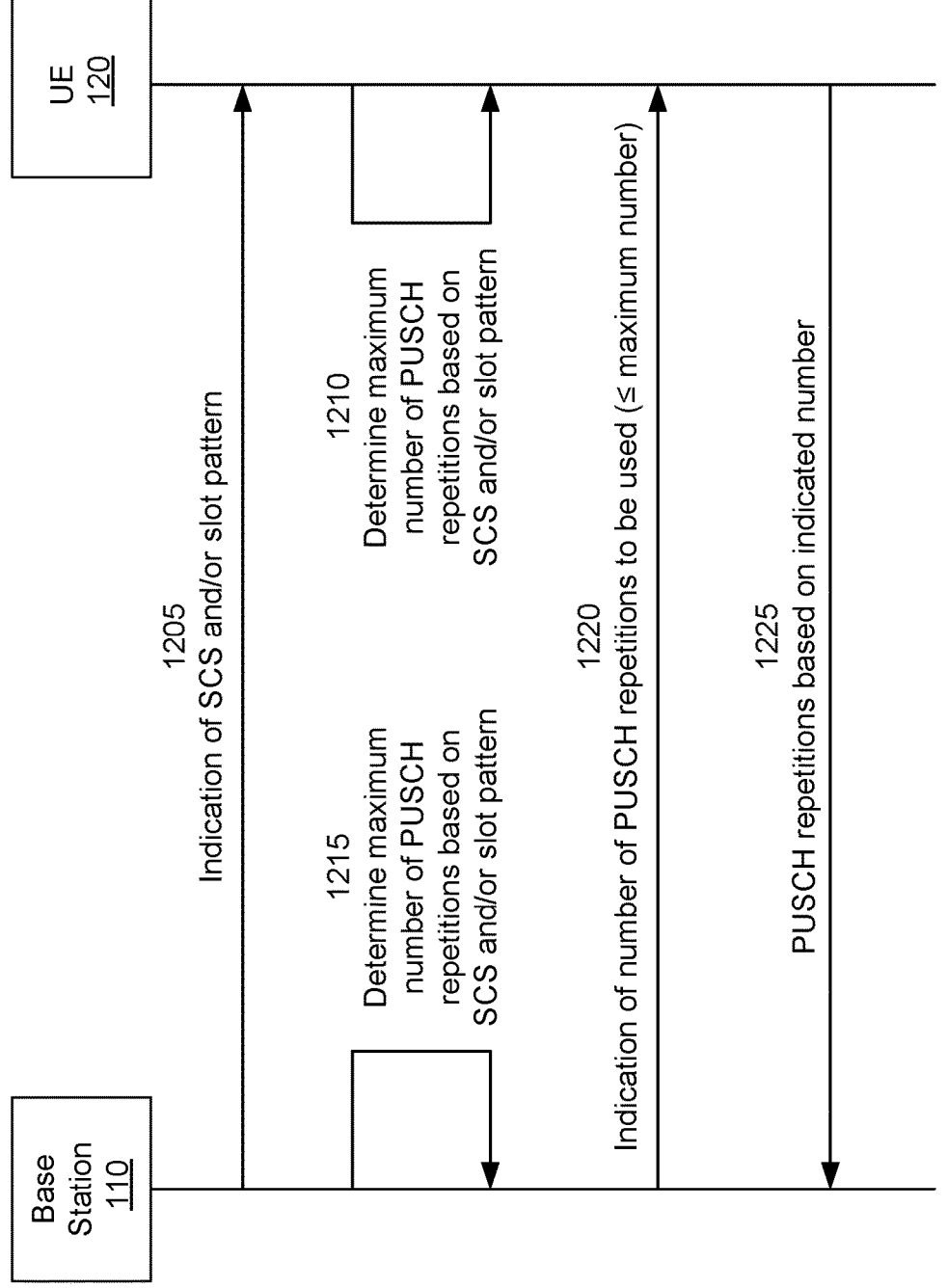
FIG. 12 is a diagram illustrating an example associated with signaling of a maximum number of transmission repetitions depending on a slot pattern or a sub-carrier spacing, in accordance with the present disclosure.

FIG. 12 is a diagram illustrating an example 1200 associated with signaling of a maximum number of transmission repetitions depending on a slot pattern or an SCS, in accordance with the present disclosure. As shown in FIG. 12, a base station 110 and a UE 120 may communicate with one another.

As shown by reference number 1205, the base station 110 may indicate, to the UE 120, an SCS and/or a slot pattern to be used by the UE 120. For example, the base station 110 may indicate the SCS and/or the slot pattern in system information, such as in a master information block (MIB) or in one or more system information blocks (SIBs), and/or in an RRC message. For example, the base station 110 may indicate an SCS in a MIB and/or a SIB. The UE 120 may receive and decode the MIB and/or the SIB (e.g., during an initial cell acquisition procedure) to determine the SCS to be used to communicate with the base station 110, and the UE 120 may communicate with the base station 110 using the indicated SCS. Thus, the base station 110 may configure the UE 120 with an SCS (e.g., to be used for communications via a cell configured by the base station 110).

In some aspects, the base station 110 may indicate the slot pattern in the MIB and/or a SIB. In some aspects, the base station 110 may indicate the slot pattern in a servingCell-ConfigCommon information element, which may be included in a SIB and/or an RRC message (e.g., an RRC configuration message, an RRC reconfiguration message, or the like). Additionally, or alternatively, the base station 110 may indicate the slot pattern in a tdd-ul-dl-configCommon information element, which may be included in an RRC message. As described above, a slot pattern may indicate whether a UE 120 is configured for TDD or FDD. Additionally, or alternatively, a slot pattern may indicate, for a sequence of slots, whether each slot in the sequence of slots is configured as an uplink slot or a downlink slot (and/or a special slot, in some aspects). A slot pattern may sometimes be called a TDD slot pattern, a TDD pattern, an UL/DL slot pattern, an UL/DL pattern, a TDD UL/DL slot pattern, a TDD UL/DL pattern, or the like.

As shown by reference number 1210, the UE 120 (e.g., a mobile station) may determine a maximum number of repetitions for a PUSCH (e.g., for PUSCH communications) based at least in part on the slot pattern configured for the UE 120 and/or the SCS configured for the UE 120. For example, the maximum number of PUSCH repetitions may be based at least in part on the slot pattern configured for the UE 120 (e.g., indicated by the base station 110), the SCS configured for the UE 120 (e.g., indicated by the base station 110), or both the slot pattern configured for the UE 120 and the SCS configured for the UE 120.

In some aspects, the maximum number of PUSCH repetitions may be a function of the SCS configured for the UE 120. For example, the maximum number of PUSCH repetitions may be a product of a fixed value and a value that depends on the SCS configured for the UE 120. For example, the maximum number of PUSCH repetitions may be defined as a product of N and k (e.g., N×k), where N is a fixed value (e.g., a constant, such as 8, 16, 32, or the like) and the value of k depends on an SCS configured for the UE 120. As an example, the value of k may be 1 if the UE 120 is configured with an SCS of 15 kHz, the value of k may be 2 if the UE 120 is configured with an SCS of 30 kHz, the value of k may be 4 if the UE 120 is configured with an SCS of 60 kHz, the value of k may be 8 if the UE 120 is configured with an SCS of 120 kHz, and so on. Thus, in some aspects, the value of k may be proportional to the SCS configured for the UE 120. In some aspects, the UE 120 may store, in memory of the UE 120, a table that indicates a set of SCSs and a corresponding set of k values (e.g., with one k value for each SCS).

Thus, in some aspects, the maximum number of PUSCH repetitions may be a larger maximum number for a larger SCS as compared to a smaller maximum number for a smaller SCS. For example, the maximum number of PUSCH repetitions may be 16 for a 15 kHz SCS, may be 32 for a 30 kHz SCS, may be 64 for a 60 kHz SCS, may be 128 for a 120 kHz SCS, and so on. As another example, the maximum number of PUSCH repetitions may be 8 for a 15 kHz SCS, may be 16 for a 30 kHz SCS, may be 32 for a 60 kHz SCS, may be 64 for a 120 kHz SCS, and so on. As a result, UEs 120 configured with different SCSs may be capable of using the same amount of energy to transmit a payload, without being limited by a fixed maximum number of PUSCH repetitions. In particular, a UE 120 configured with a larger SCS may be capable of transmitting a payload using more energy, by using a larger number of PUSCH repetitions, than if the UE 120 were limited to a smaller maximum number of PUSCH repetitions. As a result, reliability of PUSCH transmissions may be improved.

Additionally, or alternatively, the maximum number of PUSCH repetitions may be based at least in part on whether the UE 120 is configured to communicate using TDD or FDD. For example, the UE 120 may be configured with a slot pattern that indicates whether the UE 120 is configured to communicate using TDD or FDD. The UE 120 may then determine a maximum number of PUSCH repetitions based at least in part on whether the UE 120 is configured to communicate using TDD or FDD. For example, the maximum number of PUSCH repetitions may be a larger maximum number for FDD as compared to a smaller maximum number for TDD because uplink opportunities may be denser (less sparse) in FDD as compared to TDD, which gives the UE 120 more opportunities to transmit PUSCH repetitions using FDD. For example, with an SCS of 30 kHz and data (e.g., a voice packet) that is generated every 20 milliseconds, a UE 120 configured with FDD (e.g., where uplink slots are consecutive) may be able to transmit up to 40 PUSCH repetitions in a particular time window. For comparison, a UE 120 configured with TDD may only be able to transmit up to 20 PUSCH repetitions, up to 13 PUSCH repetitions, or fewer PUSCH repetitions in the same time window, depending on a ratio of uplink slots to downlink slots of a TDD slot pattern configured for the UE 120.

In some aspects, the maximum number of PUSCH repetitions may be based at least in part on a ratio of uplink slots to downlink slots configured for the UE 120 (e.g., in a slot pattern). For example, if the UE 120 is configured with TDD, then the maximum number of PUSCH repetitions may be based at least in part on a ratio of uplink slots to downlink slots in a TDD slot pattern configured for the UE 120. For example, the UE 120 may be configured with a slot pattern that indicates that the UE 120 is configured to communicate using TDD, and that further indicates a ratio of uplink slots to downlink slots for TDD. In this example, the maximum number of PUSCH repetitions may be based at least in part on the ratio. In some aspects, the maximum number of PUSCH repetitions is a larger maximum number for a larger ratio of uplink slots to downlink slots as compared to a smaller maximum number for a smaller ratio of uplink slots to downlink slots. For example, a maximum number of 16 PUSCH repetitions may be specified for a ratio of 1 uplink slot for every 3 downlink slots (a 1:3 uplink slot to downlink slot ratio, which may also be expressed as a 3:1 downlink slot to uplink slot ratio), while a maximum number of 32 PUSCH repetitions may be specified for a ratio of 2 uplink slots for every 3 downlink slots (a 2:3 uplink slot to downlink slot ratio, which may also be expressed as a 3:2 downlink slot to uplink slot ratio). In some aspects, the maximum number of PUSCH repetitions may be proportional to the ratio of uplink slots to downlink slots.

As shown by reference number 1215, the base station 110 may determine a maximum number of repetitions for a PUSCH (e.g., for PUSCH communications with the UE 120) based at least in part on the slot pattern configured for the UE 120 and/or the SCS configured for the UE 120. The base station 110 may use any of the techniques described above in connection with reference number 1210 to determine the maximum number of PUSCH repetitions. For example, the base station 110 and the UE 120 may determine the maximum number of PUSCH repetitions in the same way so that there is no ambiguity between the UE 120 and the base station 110 about the maximum number of PUSCH repetitions for the UE 120. Because the base station 110 may configure different UEs 120 with different slot patterns and/or SCSs, the base station 110 may determine different maximum numbers of PUSCH repetitions for different UEs 120. For example, the maximum number of PUSCH repetitions may be UE-specific, depending on a slot pattern and/or an SCS configured for a UE 120.

As shown by reference number 1220, the base station 110 may transmit an indication, to the UE 120, of a number of repetitions to be used by the UE 120 for the PUSCH (e.g., for PUSCH communications). This indication may instruct the UE 120 regarding an actual number of PUSCH repetitions to be transmitted by the UE 120 for each PUSCH transmission (e.g., each PUSCH payload). This actual number of PUSCH repetitions is less than or equal to the maximum number of PUSCH repetitions determined as described above. In some aspects, the base station 110 may indicate the number of PUSCH repetitions in an RRC message, such as using a RepK value (or a RepK information element). Additionally, or alternatively, the base station 110 may indicate the number of PUSCH repetitions in DCI, in a medium access control (MAC) control element (CE) (MAC-CE), or the like.

The base station 110 may indicate the number of repetitions to be transmitted by the UE 120 using a bit value. In some aspects, the same bit value may indicate the same number of PUSCH repetitions regardless of a maximum number of PUSCH repetitions determined for the UE 120. For example, a 3-bit value of 000 may indicate 1 PUSCH repetition, a 3-bit value of 001 may indicate 2 PUSCH repetitions, a 3-bit value of 010 may indicate 4 PUSCH repetitions, a 3-bit value of 011 may indicate 8 PUSCH repetition, and so on, regardless of a maximum number of PUSCH repetitions. This may reduce signaling complexity but may increase signaling overhead because some bit values may be unused depending on a maximum number of PUSCH repetitions. For example, if the maximum number of PUSCH repetitions is 16, then bit values representing 32 or more PUSCH repetitions may be unused.

In some aspects, the same bit value may indicate a different number of PUSCH repetitions depending on a maximum number of PUSCH repetitions determined for the UE 120. Additionally, or alternatively, some bit values may indicate the same number of PUSCH repetitions for different maximum numbers of PUSCH repetitions, while other bit values may indicate a different number of PUSCH repetitions for different maximum numbers of PUSCH repetitions. For example, a 3-bit value of 000 may indicate 1 PUSCH repetition when there are a maximum of 16 PUSCH repetitions and may also indicate 1 PUSCH repetition when there are a maximum of 32 PUSCH repetitions, a 3-bit value of 001 may indicate 2 PUSCH repetitions when there are a maximum of 16 PUSCH repetitions and may indicate 4 PUSCH repetitions when there are a maximum of 32 PUSCH repetitions, a 3-bit value of 010 may indicate 4 PUSCH repetitions when there are a maximum of 16 PUSCH repetitions and may indicate 16 PUSCH repetitions when there are a maximum of 32 PUSCH repetitions, and so on. In some aspects, the number of PUSCH repetitions indicated by a bit value may be proportional to (or may scale in proportion with) a maximum number of PUSCH repetitions.

As shown by reference number 1225, the UE 120 may transmit, to the base station 110, a set of PUSCH repetitions based at least in part on number of PUSCH repetitions indicated by the base station 110 (e.g., in connection with reference number 1220). For example, the UE 120 may transmit 16 PUSCH repetitions if the base station 110 indicates that the UE 120 is to transmit 16 PUSCH repetitions, the UE 120 may transmit 32 PUSCH repetitions if the base station 110 indicates that the UE 120 is to transmit 32 PUSCH repetitions, and so on. The base station 110 may monitor for the number of PUSCH repetitions, transmitted by the UE 120, according to the number of PUSCH repetitions indicated by the base station 110 to the UE 120.

By enabling a UE 120 to transmit up to a maximum number of PUSH repetitions that depends on an SCS configured for the UE 120 and/or a slot pattern configured for the UE 120, some techniques and apparatuses described herein improve reliability, such as by enabling the UE 120 to transmit a greater number of PUSCH repetitions. Furthermore, some techniques and apparatuses described herein increase scheduling flexibility by enabling a UE-specific maximum number of PUSCH repetitions.

As indicated above, FIG. 12 is provided as an example. Other examples may differ from what is described with respect to FIG. 12.

Figure 13:
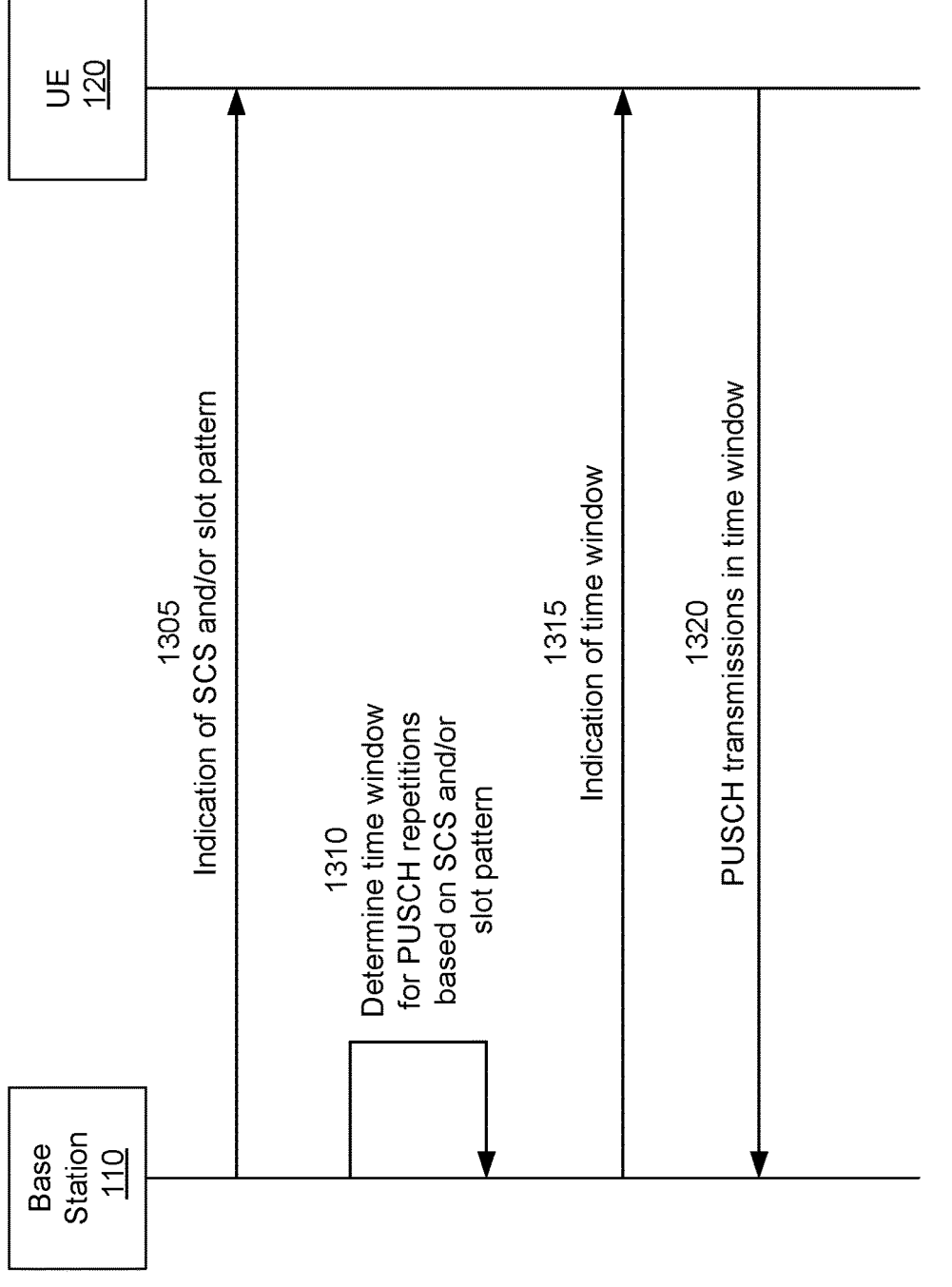
FIG. 13 is a diagram illustrating an example associated with signaling of a time window for transmission of repetitions, in accordance with the present disclosure.

FIG. 13 is a diagram illustrating an example 1300 associated with signaling of a time window for transmission of repetitions, in accordance with the present disclosure. As shown in FIG. 13, a base station 110 and a UE 120 may communicate with one another.

As shown by reference number 1305, the base station 110 may indicate, to the UE 120, an SCS and/or a slot pattern to be used by the UE 120. For example, the base station 110 may indicate the SCS and/or the slot pattern as described above in connection with reference number 1205 of FIG. 12.

As shown by reference number 1310, the base station 110 may determine a time window for PUSCH repetitions. In some aspects, the time window may be determined based at least in part on the SCS and/or the slot pattern, in a similar manner to determining the maximum number of PUSCH repetitions based at least in part on the SCS and/or the slot pattern, as described above in connection with FIG. 12. In some aspects, a larger maximum number of PUSCH repetitions described above in connection with FIG. 12 may correspond to a longer time window, and a smaller maximum number of PUSCH repetitions described above in connection with FIG. 12 may correspond to a shorter time window. Alternatively, a larger maximum number of PUSCH repetitions described above in connection with FIG. 12 may correspond to a shorter time window, and a smaller maximum number of PUSCH repetitions described above in connection with FIG. 12 may correspond to a longer time window. Alternatively, the time window may be fixed independently of an SCS and/or a slot pattern.

As shown by reference number 1315, the base station 110 may transmit, to the UE 120, an indication of the time window. For example, the base station 110 may indicate a duration of the time window, a starting time of the time window, an ending time of the time window, an offset associated with the time window, or the like. These values may be indicated in terms of an absolute time (e.g., 10 milliseconds), a number of symbols, a number of slots, a number of uplink transmissions, one or more time offsets, or the like. In some aspects, the base station 110 may transmit the indication of the time window in an RRC message. Additionally, or alternatively, the base station 110 may transmit the indication of the time window in DCI, in a MAC-CE, or the like.

As shown by reference number 1320, the UE 120 may transmit a set of PUSCH repetitions in the time window. In some aspects, the UE 120 may transmit a PUSCH repetition in each uplink transmission occasion included in the time window. The base station 110 may monitor for the set of PUSCH repetitions in the time window (e.g., in each uplink transmission occasion included in the time window). In this way, reliability may be improved.

As indicated above, FIG. 13 is provided as an example. Other examples may differ from what is described with respect to FIG. 13.

FIG. 14 is a diagram illustrating an example process 1400 performed, for example, by a mobile station, in accordance with the present disclosure. Example process 1400 is an example where the mobile station (e.g., UE 120) performs operations associated with signaling of a maximum number of transmission repetitions depending on a slot pattern or a sub-carrier spacing.

As shown in FIG. 14, in some aspects, process 1400 may include determining a maximum number of repetitions for a PUSCH based at least in part on a slot pattern configured for the mobile station or a sub-carrier spacing configured for the mobile station (block 1410). For example, the mobile station (e.g., using determination component 1808, depicted in FIG. 18) may determine a maximum number of repetitions for a PUSCH based at least in part on a slot pattern configured for the mobile station or a sub-carrier spacing configured for the mobile station, as described above.

As further shown in FIG. 14, in some aspects, process 1400 may include receiving an indication of a number of repetitions to be used for the PUSCH, wherein the number of repetitions is less than or equal to the maximum number of repetitions (block 1420). For example, the mobile station (e.g., using reception component 1802, depicted in FIG. 18) may receive an indication of a number of repetitions to be used for the PUSCH, wherein the number of repetitions is less than or equal to the maximum number of repetitions, as described above.

As further shown in FIG. 14, in some aspects, process 1400 may include transmitting a set of PUSCH repetitions based at least in part on the number of repetitions (block 1430). For example, the mobile station (e.g., using transmission component 1804, depicted in FIG. 18) may transmit a set of PUSCH repetitions based at least in part on the number of repetitions, as described above.

Process 1400 may include additional aspects, such as any single aspect or any combination of aspects described below and/or in connection with one or more other processes described elsewhere herein.

In a first aspect, the maximum number of repetitions for the PUSCH is a function of the sub-carrier spacing configured for the mobile station.

In a second aspect, alone or in combination with the first aspect, the maximum number of repetitions for the PUSCH is a product of a fixed value and a value that depends on the sub-carrier spacing configured for the mobile station.

In a third aspect, alone or in combination with one or more of the first and second aspects, the maximum number of repetitions for the PUSCH is a larger maximum number for a larger sub-carrier spacing as compared to a smaller maximum number for a smaller sub-carrier spacing.

In a fourth aspect, alone or in combination with one or more of the first through third aspects, the slot pattern indicates whether the mobile station is to communicate using TDD or FDD, and the maximum number of repetitions for the PUSCH is based at least in part on whether the mobile station is to communicate using TDD or FDD.

In a fifth aspect, alone or in combination with one or more of the first through fourth aspects, the maximum number of repetitions for the PUSCH is a larger maximum number for FDD as compared to a smaller maximum number for TDD.

In a sixth aspect, alone or in combination with one or more of the first through fifth aspects, the slot pattern indicates that the mobile station is to communicate using TDD and further indicates a ratio of uplink slots to downlink slots for TDD, and the maximum number of repetitions for the PUSCH is based at least in part on the ratio of uplink slots to downlink slots for TDD.

In a seventh aspect, alone or in combination with one or more of the first through sixth aspects, the maximum number of repetitions for the PUSCH is a larger maximum number for a larger ratio of uplink slots to downlink slots as compared to a smaller maximum number for a smaller ratio of uplink slots to downlink slots.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
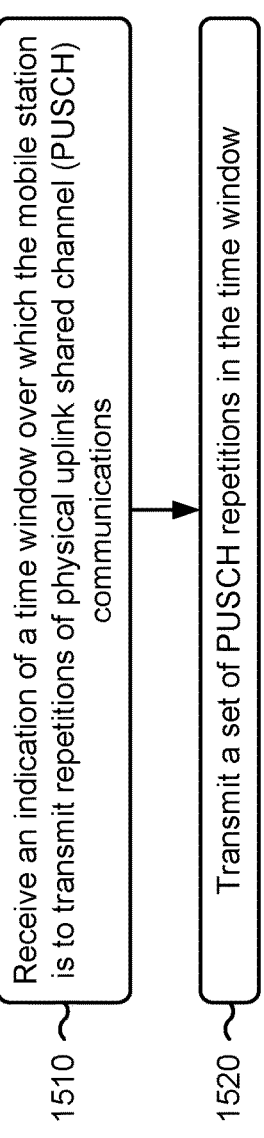

FIG. 15 is a diagram illustrating an example process 1500 performed, for example, by a mobile station, in accordance with the present disclosure. Example process 1500 is an example where the mobile station (e.g., UE 120) performs operations associated with signaling of a time window for transmission of repetitions.

As shown in FIG. 15, in some aspects, process 1500 may include receiving an indication of a time window over which the mobile station is to transmit repetitions of PUSCH communications (block 1510). For example, the mobile station (e.g., using reception component 1802, depicted in FIG. 18) may receive an indication of a time window over which the mobile station is to transmit repetitions of PUSCH communications, as described above.

As further shown in FIG. 15, in some aspects, process 1500 may include transmitting a set of PUSCH repetitions in the time window (block 1520). For example, the mobile station (e.g., using transmission component 1804, depicted in FIG. 18) may transmit a set of PUSCH repetitions in the time window, as described above.

Process 1500 may include additional aspects, such as any single aspect or any combination of aspects described below and/or in connection with one or more other processes described elsewhere herein.

In a first aspect, transmitting the set of PUSCH repetitions in the time window comprises transmitting a PUSCH repetition in each uplink transmission occasion in the time window.

In a second aspect, alone or in combination with the first aspect, a duration of the time window is based at least in part on a sub-carrier spacing configured for the mobile station.

In a third aspect, alone or in combination with one or more of the first and second aspects, a duration of the time window is based at least in part on a slot pattern configured for the mobile station.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

FIG. 16 is a diagram illustrating an example process 1600 performed, for example, by a base station, in accordance with the present disclosure. Example process 1600 is an example where the base station (e.g., base station 110) performs operations associated with signaling of a maximum number of transmission repetitions depending on a slot pattern or a sub-carrier spacing.

As shown in FIG. 16, in some aspects, process 1600 may include determining a maximum number of repetitions for PUSCH communications with a mobile station based at least in part on a slot pattern configured for the mobile station or a sub-carrier spacing configured for the mobile station (block 1610). For example, the base station (e.g., using determination component 1908, depicted in FIG. 19) may determine a maximum number of repetitions for PUSCH communications with a mobile station based at least in part on a slot pattern configured for the mobile station or a sub-carrier spacing configured for the mobile station, as described above.

As further shown in FIG. 16, in some aspects, process 1600 may include transmitting an indication of a number of repetitions to be used by the mobile station for the PUSCH communications, wherein the number of repetitions is less than or equal to the maximum number of repetitions (block 1620). For example, the base station (e.g., using transmission component 1904, depicted in FIG. 19) may transmit an indication of a number of repetitions to be used by the mobile station for the PUSCH communications, wherein the number of repetitions is less than or equal to the maximum number of repetitions, as described above.

As further shown in FIG. 16, in some aspects, process 1600 may include monitoring for a set of PUSCH repetitions from the mobile station based at least in part on the number of repetitions (block 1630). For example, the base station (e.g., using monitoring component 1910 and/or reception component 1902, depicted in FIG. 19) may monitor for a set of PUSCH repetitions from the mobile station based at least in part on the number of repetitions, as described above.

Process 1600 may include additional aspects, such as any single aspect or any combination of aspects described below and/or in connection with one or more other processes described elsewhere herein.

In a first aspect, the maximum number of repetitions for the PUSCH is a function of the sub-carrier spacing configured for the mobile station.

In a second aspect, alone or in combination with the first aspect, the maximum number of repetitions for the PUSCH is a product of a fixed value and a value that depends on the sub-carrier spacing configured for the mobile station.

In a third aspect, alone or in combination with one or more of the first and second aspects, the maximum number of repetitions for the PUSCH is a larger maximum number for a larger sub-carrier spacing as compared to a smaller maximum number for a smaller sub-carrier spacing.

In a fourth aspect, alone or in combination with one or more of the first through third aspects, the slot pattern indicates whether the mobile station is to communicate using TDD or FDD, and the maximum number of repetitions for the PUSCH is based at least in part on whether the mobile station is to communicate using TDD or FDD.

In a fifth aspect, alone or in combination with one or more of the first through fourth aspects, the maximum number of repetitions for the PUSCH is a larger maximum number for FDD as compared to a smaller maximum number for TDD.

In a sixth aspect, alone or in combination with one or more of the first through fifth aspects, the slot pattern indicates that the mobile station is to communicate using TDD and further indicates a ratio of uplink slots to downlink slots for TDD, and the maximum number of repetitions for the PUSCH is based at least in part on the ratio of uplink slots to downlink slots for TDD.

In a seventh aspect, alone or in combination with one or more of the first through sixth aspects, the maximum number of repetitions for the PUSCH is a larger maximum number for a larger ratio of uplink slots to downlink slots as compared to a smaller maximum number for a smaller ratio of uplink slots to downlink slots.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
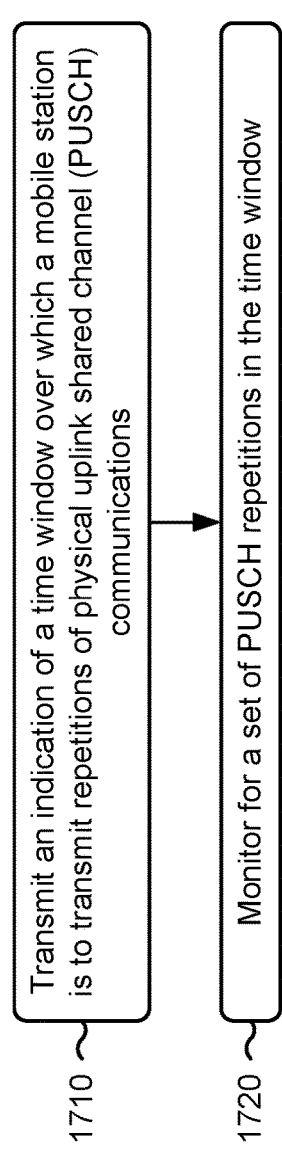

FIG. 17 is a diagram illustrating an example process 1700 performed, for example, by a base station, in accordance with the present disclosure. Example process 1700 is an example where the base station (e.g., base station 110) performs operations associated with signaling of a time window for transmission of repetitions.

As shown in FIG. 17, in some aspects, process 1700 may include transmitting an indication of a time window over which a mobile station is to transmit repetitions of PUSCH communications (block 1710). For example, the base station (e.g., using transmission component 1904, depicted in FIG. 19) may transmit an indication of a time window over which a mobile station is to transmit repetitions of PUSCH communications, as described above.

As further shown in FIG. 17, in some aspects, process 1700 may include monitoring for a set of PUSCH repetitions in the time window (block 1720). For example, the base station (e.g., using monitoring component 1910 and/or reception component 1902, depicted in FIG. 19) may monitor for a set of PUSCH repetitions in the time window, as described above.

Process 1700 may include additional aspects, such as any single aspect or any combination of aspects described below and/or in connection with one or more other processes described elsewhere herein.

In a first aspect, process 1700 includes determining the time window based at least in part on a slot pattern configured for the mobile station or a sub-carrier spacing configured for the mobile station.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
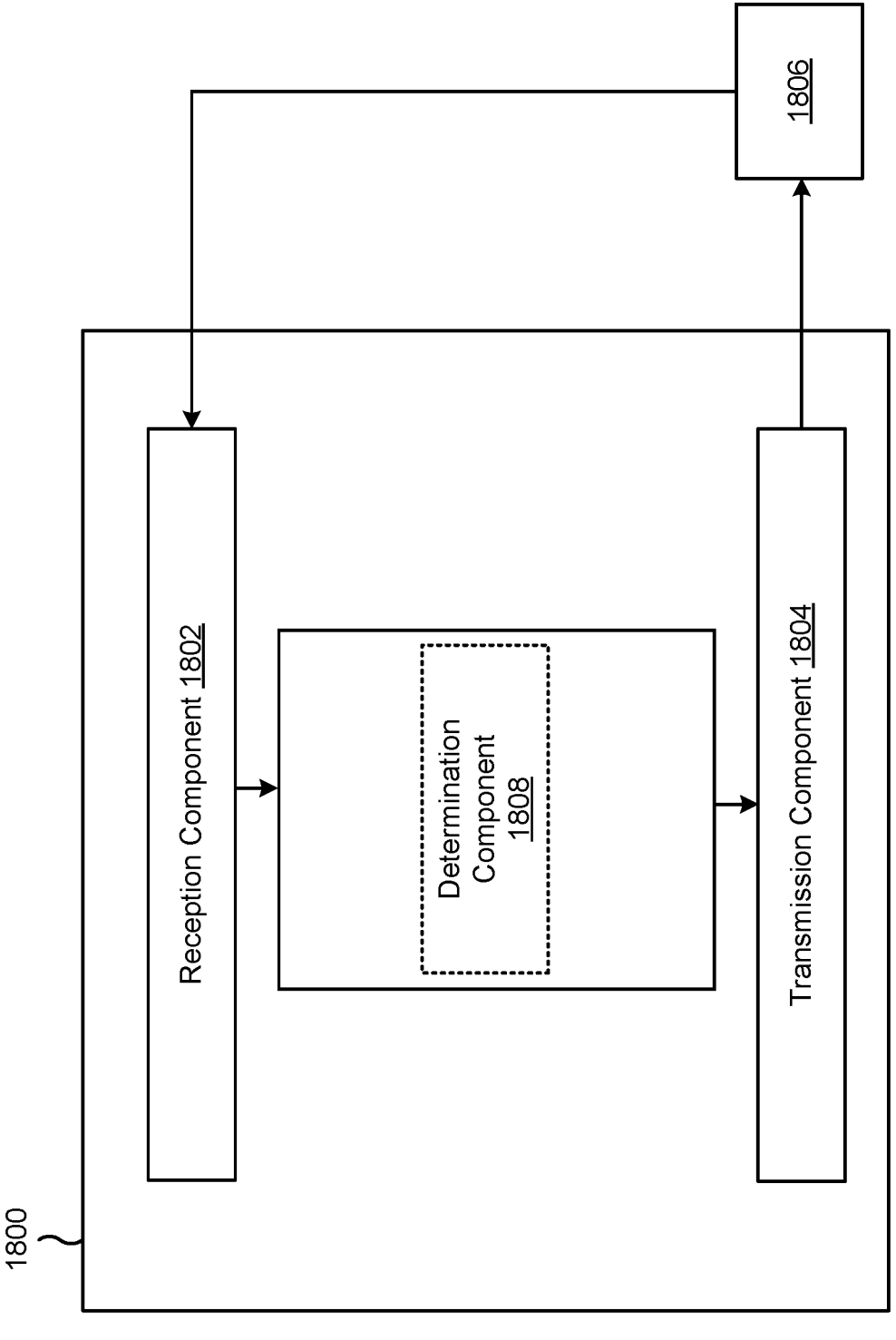
FIGS. 18 and 19 are block diagrams of example apparatuses for wireless communication, in accordance with the present disclosure.

FIG. 18 is a block diagram of an example apparatus 1800 for wireless communication. The apparatus 1800 may be a UE (e.g., a mobile station), or a UE may include the apparatus 1800. In some aspects, the apparatus 1800 includes a reception component 1802 and a transmission component 1804, which may be in communication with one another (for example, via one or more buses and/or one or more other components). As shown, the apparatus 1800 may communicate with another apparatus 1806 (such as a UE, a base station, or another wireless communication device) using the reception component 1802 and the transmission component 1804. As further shown, the apparatus 1800 may include a determination component 1808, among other examples.

In some aspects, the apparatus 1800 may be configured to perform one or more operations described herein in connection with FIGS. 12-13. Additionally, or alternatively, the apparatus 1800 may be configured to perform one or more processes described herein, such as process 1400 of FIG. 14, process 1500 of FIG. 15, or a combination thereof. In some aspects, the apparatus 1800 and/or one or more components shown in FIG. 18 may include one or more components of the UE described above in connection with FIG. 2. Additionally, or alternatively, one or more components shown in FIG. 18 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1802 may receive communications, such as reference signals, control information, data communications, or a combination thereof, from the apparatus 1806. The reception component 1802 may provide received communications to one or more other components of the apparatus 1800. In some aspects, the reception component 1802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1806. In some aspects, the reception component 1802 may include one or more antennas, a demodulator, a MIMO detector, a receive processor, a controller/processor, a memory, or a combination thereof, of the UE described above in connection with FIG. 2.

The transmission component 1804 may transmit communications, such as reference signals, control information, data communications, or a combination thereof, to the apparatus 1806. In some aspects, one or more other components of the apparatus 1806 may generate communications and may provide the generated communications to the transmission component 1804 for transmission to the apparatus 1806. In some aspects, the transmission component 1804 may perform signal processing on the generated communications (such as filtering, amplification, modulation, digital-to-analog conversion, multiplexing, interleaving, mapping, or encoding, among other examples), and may transmit the processed signals to the apparatus 1806. In some aspects, the transmission component 1804 may include one or more antennas, a modulator, a transmit MIMO processor, a transmit processor, a controller/processor, a memory, or a combination thereof, of the UE described above in connection with FIG. 2. In some aspects, the transmission component 1804 may be co-located with the reception component 1802 in a transceiver.

The determination component 1808 may determine a maximum number of repetitions for a PUSCH based at least in part on a slot pattern configured for the mobile station or a sub-carrier spacing configured for the mobile station. The reception component 1802 may receive an indication of a number of repetitions to be used for the PUSCH, wherein the number of repetitions is less than or equal to the maximum number of repetitions. The transmission component 1804 may transmit a set of PUSCH repetitions based at least in part on the number of repetitions.

The reception component 1802 may receive an indication of a time window over which the mobile station is to transmit repetitions of PUSCH communications. The transmission component 1804 may transmit a set of PUSCH repetitions in the time window.

The number and arrangement of components shown in FIG. 18 are provided as an example. In practice, there may be additional components, fewer components, different components, or differently arranged components than those shown in FIG. 18. Furthermore, two or more components shown in FIG. 18 may be implemented within a single component, or a single component shown in FIG. 18 may be implemented as multiple, distributed components. Additionally, or alternatively, a set of (one or more) components shown in FIG. 18 may perform one or more functions described as being performed by another set of components shown in FIG. 18.

Figure 19:
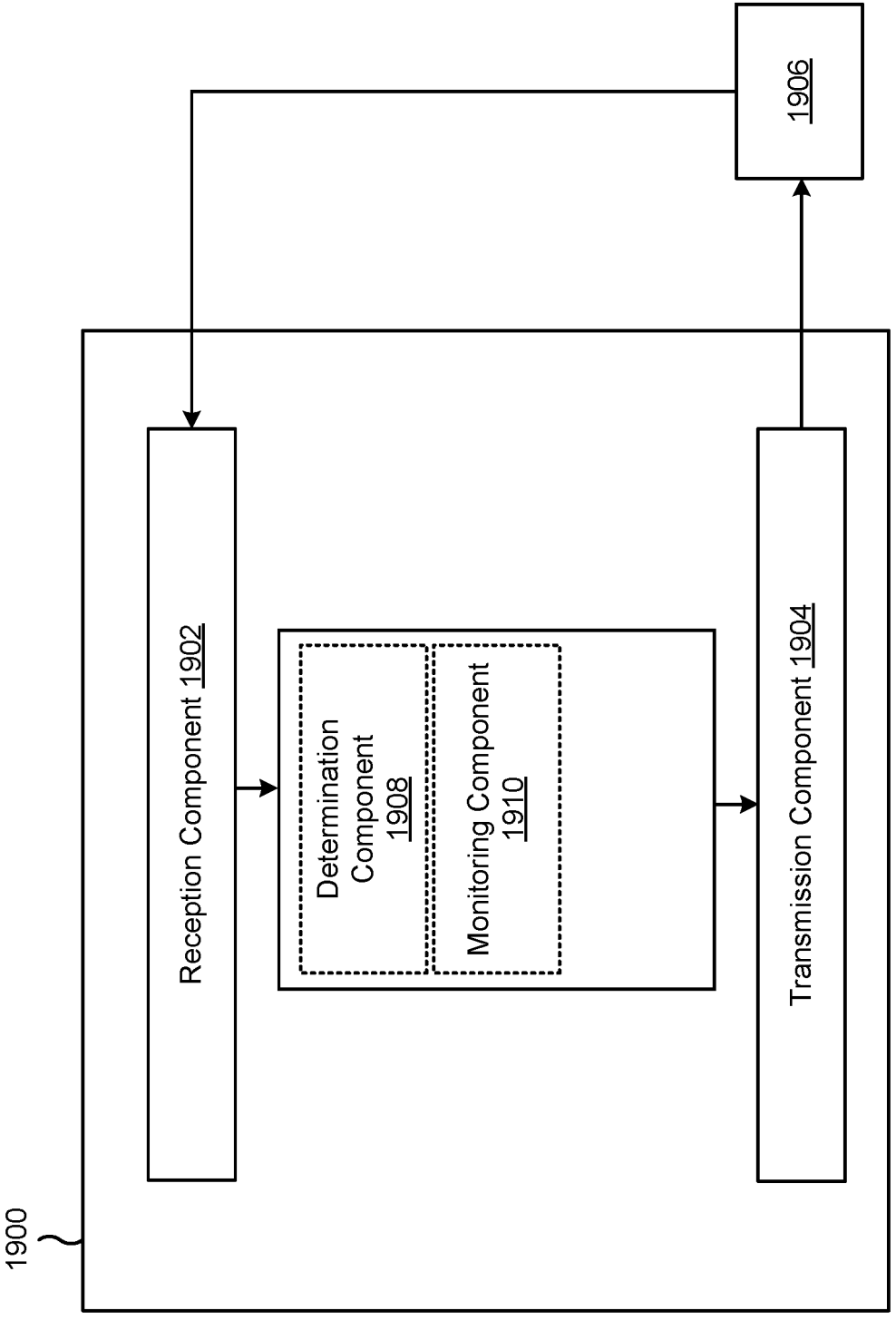

FIG. 19 is a block diagram of an example apparatus 1900 for wireless communication. The apparatus 1900 may be a base station, or a base station may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904. As further shown, the apparatus 1900 may include one or more of a determination component 1908 or a monitoring component 1910, among other examples.

In some aspects, the apparatus 1900 may be configured to perform one or more operations described herein in connection with FIGS. 12-13. Additionally, or alternatively, the apparatus 1900 may be configured to perform one or more processes described herein, such as process 1600 of FIG. 16, process 1700 of FIG. 17, or a combination thereof. In some aspects, the apparatus 1900 and/or one or more components shown in FIG. 19 may include one or more components of the base station described above in connection with FIG. 2. Additionally, or alternatively, one or more components shown in FIG. 19 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1906. In some aspects, the reception component 1902 may include one or more antennas, a demodulator, a MIMO detector, a receive processor, a controller/processor, a memory, or a combination thereof, of the base station described above in connection with FIG. 2.

The transmission component 1904 may transmit communications, such as reference signals, control information, data communications, or a combination thereof, to the apparatus 1906. In some aspects, one or more other components of the apparatus 1906 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modulator, a transmit MIMO processor, a transmit processor, a controller/processor, a memory, or a combination thereof, of the base station described above in connection with FIG. 2. In some aspects, the transmission component 1904 may be co-located with the reception component 1902 in a transceiver.

The determination component 1908 may determine a maximum number of repetitions for PUSCH communications with a mobile station based at least in part on a slot pattern configured for the mobile station or a sub-carrier spacing configured for the mobile station. The transmission component 1904 may transmit an indication of a number of repetitions to be used by the mobile station for the PUSCH communications, wherein the number of repetitions is less than or equal to the maximum number of repetitions. The monitoring component 1910 and/or the reception component 1902 may monitor for a set of PUSCH repetitions from the mobile station based at least in part on the number of repetitions.

The transmission component 1904 may transmit an indication of a time window over which a mobile station is to transmit repetitions of PUSCH communications. The monitoring component 1910 and/or the reception component 1902 may monitor for a set of PUSCH repetitions in the time window.

The determination component 1908 may determine the time window based at least in part on a slot pattern configured for the mobile station or a sub-carrier spacing configured for the mobile station.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

FIG. 20 is a diagram illustrating an example 2000 of redundancy version cycling based on uplink transmission occasions, in accordance with the present disclosure. A UE 120 may apply redundancy version cycling to PUSCH repetitions to transmit different redundancy versions of the PUSCH repetition in different transmission occasions.

A "redundancy version" (RV) of a PUSCH repetition refers to a set of encoded bits that are transmitted for that PUSCH repetition. Using RV cycling, the UE 120 transmits a different set of encoded bits in different PUSCH repetitions. For example, the UE 120 may store bits for an uplink transmission in a circular buffer 2005 (e.g., stored in memory of the UE 120). The circular buffer 2005 stores information bits 2010 and parity bits 2015 (sometimes called parity-check bits). The information bits 2010 may include the data to be transmitted, and the parity bits 2015 may include linear combinations of the data (e.g., of the information bits 2010). The UE 120 may encode information bits 2010, parity bits 2015, or a combination of information bits 2010 and parity bits 2015 into a set of encoded bits, and may transmit the set of encoded bits. The particular bits that are selected to be included in the set of encoded bits for a PUSCH repetition depend on (or are defined by) the RV of that PUSCH repetition.

For example, for a PUSCH repetition having RV0, the UE 120 transmits a sequence of encoded bits (e.g., a particular number of encoded bits) starting at a first location 2020 in the circular buffer 2005 (e.g., bit 0, or a first information bit). Similarly, the UE 120 transmits a sequence of encoded bits starting at a second location 2025 in the circular buffer 2005 for a PUSCH repetition having RV1, the UE 120 transmits a sequence of encoded bits starting at a third location 2030 in the circular buffer 2005 for a PUSCH repetition having RV2, and the UE 120 transmits a sequence of encoded bits starting at a fourth location 2035 in the circular buffer 2005 for a PUSCH repetition having RV3.

As an example, the starting bit locations may be defined by a table 2040, such as for NR hybrid automatic repeat request (HARQ) using low-density parity-check (LDPC) code. The table 2040 defines starting bit locations in the circular buffer 2005 for a first base graph (BG1) and a second base graph (BG2). A base graph is a parameter for determining parity bits 2015 for a transmission based at least in part on a transport block (TB) size and a code rate (with BG1 being intended for TBs with a larger TB size, and BG2 being intended for TBs with a smaller TB size). Referring to the table, $N_{cb}$) represents the length of the circular buffer 2005 (e.g., the number of bits included in the circular buffer 2005), and $Z_c$ represents a lifting size, which is based at least in part on the number of information bits 2010 and the number of BG columns corresponding to information bits 2010.

In some examples, a base station 110 may transmit information, such as an RV index, shown as $rv_{id}$, to the UE 120. For example, the base station 110 may transmit the RV index for a PUSCH communication (e.g., a PUSCH transmission) in downlink control information (DCI) that schedules the PUSCH communication. The RV index may indicate a sequence of RVs to be applied to a corresponding sequence of PUSCH transmission occasions (e.g., PUSCH opportunities). The UE 120 may increment a counter n (sometimes called an index n) for each uplink transmission occasion following (or indicated by) the DCI. The UE 120 may use the information transmitted by the base station 110 (e.g., the RV index) and the value of the counter n for a particular transmission occasion to determine an RV to be applied to that transmission occasion.

For example, as shown by table 2045, for PUSCH Repetition Type A, if the base station 110 indicates an $rv_{id}$ of 0, then the UE 120 may determine an RV to be applied to an $n^{th}$ transmission occasion (e.g., for PUSCH Repetition Type A) by calculating n mod 4, where mod represents a modulo operation. If n mod 4=0 (e.g., for transmission occasion 0, such as Slot 1 shown in connection with reference number 310 of FIG. 3 for PUSCH Repetition Type A), then the UE 120 applies RV0 to that transmission occasion. If n mod 4=1 (e.g., for transmission occasion 1, such as Slot 2 shown in connection with reference number 310 of FIG. 3), then the UE 120 applies RV2 to that transmission occasion. If n mod 4=2 (e.g., for transmission occasion 2, such as Slot 3 shown in connection with reference number 310 of FIG. 3), then the UE 120 applies RV3 to that transmission occasion. If n mod 4=3 (e.g., for transmission occasion 3, such as Slot 4 shown in connection with reference number 310 of FIG. 3), then the UE 120 applies RV1 to that transmission occasion. As shown, the RV index may have a value of 0, 1, 2, or 3, each of which corresponds to a different sequence of RVs (e.g., a different order for RV0, RV1, RV2, and RV3).

Similarly, for PUSCH Repetition Type B, if the base station 110 indicates an $rv_{id}$ of 0, then the UE 120 may determine an RV to be applied to an $n^{th}$ actual repetition (e.g., of PUSCH Repetition Type B) by calculating n mod 4, where mod represents a modulo operation. If n mod 4=0 (e.g., for actual repetition 0, such as Rep #1 shown in connection with reference number 350 of FIG. 3 for PUSCH Repetition Type B), then the UE 120 applies RV0 to that actual repetition. If n mod 4=1 (e.g., for actual repetition 1, such as Rep #2 shown in connection with reference number 350 of FIG. 3), then the UE 120 applies RV2 to that actual repetition. If n mod 4=2 (e.g., for actual repetition 2, such as Rep #3 shown in connection with reference number 350 of FIG. 3), then the UE 120 applies RV3 to that actual repetitions. If n mod 4=3 (e.g., for actual repetition 3, not shown in FIG. 3), then the UE 120 applies RV1 to that actual repetition.

Despite the terminology, an actual repetition (like a nominal repetition) may or may not be actually transmitted by the UE 120 in an uplink transmission occasion. For example, if the UE 120 does not have sufficient time to prepare for a transmission in an uplink transmission occasion, if the uplink transmission occasion (e.g., an uplink slot) is reconfigured as a downlink occasion (e.g., a downlink slot), or if an uplink transmission is cancelled, then the UE 120 may refrain from transmitting a nominal repetition or an actual repetition in the uplink transmission occasion. To differentiate from the use of the term "actual repetition" for PUSCH Repetition Type B, FIGS. 20-26 of the present disclosure (and corresponding description) use the term "actual PUSCH repetition transmission" to refer to a repetition (whether a nominal repetition or an actual repetition) that is actually transmitted by the UE 120. Furthermore, language like "actually transmits," "actually transmitted," and the like is used in connection with FIGS. 20-26 to refer to actual transmission of a repetition by the UE 120 and to distinguish from the meaning of an "actual repetition" in connection with PUSCH Repetition Type B.

Using the RV cycling technique shown in table 2045, the UE 120 will increment the counter n and will advance to the next RV in the RV sequence (e.g., the RV sequence of {0, 2, 3, 1} for an indicated $rv_{id}$ of 0) regardless of whether the UE 120 actually transmits a PUSCH repetition. For example, for PUSCH Repetition Type A, the UE 120 may increment the counter n upon the occurrence of a transmission occasion, regardless of whether the UE 120 actually transmits a PUSCH repetition in that transmission occasion. Similarly, for PUSCH Repetition Type B, the UE 120 may increment the counter n upon the occurrence of an actual repetition (e.g., for the symbols in which the actual repetition is scheduled or is to be transmitted), regardless of whether the UE 120 actually transmits the actual repetition. This can result in some RVs being skipped, as described in more detail below in connection with FIG. 21, which can have a negative impact on decoding performance and can increase the likelihood of communication errors, retransmissions, and the like.

As indicated above, FIG. 20 is provided as an example. Other examples may differ from what is described with respect to FIG. 20.

Figure 21:
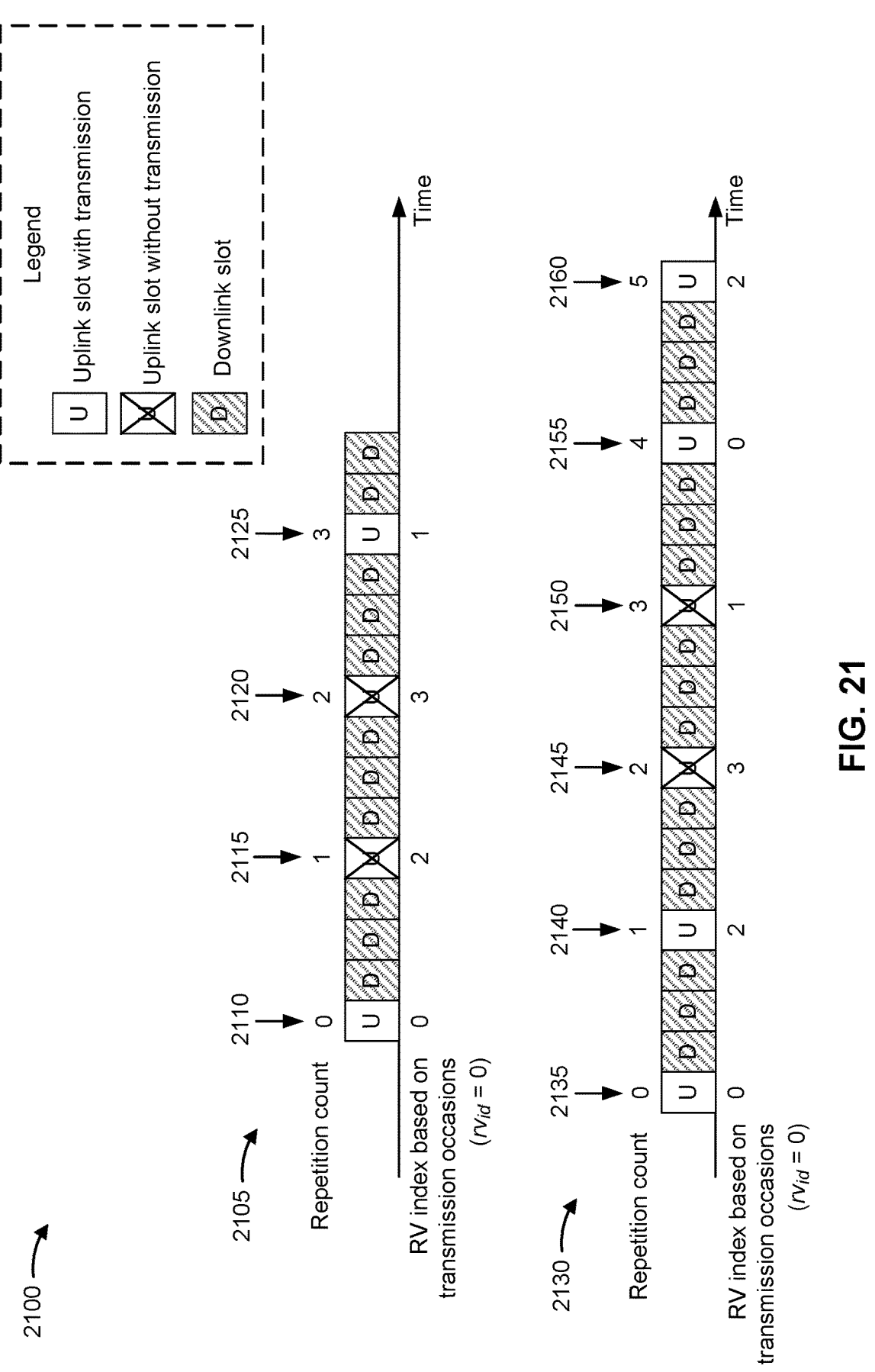

FIG. 21 is a diagram illustrating an example 2100 of redundancy version cycling based on uplink transmission occasions, in accordance with the present disclosure. FIG. 21 shows some examples of RVs being skipped when the UE 120 employs an RV cycling technique that increments a counter n and advances to the next RV in an RV sequence regardless of whether the UE 120 actually transmits a PUSCH repetition (e.g., as described above in connection with FIG. 20).

In a first scenario 2105, using the RV cycling technique described above in connection with table 2045 of FIG. 20, the UE 120 may apply an RV index of 0 (e.g., indicating RV0) to a first transmission occasion 2110 having a repetition count (e.g., counter) value of 0, may apply an RV index of 2 (e.g., indicating RV2) to a second transmission occasion 2115 having a repetition count value of 1, may apply an RV index of 3 (e.g., indicating RV3) to a third transmission occasion 2120 having a repetition count value of 2, and may apply an RV index of 1 (e.g., indicating RV1) to a fourth transmission occasion 2125 having a repetition count value of 3.

In the first scenario 2105, the UE 120 does not actually transmit a PUSCH repetition in the second transmission occasion 2115, and does not actually transmit a PUSCH repetition in the third transmission occasion 2120 (e.g., due to transmission cancellation). As a result, RV2 and RV3 are skipped (e.g., are not applied to any PUSCH repetitions that are actually transmitted). Instead, the UE 120 transmits RV0 and RV1. However, transmission of RV0 and RV1 results in lower decoding performance as compared to transmission of RV0 and RV2 because the combination of RV0 and RV2 provides better bit differentiation than the combination of RV0 and RV1 due to RV design. For example, the base station 110 may be able to infer correct bits and incorrect bits more accurately when the base station receives RV0 and RV2 as compared to when the base station 110 receives RV0 and RV1. Thus, by counting transmission occasions rather than actual transmissions, performance is degraded.

In a second scenario 2130, using the RV cycling technique described above in connection with table 2045 of FIG. 20, the UE 120 may apply an RV index of 0 (e.g., indicating RV0) to a first transmission occasion 2135 having a repetition count (e.g., counter) value of 0, may apply an RV index of 2 (e.g., indicating RV2) to a second transmission occasion 2140 having a repetition count value of 1, may apply an RV index of 3 (e.g., indicating RV3) to a third transmission occasion 2145 having a repetition count value of 2, may apply an RV index of 1 (e.g., indicating RV1) to a fourth transmission occasion 2150 having a repetition count value of 3, may apply the RV index of 0 (e.g., indicating RV0) to a fifth transmission occasion 2155 having a repetition count value of 4, and may apply the RV index of 2 (e.g., indicating RV2) to a sixth transmission occasion 2160 having a repetition count value of 5.

In the second scenario 2130, the UE 120 does not actually transmit a PUSCH repetition in the third transmission occasion 2145, and does not actually transmit a PUSCH repetition in the fourth transmission occasion 2150 (e.g., due to transmission cancellation). As a result, RV3 and RV1 are skipped (e.g., are not applied to any PUSCH repetitions that are actually transmitted), and the UE 120 transmits RV0 twice and transmits RV2 twice. However, transmission of each of RV0 and RV2 twice results in lower decoding performance as compared to transmission of RV0, RV1, RV2, and RV3 because the combination of RV0, RV1, RV2, and RV3 provides better bit differentiation than the combination of only RV0 and RV2 due to RV design. For example, the base station 110 may be able to infer correct bits and incorrect bits more accurately when the base station receives RV0, RV1, RV2, and RV3 as compared to when the base station 110 receives only RV0 and RV2. Thus, by counting transmission occasions rather than actual transmissions, performance is degraded.

Some techniques and apparatuses described herein improve performance by enabling a UE 120 to increment a counter n and advance to the next RV in an RV sequence only if the UE 120 actually transmits a PUSCH repetition. For example, the UE 120 may increment the counter n and advance to the next RV in the RV sequence if the UE 120 actually transmits a PUSCH repetition in a transmission occasion, and may refrain from incrementing the counter n and advancing to the next RV in the RV sequence if the UE 120 does not actually transmit a PUSCH repetition in a transmission occasion.

As indicated above, FIG. 21 is provided as an example. Other examples may differ from what is described with respect to FIG. 21.

Figure 22:
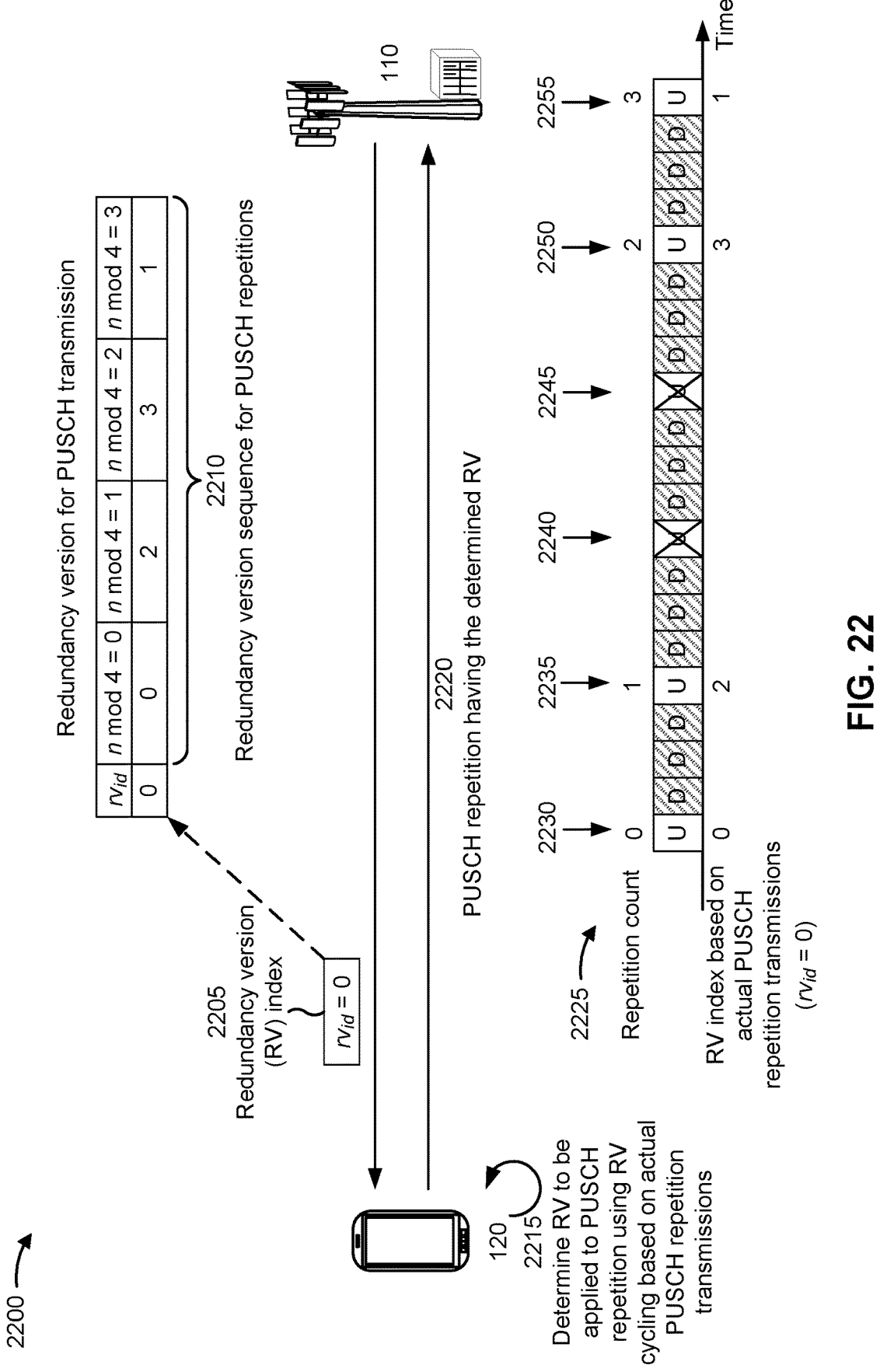
FIG. 22 is a diagram illustrating an example associated with redundancy version cycling based on actual PUSCH repetition transmissions, in accordance with the present disclosure.

FIG. 22 is a diagram illustrating an example 2200 associated with redundancy version cycling based on actual PUSCH repetition transmissions, in accordance with the present disclosure. As shown in FIG. 22, a base station 110 and a UE 120 may communicate with one another.

As show by reference number 2205, the UE 120 (e.g., a mobile station) may receive an RV index (shown as $rv_{id}$) from the base station 110. For example, the UE 120 may receive the RV index in DCI that schedules one or more PUSCH repetitions. In some aspects, the RV index may have a value of 0, 1, 2, or 3, as described above in connection with FIG. 20.

As shown by reference number 2210, the RV index may indicate a sequence of RVs to be applied to a corresponding sequence of PUSCH repetitions. For example, the UE 120 may apply the sequence of RVs to a sequence of actual PUSCH repetition transmissions (e.g., for both PUSCH Repetition Type A and PUSCH Repetition Type B), rather than applying the sequence of RVs to transmission occasions (e.g., for PUSCH Repetition Type A) or actual repetitions (e.g., for PUSCH Repetition Type B).

As shown by reference number 2215, the UE 120 may determine an RV (e.g., an RV index, determined based at least in part on the indicated RV index and a table stored in memory of the UE 120) to be applied to a PUSCH repetition using an RV cycling technique that cycles RVs based at least in part on actual PUSCH repetition transmissions. For example, the UE 120 may increment a transmission index n (and may advance to a next RV in the RV sequence) only if actual PUSCH repetition transmission occurs (e.g., only if a PUSCH repetition is actually transmitted). In other words, the UE 120 may increment the transmission index n (and may advance to a next RV in the RV sequence) if actual PUSCH repetition transmission occurs, and may refrain from incrementing the transmission index n (and may refrain from advancing to a next RV in the RV sequence) if actual PUSCH repetition transmission does not occur (e.g., if a PUSCH repetition is not actually transmitted).

As shown by reference number 2220, the UE 120 may transmit the PUSCH repetition having the determined RV. For example, the UE 120 may determine the RV to be applied to the PUSCH repetition using the RV cycling technique that is based at least in part on actual PUSCH repetition transmission, and may transmit the determined RV of the PUSCH repetition. The UE 120 may continue to increment or refrain from incrementing the transmission index (and may continue to advance or refrain from advancing to the next RV in the sequence of RVs), for each PUSCH repetition in the sequence of PUSCH repetitions, depending on whether actual transmission of each PUSCH repetition occurs. The base station 110 may increment or refrain from incrementing the transmission index (and may advance or refrain from advancing to the next RV in the sequence of RVs) in the same manner as the UE 120 so that there is no ambiguity between the base station 110 and the UE 120 regarding which RV was transmitted by the UE 120. The base station 110 may then monitor for the appropriate RV, transmitted by the UE 120.

In an example 2225, using an RV cycling technique that is based at least in part on actual PUSCH repetition transmissions, the UE 120 may initialize a transmission index n to 0, and may apply an RV index of 0 (e.g., indicating RV0) to a first actual PUSCH repetition transmission 2230 (e.g., because 0 mod 4=0, corresponding to RV0 in the table). Because the first actual PUSCH repetition transmission 2230 is actually transmitted by the UE 120, the UE 120 may increment the transmission index n to 1. Using the transmission index value of 1, the UE 120 may apply an RV index of 2 (e.g., indicating RV2) to a second actual PUSCH repetition transmission 2235 (e.g., because 1 mod 4=1, corresponding to RV2 in the table). Because the second actual PUSCH repetition transmission 2235 is actually transmitted by the UE 120, the UE 120 may increment the transmission index n to 2.

In a transmission occasion 2240, the UE 120 does not actually transmit a PUSCH repetition. Thus, the UE 120 refrains from incrementing the transmission index n, which would then still have a value of 2. Similarly, in a transmission occasion 2245, the UE 120 does not actually transmit a PUSCH repetition. Thus, the UE 120 refrains from incrementing the transmission index n, which would then still have a value of 2. Using the transmission index value of 2, the UE 120 may apply an RV index of 3 (e.g., indicating RV3) to a third actual PUSCH repetition transmission 2250 (e.g., because 2 mod 4=2, corresponding to RV3 in the table). Because the third actual PUSCH repetition transmission 2250 is actually transmitted by the UE 120, the UE 120 may increment the transmission index n to 3. Using the transmission index value of 3, the UE 120 may apply an RV index of 1 (e.g., indicating RV1) to a fourth actual PUSCH repetition transmission 2255 (e.g., because 3 mod 4=3, corresponding to RV1 in the table). Because the fourth actual PUSCH repetition transmission 2255 is actually transmitted by the UE 120, the UE 120 may increment the transmission index n to 4, which may cycle back to RV0 (e.g., because 4 mod 4=0, corresponding to RV0 in the table) for the next actual PUSCH repetition (not shown).

In some scenarios, the UE 120 may be incapable of transmitting a full PUSCH repetition transmission. In these scenarios, the UE 120 may transmit a partial PUSCH repetition transmission, in some aspects. As used herein, a "full PUSCH repetition transmission" or a "full PUSCH repetition" means that all symbols of the PUSCH repetition are transmitted by the UE 120 (e.g., no symbols of the PUSCH repetition are dropped by the UE 120). As used herein, a "partial PUSCH repetition transmission" or a "partial PUSCH repetition" means that fewer than all symbols of the PUSCH repetition are transmitted by the UE 120 (e.g., at least one symbol of the PUSCH repetition is dropped by the UE 120).

In some aspects, the UE 120 may increment the transmission index (and advance to a next RV in the sequence of RVs) only if full PUSCH repetition transmission occurs (e.g., only if a full PUSCH repetition is actually transmitted). Thus, the UE 120 may increment the transmission index (and advance to a next RV in the sequence of RVs) if full PUSCH repetition transmission occurs, and may refrain from incrementing the transmission index (and may refrain from advancing to a next RV in the sequence of RVs) if full PUSCH repetition transmission does not occur. In such aspects, the UE 120 may refrain from incrementing the transmission index (and may refrain from advancing to a next RV in the sequence of RVs) if partial PUSCH repetition occurs (e.g., if a partial PUSCH repetition is actually transmitted).

Alternatively, the UE 120 may increment the transmission index (and advance to a next RV in the sequence of RVs) if partial PUSCH repetition transmission occurs (e.g., if a partial PUSCH repetition is actually transmitted). Thus, the UE 120 may increment the transmission index (and advance to a next RV in the sequence of RVs) if partial PUSCH repetition transmission occurs, and may refrain from incrementing the transmission index (and may refrain from advancing to a next RV in the sequence of RVs) if partial (and full) PUSCH repetition transmission does not occur.

In some aspects, the UE 120 may determine a number of symbols transmitted in a partial PUSCH repetition transmission, and may increment the transmission index (and advance to a next RV in the sequence of RVs) if the number of symbols satisfies a threshold (e.g., is greater than the threshold, or is greater than or equal to the threshold). If the number of symbols transmitted in the partial PUSCH repetition does not satisfy the threshold (e.g., is less than the threshold, or is less than or equal to the threshold), then the UE 120 may refrain from incrementing the transmission index (and may refrain from advancing to a next RV in the sequence of RVs).

Using this RV cycling technique, the UE 120 does not skip any RVs, which leads to better performance as described above. For example, this RV cycling technique may enable the base station 110 to infer correct bits and incorrect bits more accurately as compared to an RV cycling technique that is based on transmission occasions or actual repetitions, as described above in connection with FIGS. 20 and 21.

As indicated above, FIG. 22 is provided as an example. Other examples may differ from what is described with respect to FIG. 22.

FIG. 23 is a diagram illustrating an example process 2300 performed, for example, by a mobile station, in accordance with the present disclosure. Example process 2300 is an example where the mobile station (e.g., UE 120) performs operations associated with RV cycling based on actual PUSCH repetition transmissions.

As shown in FIG. 23, in some aspects, process 2300 may include receiving a redundancy version index that indicates a sequence of redundancy versions to be applied to a corresponding sequence of PUSCH repetitions (block 2310). For example, the mobile station (e.g., using reception component 2502, depicted in FIG. 25) may receive a redundancy version index that indicates a sequence of redundancy versions to be applied to a corresponding sequence of PUSCH repetitions, as described above.

As further shown in FIG. 23, in some aspects, process 2300 may include transmitting a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur (block 2320). For example, the mobile station (e.g., using transmission component 2504, depicted in FIG. 25) may transmit a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur, as described above.

Process 2300 may include additional aspects, such as any single aspect or any combination of aspects described below and/or in connection with one or more other processes described elsewhere herein.

In a first aspect, process 2300 includes incrementing the transmission index based at least in part on determining that actual PUSCH repetition transmission occurs for a prior PUSCH repetition, of the sequence of PUSCH repetitions, that precedes the PUSCH repetition, and determining the redundancy version of the PUSCH repetition based at least in part on the incremented transmission index.

In a second aspect, alone or in combination with the first aspect, process 2300 includes refraining from incrementing the transmission index based at least in part on determining that actual PUSCH repetition transmission does not occur for a prior PUSCH repetition, of the sequence of PUSCH repetitions, that precedes the PUSCH repetition, and determining the redundancy version of the PUSCH repetition based at least in part on the transmission index.

In a third aspect, alone or in combination with one or more of the first and second aspects, the transmission index is incremented if full PUSCH repetition transmission occurs, and the transmission index is not incremented if full PUSCH repetition transmission does not occur.

In a fourth aspect, alone or in combination with one or more of the first through third aspects, the transmission index is incremented if partial PUSCH repetition transmission occurs, and the transmission index is not incremented if partial PUSCH repetition transmission does not occur.

In a fifth aspect, alone or in combination with one or more of the first through fourth aspects, the transmission index is incremented if partial PUSCH repetition transmission, that comprises a first number of symbols that satisfies a threshold, occurs, and the transmission index is not incremented if partial PUSCH repetition transmission, that comprises a second number of symbols that does not satisfy the threshold, occurs.

Although FIG. 23 shows example blocks of process 2300, in some aspects, process 2300 may include additional blocks, fewer blocks, different blocks, or differently arranged blocks than those depicted in FIG. 23. Additionally, or alternatively, two or more of the blocks of process 2300 may be performed in parallel.

FIG. 24 is a diagram illustrating an example process 2400 performed, for example, by a base station, in accordance with the present disclosure. Example process 2400 is an example where the base station (e.g., base station 110) performs operations associated with RV cycling based on actual PUSCH repetition transmissions.

As shown in FIG. 24, in some aspects, process 2400 may include transmitting a redundancy version index that indicates, to a mobile station, a sequence of redundancy versions to be applied to a corresponding sequence of PUSCH repetitions (block 2410). For example, the base station (e.g., using transmission component 2604, depicted in FIG. 26) may transmit a redundancy version index that indicates, to a mobile station, a sequence of redundancy versions to be applied to a corresponding sequence of PUSCH repetitions, as described above.

As further shown in FIG. 24, in some aspects, process 2400 may include monitoring for a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur (block 2420). For example, the base station (e.g., using monitoring component 2608 or reception component 2602, depicted in FIG. 26) may monitor for a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur, as described above.

Process 2400 may include additional aspects, such as any single aspect or any combination of aspects described below and/or in connection with one or more other processes described elsewhere herein.

In a first aspect, process 2400 includes incrementing the transmission index based at least in part on determining that actual PUSCH repetition transmission occurs for a prior PUSCH repetition, of the sequence of PUSCH repetitions, that precedes the PUSCH repetition, and determining the redundancy version of the PUSCH repetition based at least in part on the incremented transmission index.

In a second aspect, alone or in combination with the first aspect, process 2400 includes refraining from incrementing the transmission index based at least in part on determining that actual PUSCH repetition transmission does not occur for a prior PUSCH repetition, of the sequence of PUSCH repetitions, that precedes the PUSCH repetition, and determining the redundancy version of the PUSCH repetition based at least in part on the transmission index.

In a third aspect, alone or in combination with one or more of the first and second aspects, the transmission index is incremented if full PUSCH repetition transmission occurs, and the transmission index is not incremented if full PUSCH repetition transmission does not occur.

In a fourth aspect, alone or in combination with one or more of the first through third aspects, the transmission index is incremented if partial PUSCH repetition transmission occurs, and the transmission index is not incremented if partial PUSCH repetition transmission does not occur.

In a fifth aspect, alone or in combination with one or more of the first through fourth aspects, the transmission index is incremented if partial PUSCH repetition transmission, that comprises a first number of symbols that satisfies a threshold, occurs, and the transmission index is not incremented if partial PUSCH repetition transmission, that comprises a second number of symbols that does not satisfy the threshold, occurs.

Although FIG. 24 shows example blocks of process 2400, in some aspects, process 2400 may include additional blocks, fewer blocks, different blocks, or differently arranged blocks than those depicted in FIG. 24. Additionally, or alternatively, two or more of the blocks of process 2400 may be performed in parallel.

Figure 25:
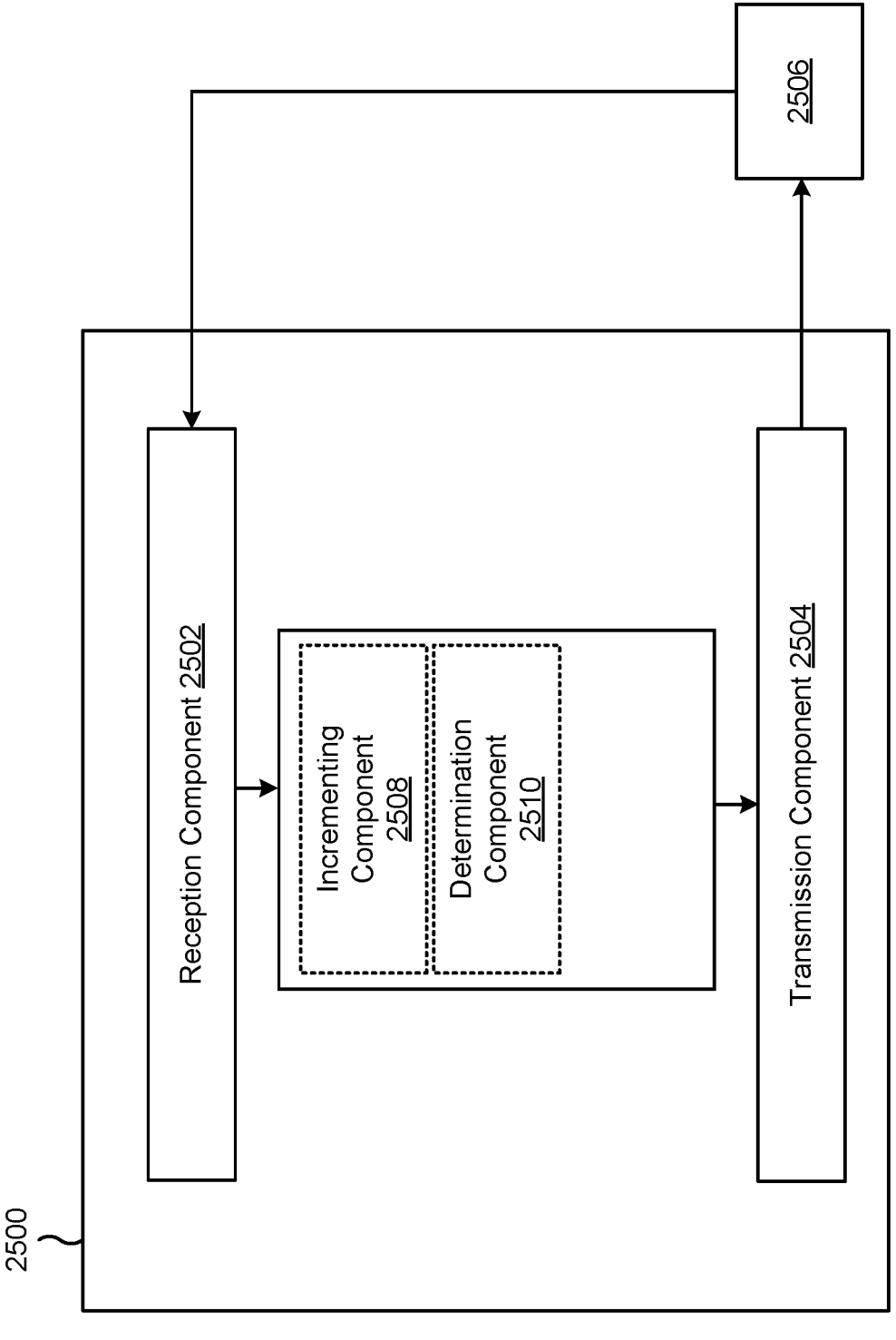
FIGS. 25 and 26 are block diagrams of example apparatuses for wireless communication, in accordance with the present disclosure.

FIG. 25 is a block diagram of an example apparatus 2500 for wireless communication. The apparatus 2500 may be a UE (e.g., a mobile station), or a UE may include the apparatus 2500. In some aspects, the apparatus 2500 includes a reception component 2502 and a transmission component 2504, which may be in communication with one another (for example, via one or more buses and/or one or more other components). As shown, the apparatus 2500 may communicate with another apparatus 2506 (such as a UE, a base station, or another wireless communication device) using the reception component 2502 and the transmission component 2504. As further shown, the apparatus 2500 may include one or more of an incrementing component 2508 or a determination component 2510, among other examples.

In some aspects, the apparatus 2500 may be configured to perform one or more operations described herein in connection with FIG. 22. Additionally, or alternatively, the apparatus 2500 may be configured to perform one or more processes described herein, such as process 2300 of FIG. 23. In some aspects, the apparatus 2500 and/or one or more components shown in FIG. 25 may include one or more components of the UE described above in connection with FIG. 2. Additionally, or alternatively, one or more components shown in FIG. 25 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2502 may receive communications, such as reference signals, control information, data communications, or a combination thereof, from the apparatus 2506. The reception component 2502 may provide received communications to one or more other components of the apparatus 2500. In some aspects, the reception component 2502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2506. In some aspects, the reception component 2502 may include one or more antennas, a demodulator, a MIMO detector, a receive processor, a controller/processor, a memory, or a combination thereof, of the UE described above in connection with FIG. 2.

The transmission component 2504 may transmit communications, such as reference signals, control information, data communications, or a combination thereof, to the apparatus 2506. In some aspects, one or more other components of the apparatus 2506 may generate communications and may provide the generated communications to the transmission component 2504 for transmission to the apparatus 2506. In some aspects, the transmission component 2504 may perform signal processing on the generated communications (such as filtering, amplification, modulation, digital-to-analog conversion, multiplexing, interleaving, mapping, or encoding, among other examples), and may transmit the processed signals to the apparatus 2506. In some aspects, the transmission component 2504 may include one or more antennas, a modulator, a transmit MIMO processor, a transmit processor, a controller/processor, a memory, or a combination thereof, of the UE described above in connection with FIG. 2. In some aspects, the transmission component 2504 may be co-located with the reception component 2502 in a transceiver.

The reception component 2502 may receive a redundancy version index that indicates a sequence of redundancy versions to be applied to a corresponding sequence of PUSCH repetitions. The transmission component 2504 may transmit a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur.

The incrementing component 2508 may increment the transmission index based at least in part on determining that actual PUSCH repetition transmission occurs for a prior PUSCH repetition, of the sequence of PUSCH repetitions, that precedes the PUSCH repetition. The determination component 2510 may determine the redundancy version of the PUSCH repetition based at least in part on the incremented transmission index.

The incrementing component 2508 may refrain from incrementing the transmission index based at least in part on determining that actual PUSCH repetition transmission does not occur for a prior PUSCH repetition, of the sequence of PUSCH repetitions, that precedes the PUSCH repetition. The determination component 2510 may determine the redundancy version of the PUSCH repetition based at least in part on the transmission index.

The number and arrangement of components shown in FIG. 25 are provided as an example. In practice, there may be additional components, fewer components, different components, or differently arranged components than those shown in FIG. 25. Furthermore, two or more components shown in FIG. 25 may be implemented within a single component, or a single component shown in FIG. 25 may be implemented as multiple, distributed components. Additionally, or alternatively, a set of (one or more) components shown in FIG. 25 may perform one or more functions described as being performed by another set of components shown in FIG. 25.

Figure 26:
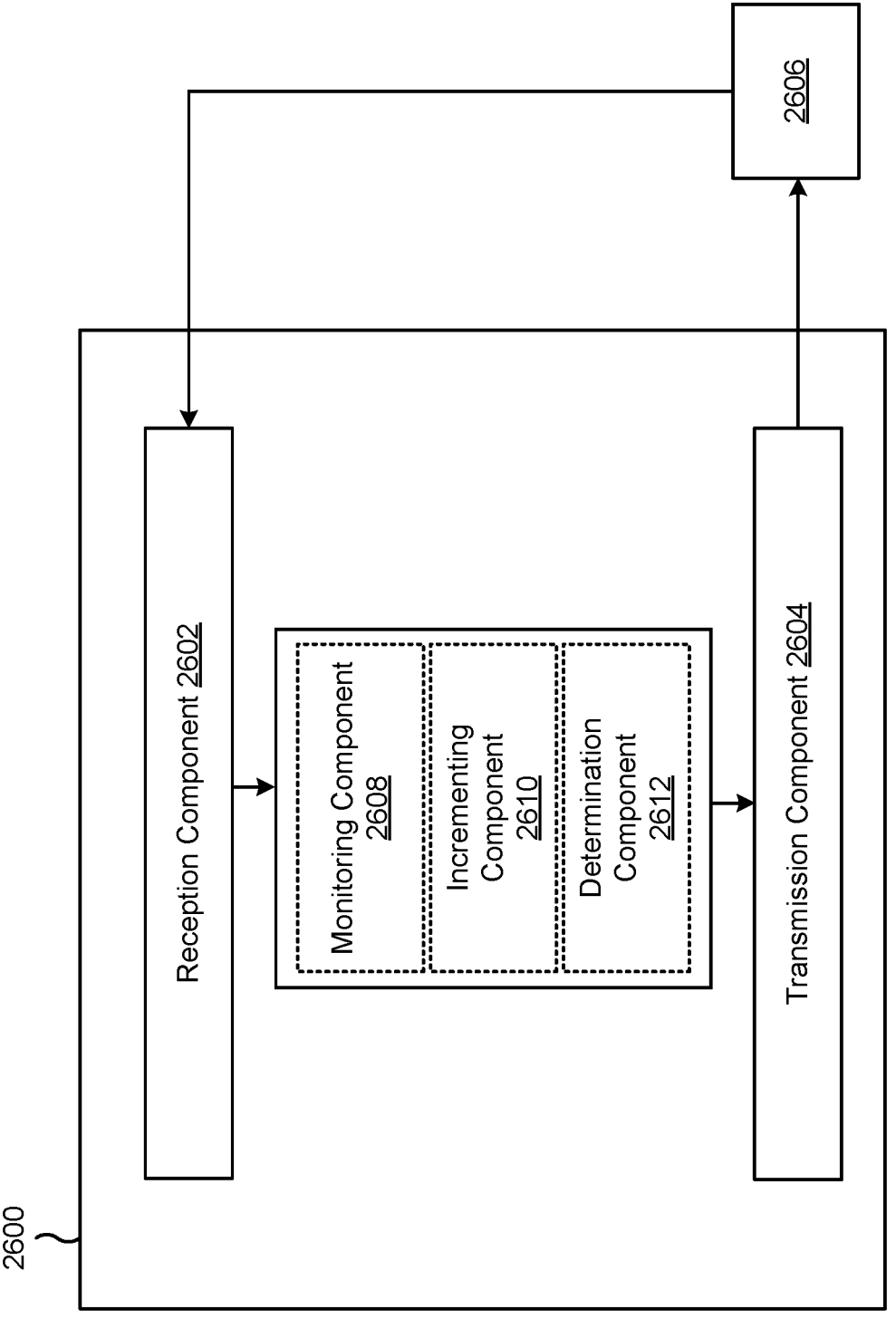

FIG. 26 is a block diagram of an example apparatus 2600 for wireless communication. The apparatus 2600 may be a base station, or a base station may include the apparatus 2600. In some aspects, the apparatus 2600 includes a reception component 2602 and a transmission component 2604, which may be in communication with one another (for example, via one or more buses and/or one or more other components). As shown, the apparatus 2600 may communicate with another apparatus 2606 (such as a UE, a base station, or another wireless communication device) using the reception component 2602 and the transmission component 2604. As further shown, the apparatus 2600 may include one or more of a monitoring component 2608, an incrementing component 2610, or a determination component 2612, among other examples.

In some aspects, the apparatus 2600 may be configured to perform one or more operations described herein in connection with FIG. 22. Additionally, or alternatively, the apparatus 2600 may be configured to perform one or more processes described herein, such as process 2400 of FIG. 24. In some aspects, the apparatus 2600 and/or one or more components shown in FIG. 26 may include one or more components of the base station described above in connection with FIG. 2. Additionally, or alternatively, one or more components shown in FIG. 26 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2602 may receive communications, such as reference signals, control information, data communications, or a combination thereof, from the apparatus 2606. The reception component 2602 may provide received communications to one or more other components of the apparatus 2600. In some aspects, the reception component 2602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2606. In some aspects, the reception component 2602 may include one or more antennas, a demodulator, a MIMO detector, a receive processor, a controller/processor, a memory, or a combination thereof, of the base station described above in connection with FIG. 2.

The transmission component 2604 may transmit communications, such as reference signals, control information, data communications, or a combination thereof, to the apparatus 2606. In some aspects, one or more other components of the apparatus 2606 may generate communications and may provide the generated communications to the transmission component 2604 for transmission to the apparatus 2606. In some aspects, the transmission component 2604 may perform signal processing on the generated communications (such as filtering, amplification, modulation, digital-to-analog conversion, multiplexing, interleaving, mapping, or encoding, among other examples), and may transmit the processed signals to the apparatus 2606. In some aspects, the transmission component 2604 may include one or more antennas, a modulator, a transmit MIMO processor, a transmit processor, a controller/processor, a memory, or a combination thereof, of the base station described above in connection with FIG. 2. In some aspects, the transmission component 2604 may be co-located with the reception component 2602 in a transceiver.

The transmission component 2604 may transmit a redundancy version index that indicates, to a mobile station, a sequence of redundancy versions to be applied to a corresponding sequence of PUSCH repetitions. The monitoring component 2608 and/or the reception component 2602 may monitor for a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur.

The incrementing component 2610 may increment the transmission index based at least in part on determining that actual PUSCH repetition transmission occurs for a prior PUSCH repetition, of the sequence of PUSCH repetitions, that precedes the PUSCH repetition. The determination component 2612 may determine the redundancy version of the PUSCH repetition based at least in part on the incremented transmission index.

The incrementing component 2610 may refrain from incrementing the transmission index based at least in part on determining that actual PUSCH repetition transmission does not occur for a prior PUSCH repetition, of the sequence of PUSCH repetitions, that precedes the PUSCH repetition. The determination component 2612 may determine the redundancy version of the PUSCH repetition based at least in part on the transmission index.

The number and arrangement of components shown in FIG. 26 are provided as an example. In practice, there may be additional components, fewer components, different components, or differently arranged components than those shown in FIG. 26. Furthermore, two or more components shown in FIG. 26 may be implemented within a single component, or a single component shown in FIG. 26 may be implemented as multiple, distributed components. Additionally, or alternatively, a set of (one or more) components shown in FIG. 26 may perform one or more functions described as being performed by another set of components shown in FIG. 26.

The following provides an overview of some Aspects of the present disclosure:

Aspect 1: A method of wireless communication performed by a mobile station, comprising: receiving, by the mobile station, a configuration that indicates a number of nominal repetitions associated with an uplink repetition type that does not permit uplink transmission occasions to cross a slot boundary and that permits only one uplink transmission occasion per slot; transmitting, by the mobile station, an actual repetition of the uplink repetition type in a transmission occasion based at least in part on a determination that the transmission occasion has resources available for the actual repetition, wherein the transmission occasion is a slot; and terminating, by the mobile station, transmission of actual repetitions of the uplink repetition type when a number of actual repetitions equals the number of nominal repetitions.

Aspect 2: The method of Aspect 1, wherein the determination that the transmission occasion has resources available for the actual repetition comprises a determination that the transmission occasion has resources available for a full transmission that comprises all symbols of the actual repetition.

Aspect 3: The method of Aspect 1, wherein the determination that the transmission occasion has resources available for the actual repetition comprises a determination that the transmission occasion has resources available for a partial transmission that comprises fewer than all symbols of the actual repetition.

Aspect 4: The method of Aspect 3, wherein partial transmissions of actual repetitions have different starting symbol indexes in at least two different transmission occasions.

Aspect 5: The method of any of Aspects 3-4, wherein the determination that the transmission occasion has resources available for the partial transmission comprises at least one of: a determination that the transmission occasion comprises a threshold number of demodulation reference signal (DMRS) symbols, a determination that the transmission occasion comprises a threshold number of data symbols, a determination that the transmission occasion comprises a threshold number of consecutive symbols for the partial transmission, a determination that the transmission occasion comprises a threshold number of consecutive symbols that comprise an initial symbol of the actual repetition, or a combination thereof.

Aspect 6: The method of Aspect 5, wherein at least one of the threshold number of DMRS symbols, the threshold number of data symbols, or the threshold number of consecutive symbols is indicated to the mobile station by a base station.

Aspect 7: The method of any of Aspects 3-6, further comprising: receiving an indication of one or more conditions associated with transmitting the partial transmission; and determining that the transmission occasion has resources available for the partial transmission based at least in part on a determination that the one or more conditions are satisfied.

Aspect 8: The method of any of Aspects 3-7, further comprising: receiving an indication of a symbol pattern associated with transmitting the partial transmission, wherein the symbol pattern indicates one or more symbols of the actual repetition that are required to be transmitted in the partial transmission; and determining that the transmission occasion has resources available for the partial transmission based at least in part on the symbol pattern.

Aspect 9: The method of Aspect 8, wherein the symbol pattern is indicated in the configuration and comprises a static number of bits that is based at least in part on a number of symbols included in the slot.

Aspect 10: The method of Aspect 8, wherein the symbol pattern is indicated in an uplink grant that schedules the actual repetition, and wherein the symbol pattern comprises a dynamic number of bits that is based at least in part on a number of symbols included in the actual repetition.

Aspect 11: The method of any of Aspects 1-10, further comprising: receiving an indication to cancel transmission in one or more symbols of the transmission occasion, wherein the indication is received at a time, prior to the transmission occasion, that satisfies a processing time threshold associated with the mobile station; determining that the transmission occasion satisfies a condition with respect to resources available for a partial transmission of the actual repetition based at least in part on one or more resources available in the transmission occasion after cancellation of transmission in the one or more symbols; and transmitting the actual repetition based at least in part on determining that the transmission occasion satisfies the condition.

Aspect 12: The method of any of Aspects 1-10, further comprising: receiving an indication to cancel transmission in one or more symbols of the transmission occasion, wherein the indication is received at a time, prior to the transmission occasion, that does not satisfy a processing time threshold associated with the mobile station; determining, after transmitting the actual repetition, that the transmission occasion satisfies a condition with respect to resources available for a partial transmission of the actual repetition, based at least in part on one or more resources available in the transmission occasion after cancellation of transmission in the one or more symbols; and incrementing a repetition counter that counts toward the number of actual repetitions based at least in part on determining that the transmission occasion satisfies the condition.

Aspect 13: The method of any of Aspects 1-10, further comprising: receiving an indication to cancel transmission in one or more symbols of the transmission occasion, wherein the indication is received at a time, prior to the transmission occasion, that does not satisfy a processing time threshold associated with the mobile station; determining, after transmitting the actual repetition, that the transmission occasion does not satisfy a condition with respect to resources available for a partial transmission of the actual repetition, based at least in part on one or more resources available in the transmission occasion after cancellation of transmission in the one or more symbols; and refraining from counting the actual repetition toward the number of actual repetitions based at least in part on determining that the transmission occasion does not satisfy the condition.

Aspect 14: The method of any of Aspects 1-10, further comprising: receiving an indication to cancel transmission in one or more symbols of the transmission occasion, wherein the indication is received at a time, prior to the transmission occasion, that does not satisfy a processing time threshold associated with the mobile station; determining, after transmitting the actual repetition, that the transmission occasion does not satisfy a condition with respect to resources available for a partial transmission of the actual repetition, based at least in part on one or more resources available in the transmission occasion after cancellation of transmission in the one or more symbols; and incrementing a repetition counter that counts toward the number of actual repetitions despite determining that the transmission occasion does not satisfy the condition.

Aspect 15: The method of any of Aspects 1-14, wherein the number of nominal repetitions is less than or equal to a maximum number of repetitions that is based at least in part on a slot pattern configured for the mobile station or a sub-carrier spacing configured for the mobile station.

Aspect 16: The method of any of Aspects 1-15, wherein the actual repetition is transmitted using a redundancy version determined based at least in part on a transmission index that is incremented if actual repetition transmission occurs and that is not incremented if actual repetition transmission does not occur.

Aspect 17: A method of wireless communication performed by a base station, comprising: transmitting, by the base station and to a mobile station, a configuration that indicates a number of nominal repetitions associated with an uplink repetition type that does not permit uplink transmission occasions to cross a slot boundary and that permits only one uplink transmission occasion per slot; monitoring, by the base station, for an actual repetition of the uplink repetition type in a transmission occasion, based at least in part on a determination that the transmission occasion has resources available for the actual repetition, wherein the transmission occasion is a slot; and terminating, by the base station, monitoring for transmission of actual repetitions of the uplink repetition type when a number of actual repetitions equals the number of nominal repetitions.

Aspect 18: The method of Aspect 17, wherein the determination that the transmission occasion has resources available for the actual repetition comprises a determination that the transmission occasion has resources available for a full transmission that comprises all symbols of the actual repetition.

Aspect 19: The method of Aspect 17, wherein the determination that the transmission occasion has resources available for the actual repetition comprises a determination that the transmission occasion has resources available for a partial transmission that comprises fewer than all symbols of the actual repetition.

Aspect 20: The method of Aspect 19, wherein partial transmissions of actual repetitions have different starting symbol indexes in at least two different transmission occasions.

Aspect 21: The method of any of Aspects 19-20, wherein the determination that the transmission occasion has resources available for the partial transmission comprises at least one of: a determination that the transmission occasion comprises a threshold number of demodulation reference signal (DMRS) symbols, a determination that the transmission occasion comprises a threshold number of data symbols, a determination that the transmission occasion comprises a threshold number of consecutive symbols for the partial transmission, a determination that the transmission occasion comprises a threshold number of consecutive symbols that comprise an initial symbol of the actual repetition, or a combination thereof.

Aspect 22: The method of Aspect 21, wherein at least one of the threshold number of DMRS symbols, the threshold number of data symbols, or the threshold number of consecutive symbols is indicated to the mobile station by the base station.

Aspect 23: The method of any of Aspects 19-22, further comprising: transmitting an indication of one or more conditions associated with transmitting the partial transmission; and determining that the transmission occasion has resources available for the partial transmission based at least in part on a determination that the one or more conditions are satisfied.

Aspect 24: The method of any of Aspects 19-23, further comprising: transmitting an indication of a symbol pattern associated with transmitting the partial transmission, wherein the symbol pattern indicates one or more symbols of the actual repetition that are required to be transmitted in the partial transmission; and determining that the transmission occasion has resources available for the partial transmission based at least in part on the symbol pattern.

Aspect 25: The method of Aspect 24, wherein the symbol pattern is indicated in the configuration and comprises a static number of bits that is based at least in part on a number of symbols included in the slot.

Aspect 26: The method of Aspect 24, wherein the symbol pattern is indicated in an uplink grant that schedules the actual repetition, and wherein the symbol pattern comprises a dynamic number of bits that is based at least in part on a number of symbols included in the actual repetition.

Aspect 27: The method of any of Aspects 17-26, further comprising: transmitting an indication to cancel transmission in one or more symbols of the transmission occasion, wherein the indication is transmitted at a time, prior to the transmission occasion, that satisfies a processing time threshold associated with the mobile station; determining that the transmission occasion satisfies a condition with respect to resources available for a partial transmission of the actual repetition based at least in part on one or more resources available in the transmission occasion after cancellation of transmission in the one or more symbols; and monitoring for the actual repetition based at least in part on determining that the transmission occasion satisfies the condition.

Aspect 28: The method of any of Aspects 17-26, further comprising: transmitting an indication to cancel transmission in one or more symbols of the transmission occasion, wherein the indication is transmitted at a time, prior to the transmission occasion, that does not satisfy a processing time threshold associated with the mobile station; determining that the transmission occasion satisfies a condition with respect to resources available for a partial transmission of the actual repetition, based at least in part on one or more resources available in the transmission occasion after cancellation of transmission in the one or more symbols; and incrementing a repetition counter that counts toward the number of actual repetitions based at least in part on determining that the transmission occasion satisfies the condition.

Aspect 29: The method of any of Aspects 17-26, further comprising: transmitting an indication to cancel transmission in one or more symbols of the transmission occasion, wherein the indication is transmitted at a time, prior to the transmission occasion, that does not satisfy a processing time threshold associated with the mobile station; determining that the transmission occasion does not satisfy a condition with respect to resources available for a partial transmission of the actual repetition, based at least in part on one or more resources available in the transmission occasion after cancellation of transmission in the one or more symbols; and refraining from counting the actual repetition toward the number of actual repetitions based at least in part on determining that the transmission occasion does not satisfy the condition.

Aspect 30: The method of any of Aspects 17-26, further comprising: transmitting an indication to cancel transmission in one or more symbols of the transmission occasion, wherein the indication is transmitted at a time, prior to the transmission occasion, that does not satisfy a processing time threshold associated with the mobile station; determining that the transmission occasion does not satisfy a condition with respect to resources available for a partial transmission of the actual repetition, based at least in part on one or more resources available in the transmission occasion after cancellation of transmission in the one or more symbols; and incrementing a repetition counter that counts toward the number of actual repetitions despite determining that the transmission occasion does not satisfy the condition.

Aspect 31: A method of wireless communication performed by a mobile station, comprising: determining, by the mobile station, a maximum number of repetitions for a physical uplink shared channel (PUSCH) based at least in part on a slot pattern configured for the mobile station or a sub-carrier spacing configured for the mobile station; receiving, by the mobile station, an indication of a number of repetitions to be used for the PUSCH, wherein the number of repetitions is less than or equal to the maximum number of repetitions; and transmitting, by the mobile station, a set of PUSCH repetitions based at least in part on the number of repetitions.

Aspect 32: The method of Aspect 31, wherein the maximum number of repetitions for the PUSCH is a function of the sub-carrier spacing configured for the mobile station.

Aspect 33: The method of Aspect 32, wherein the maximum number of repetitions for the PUSCH is a product of a fixed value and a value that depends on the sub-carrier spacing configured for the mobile station.

Aspect 34: The method of any of Aspects 32-33, wherein the maximum number of repetitions for the PUSCH is a larger maximum number for a larger sub-carrier spacing as compared to a smaller maximum number for a smaller sub-carrier spacing.

Aspect 35: The method of any of Aspects 31-34, wherein the slot pattern indicates whether the mobile station is to communicate using time-division duplexing (TDD) or frequency-division duplexing (FDD), and wherein the maximum number of repetitions for the PUSCH is based at least in part on whether the mobile station is to communicate using TDD or FDD.

Aspect 36: The method of Aspect 35, wherein the maximum number of repetitions for the PUSCH is a larger maximum number for FDD as compared to a smaller maximum number for TDD.

Aspect 37: The method of any of Aspects 35-36, wherein the slot pattern indicates that the mobile station is to communicate using TDD and further indicates a ratio of uplink slots to downlink slots for TDD, and wherein the maximum number of repetitions for the PUSCH is based at least in part on the ratio of uplink slots to downlink slots for TDD.

Aspect 38: The method of Aspect 37, wherein the maximum number of repetitions for the PUSCH is a larger maximum number for a larger ratio of uplink slots to downlink slots as compared to a smaller maximum number for a smaller ratio of uplink slots to downlink slots.

Aspect 39: A method of wireless communication performed by a mobile station, comprising: receiving, by the mobile station, an indication of a time window over which the mobile station is to transmit repetitions of physical uplink shared channel (PUSCH) communications; and transmitting, by the mobile station, a set of PUSCH repetitions in the time window.

Aspect 40: The method of Aspect 39, wherein transmitting the set of PUSCH repetitions in the time window comprises transmitting a PUSCH repetition in each uplink transmission occasion in the time window.

Aspect 41: The method of any of Aspects 39-40, wherein a duration of the time window is based at least in part on a sub-carrier spacing configured for the mobile station.

Aspect 42: The method of any of Aspects 39-41, wherein a duration of the time window is based at least in part on a slot pattern configured for the mobile station.

Aspect 43: A method of wireless communication performed by a base station, comprising: determining, by the base station, a maximum number of repetitions for physical uplink shared channel (PUSCH) communications with a mobile station based at least in part on a slot pattern configured for the mobile station or a sub-carrier spacing configured for the mobile station; transmitting, by the base station, an indication of a number of repetitions to be used by the mobile station for the PUSCH communications, wherein the number of repetitions is less than or equal to the maximum number of repetitions; and monitoring, by the base station, for a set of PUSCH repetitions from the mobile station based at least in part on the number of repetitions.

Aspect 44: The method of Aspect 43, wherein the maximum number of repetitions for the PUSCH is a function of the sub-carrier spacing configured for the mobile station.

Aspect 45: The method of Aspect 44, wherein the maximum number of repetitions for the PUSCH is a product of a fixed value and a value that depends on the sub-carrier spacing configured for the mobile station.

Aspect 46: The method of any of Aspects 44-45, wherein the maximum number of repetitions for the PUSCH is a larger maximum number for a larger sub-carrier spacing as compared to a smaller maximum number for a smaller sub-carrier spacing.

Aspect 47: The method of any of Aspects 43-46, wherein the slot pattern indicates whether the mobile station is to communicate using time-division duplexing (TDD) or frequency-division duplexing (FDD), and wherein the maximum number of repetitions for the PUSCH is based at least in part on whether the mobile station is to communicate using TDD or FDD.

Aspect 48: The method of Aspect 47, wherein the maximum number of repetitions for the PUSCH is a larger maximum number for FDD as compared to a smaller maximum number for TDD.

Aspect 49: The method of any of Aspects 47-48, wherein the slot pattern indicates that the mobile station is to communicate using TDD and further indicates a ratio of uplink slots to downlink slots for TDD, and wherein the maximum number of repetitions for the PUSCH is based at least in part on the ratio of uplink slots to downlink slots for TDD.

Aspect 50: The method of Aspect 49, wherein the maximum number of repetitions for the PUSCH is a larger maximum number for a larger ratio of uplink slots to downlink slots as compared to a smaller maximum number for a smaller ratio of uplink slots to downlink slots.

Aspect 51: A method of wireless communication performed by a base station, comprising: transmitting, by the base station, an indication of a time window over which a mobile station is to transmit repetitions of physical uplink shared channel (PUSCH) communications; and monitoring, by the base station, for a set of PUSCH repetitions in the time window.

Aspect 52: The method of Aspect 51, further comprising determining the time window based at least in part on a slot pattern configured for the mobile station or a sub-carrier spacing configured for the mobile station.

Aspect 53: A method of wireless communication performed by a mobile station, comprising: receiving, by the mobile station, a redundancy version index that indicates a sequence of redundancy versions to be applied to a corresponding sequence of physical uplink shared channel (PUSCH) repetitions; and transmitting, by the mobile station, a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur.

Aspect 54: The method of Aspect 53, further comprising: incrementing the transmission index based at least in part on determining that actual PUSCH repetition transmission occurs for a prior PUSCH repetition, of the sequence of PUSCH repetitions, that precedes the PUSCH repetition; and determining the redundancy version of the PUSCH repetition based at least in part on the incremented transmission index.

Aspect 55: The method of any of Aspects 53-54, further comprising: refraining from incrementing the transmission index based at least in part on determining that actual PUSCH repetition transmission does not occur for a prior PUSCH repetition, of the sequence of PUSCH repetitions, that precedes the PUSCH repetition; and determining the redundancy version of the PUSCH repetition based at least in part on the transmission index.

Aspect 56: The method of any of Aspects 53-55, wherein the transmission index is incremented if full PUSCH repetition transmission occurs, and wherein the transmission index is not incremented if full PUSCH repetition transmission does not occur.

Aspect 57: The method of any of Aspects 53-55, wherein the transmission index is incremented if partial PUSCH repetition transmission occurs, and wherein the transmission index is not incremented if partial PUSCH repetition transmission does not occur.

Aspect 58: The method of any of Aspects 53-55, wherein the transmission index is incremented if partial PUSCH repetition transmission, that comprises a first number of symbols that satisfies a threshold, occurs, and wherein the transmission index is not incremented if partial PUSCH repetition transmission, that comprises a second number of symbols that does not satisfy the threshold, occurs.

Aspect 59: A method of wireless communication performed by a base station, comprising: transmitting, by the base station, a redundancy version index that indicates, to a mobile station, a sequence of redundancy versions to be applied to a corresponding sequence of physical uplink shared channel (PUSCH) repetitions; and monitoring, by the base station, for a redundancy version of a PUSCH repetition of the sequence of PUSCH repetitions, wherein the redundancy version is determined based at least in part on a transmission index that is incremented if actual PUSCH repetition transmission occurs and that is not incremented if actual PUSCH repetition transmission does not occur.

Aspect 60: The method of Aspect 59, further comprising: incrementing the transmission index based at least in part on determining that actual PUSCH repetition transmission occurs for a prior PUSCH repetition, of the sequence of PUSCH repetitions, that precedes the PUSCH repetition; and determining the redundancy version of the PUSCH repetition based at least in part on the incremented transmission index.

Aspect 61: The method of any of Aspects 59-60, further comprising: refraining from incrementing the transmission index based at least in part on determining that actual PUSCH repetition transmission does not occur for a prior PUSCH repetition, of the sequence of PUSCH repetitions, that precedes the PUSCH repetition; and determining the redundancy version of the PUSCH repetition based at least in part on the transmission index.

Aspect 62: The method of any of Aspects 59-61, wherein the transmission index is incremented if full PUSCH repetition transmission occurs, and wherein the transmission index is not incremented if full PUSCH repetition transmission does not occur.

Aspect 63: The method of any of Aspects 59-61, wherein the transmission index is incremented if partial PUSCH repetition transmission occurs, and wherein the transmission index is not incremented if partial PUSCH repetition transmission does not occur.

Aspect 64: The method of any of Aspects 59-61, wherein the transmission index is incremented if partial PUSCH repetition transmission, that comprises a first number of symbols that satisfies a threshold, occurs, and wherein the transmission index is not incremented if partial PUSCH repetition transmission, that comprises a second number of symbols that does not satisfy the threshold, occurs.

Aspect 65: An apparatus for wireless communication at a device, comprising a processor; memory coupled with the processor; and instructions stored in the memory and executable by the processor to cause the apparatus to perform the method of one or more of Aspects 1-16.

Aspect 66: A device for wireless communication, comprising a memory and one or more processors coupled to the memory, the one or more processors configured to perform the method of one or more of Aspects 1-16.

Aspect 67: An apparatus for wireless communication, comprising at least one means for performing the method of one or more of Aspects 1-16.

Aspect 68: A non-transitory computer-readable medium storing code for wireless communication, the code comprising instructions executable by a processor to perform the method of one or more of Aspects 1-16.

Aspect 69: A non-transitory computer-readable medium storing a set of instructions for wireless communication, the set of instructions comprising one or more instructions that, when executed by one or more processors of a device, cause the device to perform the method of one or more of Aspects 1-16.

Aspect 70: An apparatus for wireless communication at a device, comprising a processor; memory coupled with the processor; and instructions stored in the memory and executable by the processor to cause the apparatus to perform the method of one or more of Aspects 17-30.

Aspect 71: A device for wireless communication, comprising a memory and one or more processors coupled to the memory, the one or more processors configured to perform the method of one or more of Aspects 17-30.

Aspect 72: An apparatus for wireless communication, comprising at least one means for performing the method of one or more of Aspects 17-30.

Aspect 73: A non-transitory computer-readable medium storing code for wireless communication, the code comprising instructions executable by a processor to perform the method of one or more of Aspects 17-30.

Aspect 74: A non-transitory computer-readable medium storing a set of instructions for wireless communication, the set of instructions comprising one or more instructions that, when executed by one or more processors of a device, cause the device to perform the method of one or more of Aspects 17-30.

Aspect 75: An apparatus for wireless communication at a device, comprising a processor; memory coupled with the processor; and instructions stored in the memory and executable by the processor to cause the apparatus to perform the method of one or more of Aspects 31-38.

Aspect 76: A device for wireless communication, comprising a memory and one or more processors coupled to the memory, the one or more processors configured to perform the method of one or more of Aspects 31-38.

Aspect 77: An apparatus for wireless communication, comprising at least one means for performing the method of one or more of Aspects 31-38.

Aspect 78: A non-transitory computer-readable medium storing code for wireless communication, the code comprising instructions executable by a processor to perform the method of one or more of Aspects 31-38.

Aspect 79: A non-transitory computer-readable medium storing a set of instructions for wireless communication, the set of instructions comprising one or more instructions that, when executed by one or more processors of a device, cause the device to perform the method of one or more of Aspects 31-38.

Aspect 80: An apparatus for wireless communication at a device, comprising a processor; memory coupled with the processor; and instructions stored in the memory and executable by the processor to cause the apparatus to perform the method of one or more of Aspects 39-42.

Aspect 81: A device for wireless communication, comprising a memory and one or more processors coupled to the memory, the one or more processors configured to perform the method of one or more of Aspects 39-42.

Aspect 82: An apparatus for wireless communication, comprising at least one means for performing the method of one or more of Aspects 39-42.

Aspect 83: A non-transitory computer-readable medium storing code for wireless communication, the code comprising instructions executable by a processor to perform the method of one or more of Aspects 39-42.

Aspect 84: A non-transitory computer-readable medium storing a set of instructions for wireless communication, the set of instructions comprising one or more instructions that, when executed by one or more processors of a device, cause the device to perform the method of one or more of Aspects 39-42.

Aspect 85: An apparatus for wireless communication at a device, comprising a processor; memory coupled with the processor; and instructions stored in the memory and executable by the processor to cause the apparatus to perform the method of one or more of Aspects 43-50.

Aspect 86: A device for wireless communication, comprising a memory and one or more processors coupled to the memory, the one or more processors configured to perform the method of one or more of Aspects 43-50.

Aspect 87: An apparatus for wireless communication, comprising at least one means for performing the method of one or more of Aspects 43-50.

Aspect 88: A non-transitory computer-readable medium storing code for wireless communication, the code comprising instructions executable by a processor to perform the method of one or more of Aspects 43-50.

Aspect 89: A non-transitory computer-readable medium storing a set of instructions for wireless communication, the set of instructions comprising one or more instructions that, when executed by one or more processors of a device, cause the device to perform the method of one or more of Aspects 43-50.

Aspect 90: An apparatus for wireless communication at a device, comprising a processor; memory coupled with the processor; and instructions stored in the memory and executable by the processor to cause the apparatus to perform the method of one or more of Aspects 51-52.

Aspect 91: A device for wireless communication, comprising a memory and one or more processors coupled to the memory, the one or more processors configured to perform the method of one or more of Aspects 51-52.

Aspect 92: An apparatus for wireless communication, comprising at least one means for performing the method of one or more of Aspects 51-52.

Aspect 93: A non-transitory computer-readable medium storing code for wireless communication, the code comprising instructions executable by a processor to perform the method of one or more of Aspects 51-52.

Aspect 94: A non-transitory computer-readable medium storing a set of instructions for wireless communication, the set of instructions comprising one or more instructions that, when executed by one or more processors of a device, cause the device to perform the method of one or more of Aspects 51-52.

Aspect 95: An apparatus for wireless communication at a device, comprising a processor; memory coupled with the processor; and instructions stored in the memory and executable by the processor to cause the apparatus to perform the method of one or more of Aspects 53-58.

Aspect 96: A device for wireless communication, comprising a memory and one or more processors coupled to the memory, the one or more processors configured to perform the method of one or more of Aspects 53-58.

Aspect 97: An apparatus for wireless communication, comprising at least one means for performing the method of one or more of Aspects 53-58.

Aspect 98: A non-transitory computer-readable medium storing code for wireless communication, the code comprising instructions executable by a processor to perform the method of one or more of Aspects 53-58.

Aspect 99: A non-transitory computer-readable medium storing a set of instructions for wireless communication, the set of instructions comprising one or more instructions that, when executed by one or more processors of a device, cause the device to perform the method of one or more of Aspects 53-58.

Aspect 100: An apparatus for wireless communication at a device, comprising a processor; memory coupled with the processor; and instructions stored in the memory and executable by the processor to cause the apparatus to perform the method of one or more of Aspects 59-64.

Aspect 101: A device for wireless communication, comprising a memory and one or more processors coupled to the memory, the one or more processors configured to perform the method of one or more of Aspects 59-64.

Aspect 102: An apparatus for wireless communication, comprising at least one means for performing the method of one or more of Aspects 59-64.

Aspect 103: A non-transitory computer-readable medium storing code for wireless communication, the code comprising instructions executable by a processor to perform the method of one or more of Aspects 59-64.

Aspect 104: A non-transitory computer-readable medium storing a set of instructions for wireless communication, the set of instructions comprising one or more instructions that, when executed by one or more processors of a device, cause the device to perform the method of one or more of Aspects 59-64.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a mobile station, comprising:

receiving, by the mobile station, a configuration that indicates a number of nominal repetitions associated with an uplink repetition type that does not permit an uplink transmission occassion, of a set of uplink transmission occasions, to cross a slot boundary and that permits at most one uplink transmission occasion, of the set of uplink transmission occassions, per slot, for the nominal repetitions, the configuration comprising a time domain allocation within a slot for repetitions over a plurality of slots; and transmitting, by the mobile station, an actual repetition of the uplink repetition type in the uplink transmission occasion based at least in part on a determination that the uplink transmission occasion has resources available for the actual repetition, wherein the uplink transmission occasion is within one of the plurality of slots.

2. The method of claim 1, wherein the determination that the uplink transmission occasion has resources available for the actual repetition comprises a determination that the uplink transmission occasion has resources available for a full transmission that comprises all symbols of the actual repetition.

3. The method of claim 1, wherein the determination that the uplink transmission occasion has resources available for the actual repetition comprises a determination that the uplink transmission occasion has resources available for a partial transmission that comprises fewer than all symbols of the actual repetition.

4. The method of claim 3, wherein partial transmissions of actual repetitions have different starting symbol indexes in at least two different uplink transmission occasions.

5. The method of claim 3, wherein the determination that the uplink transmission occasion has resources available for the partial transmission comprises at least one of:

a determination that the uplink transmission occasion comprises a threshold number of demodulation reference signal (DMRS) symbols, a determination that the uplink transmission occasion comprises a threshold number of data symbols, a determination that the uplink transmission occasion comprises a threshold number of consecutive symbols for the partial transmission, a determination that the uplink transmission occasion comprises a threshold number of consecutive symbols that comprise an initial symbol of the actual repetition, or a combination thereof.

6. The method of claim 5, wherein at least one of the threshold number of DMRS symbols, the threshold number of data symbols, or the threshold number of consecutive symbols is indicated to the mobile station by a base station.

7. The method of claim 3, further comprising:

receiving an indication of one or more conditions associated with transmitting the partial transmission; and determining that the uplink transmission occasion has resources available for the partial transmission based at least in part on a determination that the one or more conditions are satisfied.

8. The method of claim 3, further comprising:

receiving an indication of a symbol pattern associated with transmitting the partial transmission, wherein the symbol pattern indicates one or more symbols of the actual repetition that are required to be transmitted in the partial transmission; and determining that the uplink transmission occasion has resources available for the partial transmission based at least in part on the symbol pattern.

9. The method of claim 8, wherein the symbol pattern is indicated in the configuration and comprises a static number of bits that is based at least in part on a number of symbols included in the slot.

10. The method of claim 8, wherein the symbol pattern is indicated in an uplink grant that schedules the actual repetition, and wherein the symbol pattern comprises a dynamic number of bits that is based at least in part on a number of symbols included in the actual repetition.

11. The method of claim 1, further comprising:

receiving an indication to cancel transmission in one or more symbols of the uplink transmission occasion, wherein the indication is received at a time, prior to the uplink transmission occasion, that satisfies a processing time threshold associated with the mobile station;

determining that the uplink transmission occasion satisfies a condition with respect to resources available for a partial transmission of the actual repetition based at least in part on one or more resources available in the uplink transmission occasion after cancellation of transmission in the one or more symbols; and transmitting the actual repetition based at least in part on determining that the uplink transmission occasion satisfies the condition.

12. The method of claim 1, further comprising:

receiving an indication to cancel transmission in one or more symbols of the uplink transmission occasion, wherein the indication is received at a time, prior to the uplink transmission occasion, that does not satisfy a processing time threshold associated with the mobile station;

determining, after transmitting the actual repetition, that the uplink transmission occasion satisfies a condition with respect to resources available for a partial transmission of the actual repetition, based at least in part on one or more resources available in the uplink transmission occasion after cancellation of transmission in the one or more symbols; and incrementing a repetition counter that counts toward the number of actual repetitions based at least in part on determining that the uplink transmission occasion satisfies the condition.

13. The method of claim 1, further comprising:

receiving an indication to cancel transmission in one or more symbols of the uplink transmission occasion, wherein the indication is received at a time, prior to the uplink transmission occasion, that does not satisfy a processing time threshold associated with the mobile station;

determining, after transmitting the actual repetition, that the uplink transmission occasion does not satisfy a condition with respect to resources available for a partial transmission of the actual repetition, based at least in part on one or more resources available in the uplink transmission occasion after cancellation of transmission in the one or more symbols; and refraining from counting the actual repetition toward the number of actual repetitions based at least in part on determining that the uplink transmission occasion does not satisfy the condition.

14. The method of claim 1, further comprising:

receiving an indication to cancel transmission in one or more symbols of the uplink transmission occasion, wherein the indication is received at a time, prior to the uplink transmission occasion, that does not satisfy a processing time threshold associated with the mobile station;

determining, after transmitting the actual repetition, that the uplink transmission occasion does not satisfy a condition with respect to resources available for a partial transmission of the actual repetition, based at least in part on one or more resources available in the uplink transmission occasion after cancellation of transmission in the one or more symbols; and incrementing a repetition counter that counts toward the number of actual repetitions despite determining that the uplink transmission occasion does not satisfy the condition.

15. The method of claim 1, wherein the number of nominal repetitions is less than or equal to a maximum number of repetitions that is based at least in part on a slot pattern configured for the mobile station or a sub-carrier spacing configured for the mobile station.

16. The method of claim 1, wherein the actual repetition is transmitted using a redundancy version determined based at least in part on a transmission index that is incremented if actual repetition transmission occurs and that is not incremented if actual repetition transmission does not occur.

17. The method of claim 1, wherein the determination that the uplink transmission occasion has resources available for the actual repetition comprises a determination that the uplink transmission occasion does not overlap with a downlink symbol.

18. A method of wireless communication performed by a base station, comprising:

transmitting, by the base station and to a mobile station, a configuration that indicates a number of nominal repetitions associated with an uplink repetition type that does not permit an uplink transmission occasion, of a set of uplink transmission occasions, to cross a slot boundary and that permits at most one uplink transmission occasion per slot, for the nominal repetitions, the configuration comprising a time domain allocation within a slot for repetitions over a plurality of slots; and monitoring, by the base station, for an actual repetition of the uplink repetition type in the uplink transmission occasion, based at least in part on a determination that the uplink transmission occasion has resources available for the actual repetition, wherein the uplink transmission occasion is within one of the plurality of slots.

19. The method of claim 18, wherein the determination that the uplink transmission occasion has resources available for the actual repetition comprises a determination that the uplink transmission occasion has resources available for a full transmission that comprises all symbols of the actual repetition.

20. The method of claim 18, wherein the determination that the uplink transmission occasion has resources available for the actual repetition comprises a determination that the uplink transmission occasion has resources available for a partial transmission that comprises fewer than all symbols of the actual repetition.

21. The method of claim 20, further comprising:

transmitting an indication of one or more conditions associated with transmitting the partial transmission; and determining that the uplink transmission occasion has resources available for the partial transmission based at least in part on a determination that the one or more conditions are satisfied.

22. The method of claim 20, further comprising:

transmitting an indication of a symbol pattern associated with transmitting the partial transmission, wherein the symbol pattern indicates one or more symbols of the actual repetition that are required to be transmitted in the partial transmission; and determining that the uplink transmission has resources available for the partial transmission based at least in part on the symbol pattern.

23. The method of claim 18, further comprising:

transmitting an indication to cancel transmission in one or more symbols of the uplink transmission occasion, wherein the indication is transmitted at a time, prior to the uplink transmission occasion, that satisfies a processing time threshold associated with the mobile station;

determining that the uplink transmission occasion satisfies a condition with respect to resources available for a partial transmission of the actual repetition based at least in part on one or more resources available in the uplink transmission occasion after cancellation of transmission in the one or more symbols; and monitoring for the actual repetition based at least in part on determining that the uplink transmission occasion satisfies the condition.

24. The method of claim 18, further comprising:

transmitting an indication to cancel transmission in one or more symbols of the uplink transmission occasion, wherein the indication is transmitted at a time, prior to the uplink transmission occasion, that does not satisfy a processing time threshold associated with the mobile station;

determining that the uplink transmission occasion satisfies a condition with respect to resources available for a partial transmission of the actual repetition, based at least in part on one or more resources available in the uplink transmission occasion after cancellation of transmission in the one or more symbols; and incrementing a repetition counter that counts toward the number of actual repetitions based at least in part on determining that the uplink transmission occasion satisfies the condition.

25. The method of claim 18, further comprising:

transmitting an indication to cancel transmission in one or more symbols of the uplink transmission occasion, wherein the indication is transmitted at a time, prior to the uplink transmission occasion, that does not satisfy a processing time threshold associated with the mobile station;

determining that the uplink transmission occasion does not satisfy a condition with respect to resources available for a partial transmission of the actual repetition, based at least in part on one or more resources available in the uplink transmission occasion after cancellation of transmission in the one or more symbols; and refraining from counting the actual repetition toward the number of actual repetitions based at least in part on determining that the uplink transmission occasion does not satisfy the condition.

26. The method of claim 18, further comprising:

transmitting an indication to cancel transmission in one or more symbols of the uplink transmission occasion, wherein the indication is transmitted at a time, prior to the uplink transmission occasion, that does not satisfy a processing time threshold associated with the mobile station;

determining that the uplink transmission occasion does not satisfy a condition with respect to resources available for a partial transmission of the actual repetition, based at least in part on one or more resources available in the uplink transmission occasion after cancellation of transmission in the one or more symbols; and incrementing a repetition counter that counts toward the number of actual repetitions despite determining that the uplink transmission occasion does not satisfy the condition.

27. A mobile station for wireless communication, comprising:

one or more memories; and one or more processors, the one or more processors, individually or collectively and based at least in part on information stored in the one or more memories being configured to:

receive a configuration that indicates a number of nominal repetitions associated with an uplink repetition type that does not permit an uplink transmission occasion, of a set of uplink transmission occasions, to cross a slot boundary and that permits at most one uplink transmission occasion, of the set of uplink transmission occasions, per slot, for the nominal repetitions, the configuration comprising a time domain allocation within a slot for repetitions over a plurality of slots; and transmit an actual repetition of the uplink repetition type in the uplink transmission occasion based at least in part on a determination that the uplink transmission occasion has resources available for the actual repetition, wherein the uplink transmission occasion is within one of the plurality of slots.

28. The mobile station of claim 27, wherein the one or more processors, to determine that the uplink transmission occasion has resources available for the actual repetition, are configured to determine that the uplink transmission occasion has resources available for a full transmission that comprises all symbols of the actual repetition.

29. The mobile station of claim 27, wherein the determination that the uplink transmission occasion has resources available for the actual repetition comprises a determination that the uplink transmission occasion does not overlap with a downlink symbol.

30. The mobile station of claim 27, wherein the one or more processors, to determine that the uplink transmission occasion has resources available for the actual repetition, are configured to determine that the uplink transmission occasion has resources available for a full transmission that comprises all symbols of the actual repetition and that the uplink transmission occasion does not overlap with a downlink symbol.

31. A base station for wireless communication, comprising:

one or more memories; and one or more processors, the one or more processors, individually or collectively and based at least in part on information stored in the one or more memories, configured to:

transmit, to a mobile station, a configuration that indicates a number of nominal repetitions associated with an uplink repetition type that does not permit an uplink transmission occasion, of a set of uplink transmission occasions, to cross a slot boundary and that permits at most one uplink transmission occasion per slot, for the nominal repetitions, the configuration comprising a time domain allocation within a slot for repetitions over a plurality of slots; and monitor for an actual repetition of the uplink repetition type in the uplink transmission occasion, based at least in part on a determination that the uplink transmission occasion has resources available for the actual repetition, wherein the uplink transmission occasion is within one of the plurality of slots.

* * * * *